(12) United States Patent
Kawai et al.

(10) Patent No.: US 6,426,807 B1
(45) Date of Patent: Jul. 30, 2002

(54) LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

(75) Inventors: Tatsundo Kawai, Hadano; Osamu Hamamoto; Shinichi Takeda, both of Hiratsuka; Satoshi Itabashi, Chigasaki; Toshimitsu Iso, Hiratsuka, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/650,751

(22) Filed: Aug. 29, 2000

Related U.S. Application Data

(62) Division of application No. 08/948,661, filed on Oct. 10, 1997, which is a division of application No. 08/471,756, filed on Jun. 6, 1995, now abandoned, which is a division of application No. 08/183,367, filed on Jan. 19, 1994, now Pat. No. 5,499,112.

(30) Foreign Application Priority Data

Jan. 19, 1993 (JP) .................................................. 5-6925
Apr. 9, 1993 (JP) .............................................. 5-105983

(51) Int. Cl.$^7$ ................................................ H04N 1/04
(52) U.S. Cl. ...................... 358/484; 358/475; 250/234; 250/227.11; 362/800
(58) Field of Search .................................. 358/475, 484, 358/474, 509, 505, 506, 487; 362/800; 250/208.1, 234–236, 216, 227.11

(56) References Cited

U.S. PATENT DOCUMENTS

| | | | |
|---|---|---|---|
| 3,464,133 A | 9/1969 | DePoray | 40/546 |
| 4,313,124 A | 1/1982 | Hara | 347/65 |
| 4,345,262 A | 8/1982 | Shirato et al. | 347/65 |
| 4,371,897 A | 2/1983 | Kramer | 358/474 |
| 4,459,600 A | 7/1984 | Sato et al. | 347/65 |
| 4,463,359 A | 7/1984 | Ayata et al. | 347/56 |
| 4,558,333 A | 12/1985 | Sugitani et al. | 347/65 |
| 4,714,983 A | 12/1987 | Lang | 362/27 |
| 4,723,129 A | 2/1988 | Endo et al. | 347/56 |
| 4,733,332 A | 3/1988 | Yamashita et al. | 362/32 |
| 4,733,335 A | 3/1988 | Serizawa et al. | 362/503 |

(List continued on next page.)

FOREIGN PATENT DOCUMENTS

| | | |
|---|---|---|
| DE | 1472474 | 10/1969 |
| JP | 56-58364 | 5/1981 |
| JP | 57-128383 | 8/1982 |
| JP | 59-123670 | 7/1984 |
| JP | 59-138461 | 8/1984 |
| JP | 62-29003 | 2/1987 |
| JP | 4-308893 | 10/1992 |

*Primary Examiner*—Cheukfan Lee
(74) *Attorney, Agent, or Firm*—Fitzpatrick, Cella, Harper & Scinto

(57) ABSTRACT

There is disclosed an illumination device in which a light guide is adapted to emit the light from a face thereof and is provided with an area, on a face opposite to the light emitting face, for diffusing and/or reflecting the light introduced into the light guide from an end face thereof or is provided with uneven light emitting characteristics along the longitudinal direction of the light guide, and the center of the light source positioned at the end of the light guide is placed at a position aberrated from the normal line to the area, whereby attained are compactness, a low cost, a low electric power consumption, a high efficiency of utilization of the light emitted by the light source, and excellent and uniform illumination characteristics. There are also disclosed an image reading device and an information processing apparatus, equipped with the above-mentioned illumination device.

180 Claims, 47 Drawing Sheets

U.S. PATENT DOCUMENTS

| | | | |
|---|---|---|---|
| 4,740,796 A | 4/1988 | Endo et al. | 347/56 |
| 4,929,866 A | 5/1990 | Murata et al. | 362/800 |
| 4,937,709 A | 6/1990 | Yanagi et al. | 362/31 |
| 4,974,122 A | 11/1990 | Shaw | 362/31 |
| 5,005,108 A | 4/1991 | Pristash et al. | 362/31 |
| 5,040,098 A | 8/1991 | Tanaka et al. | 362/31 |
| 5,046,805 A | 9/1991 | Simon | 385/31 |
| 5,050,946 A | 9/1991 | Hathaway et al. | 385/33 |
| 5,055,861 A | 10/1991 | Murayama et al. | 347/29 |
| 5,070,431 A | 12/1991 | Kitazawa et al. | 362/31 |
| 5,079,675 A | 1/1992 | Nakayama | 362/31 |
| 5,099,343 A | 3/1992 | Margerum et al. | 359/48 |
| 5,166,811 A | 11/1992 | Nagano | 358/483 |
| 5,202,950 A | 4/1993 | Arego et al. | 385/146 |
| 5,237,641 A | 8/1993 | Jacobsen et al. | 385/146 |
| 5,257,340 A | 10/1993 | Kaplan | 385/128 |
| 5,276,504 A | 1/1994 | Zwirner et al. | 356/384 |
| 5,289,351 A | 2/1994 | Kashima et al. | 362/31 |
| 5,295,047 A | 3/1994 | Windross | 362/26 |
| 5,295,048 A | 3/1994 | Park et al. | 362/26 |
| 5,309,544 A | 5/1994 | Saxe | 385/146 |
| 5,357,405 A | 10/1994 | Park | 362/31 |
| 5,359,691 A | 10/1994 | Tai et al. | 385/146 |
| 5,363,294 A | 11/1994 | Yamamoto et al. | 362/31 |
| 5,408,387 A | 4/1995 | Murase et al. | 362/31 |
| 5,418,384 A | 5/1995 | Yamada et al. | 257/88 |
| 5,420,761 A | 5/1995 | DuNah et al. | 362/31 |
| 5,438,484 A | 8/1995 | Kanda et al. | 362/31 |
| 5,461,547 A | 10/1995 | Ciupke et al. | 362/31 |
| 5,485,354 A | 1/1996 | Ciupke et al. | 362/31 |
| 5,499,112 A | 3/1996 | Kawai et al. | 358/475 |
| 5,521,797 A | 5/1996 | Kashima et al. | 362/31 |
| 5,590,945 A | 1/1997 | Simms | 362/31 |
| 5,594,830 A | 1/1997 | Winston et al. | 385/146 |
| 5,664,873 A | 9/1997 | Kanda et al. | 362/97 |
| 5,703,667 A | 12/1997 | Ochai | 362/31 |
| 5,709,447 A | 1/1998 | Murakami et al. | 362/31 |
| 5,735,590 A | 4/1998 | Kashima et al. | 362/31 |
| 5,737,096 A | 4/1998 | Takeuchi et al. | 358/475 |
| 5,808,295 A | 9/1998 | Takeda et al. | 250/216 |
| 5,818,033 A | 10/1998 | Takeda et al. | 250/208.1 |
| 5,959,740 A | 9/1999 | Takeda et al. | 358/296 |

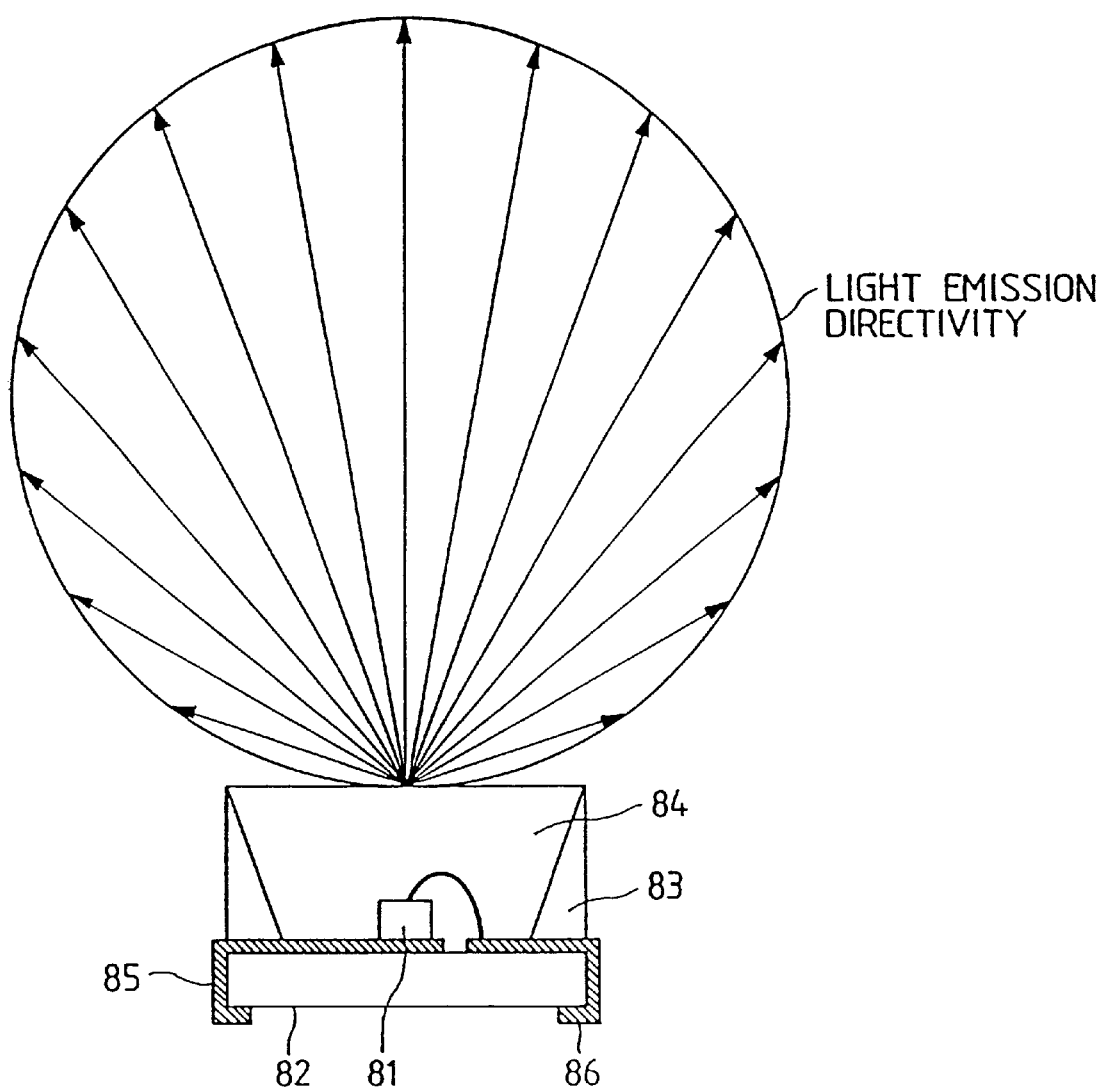

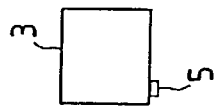
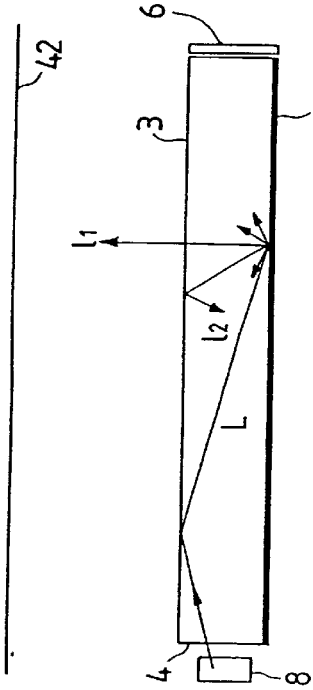
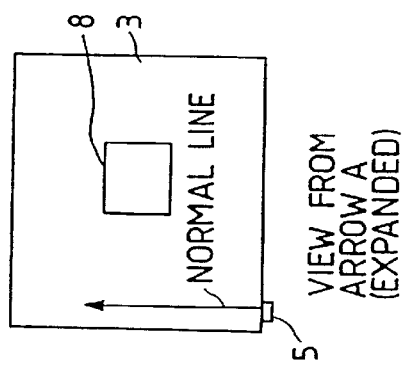
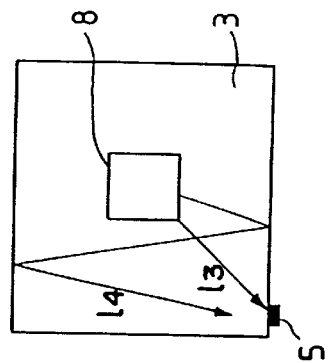

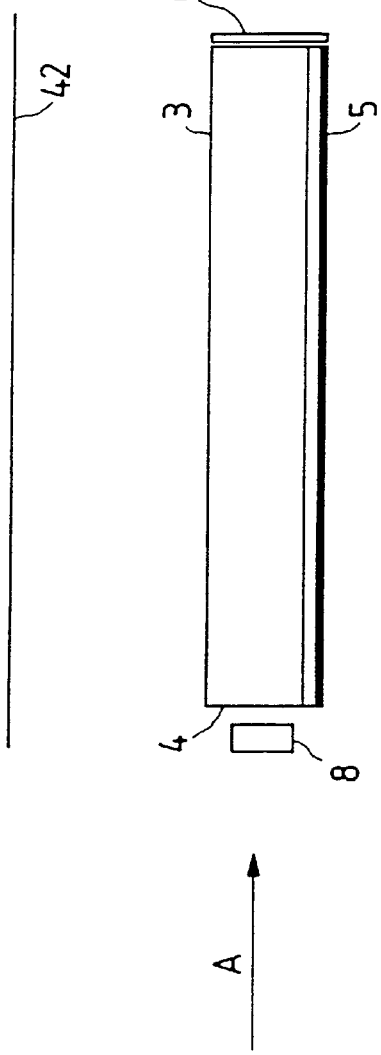
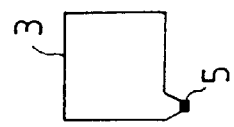
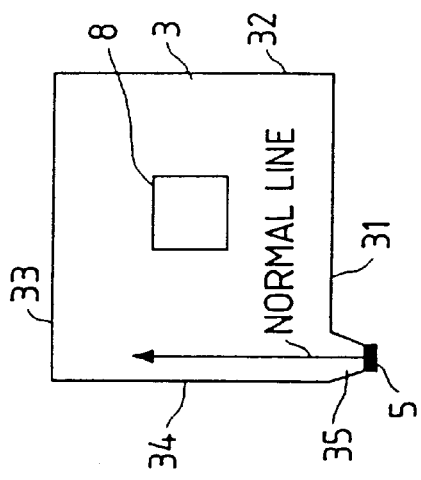
FIG. 20A
FIG. 20B
FIG. 20C
VIEW FROM ARROW A (EXPANDED)

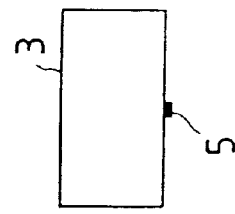
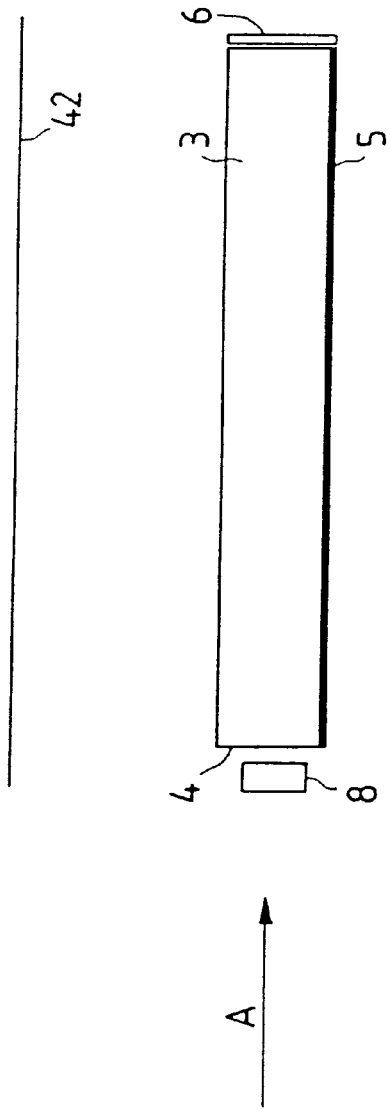
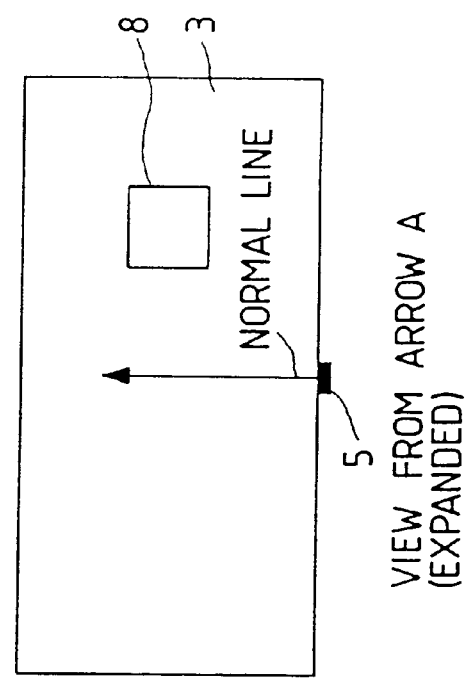

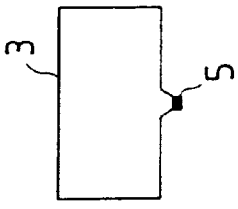
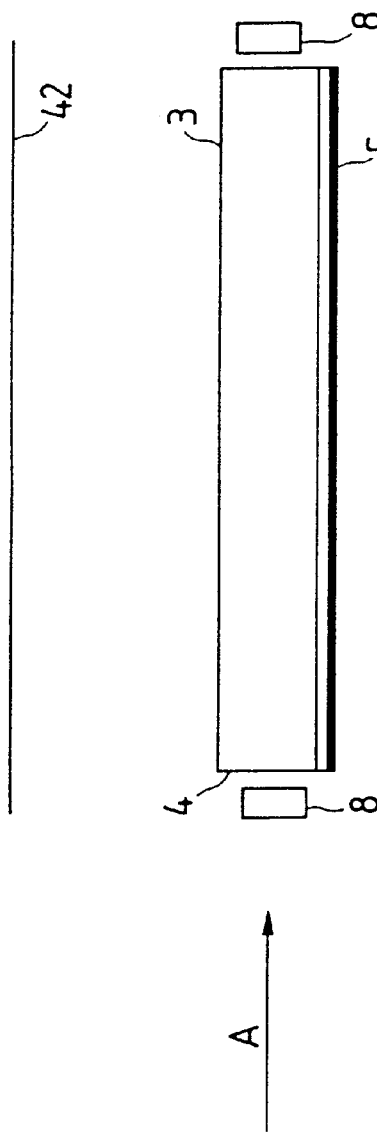
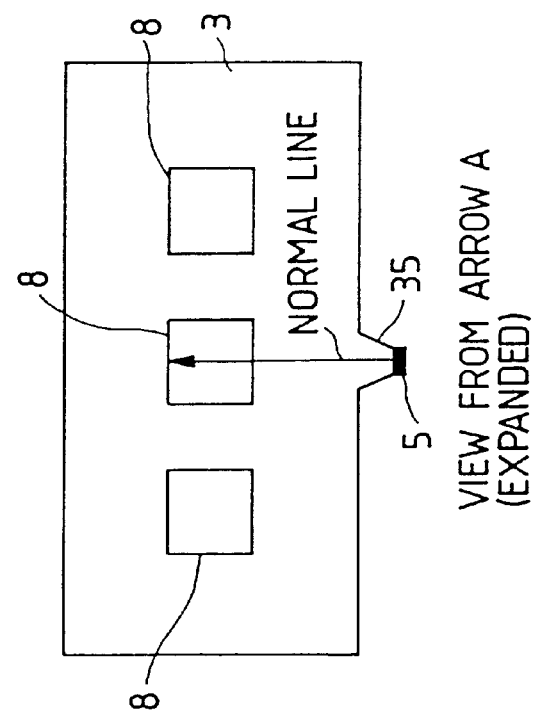

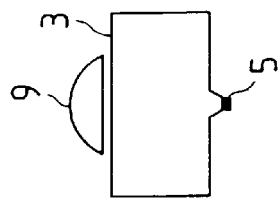
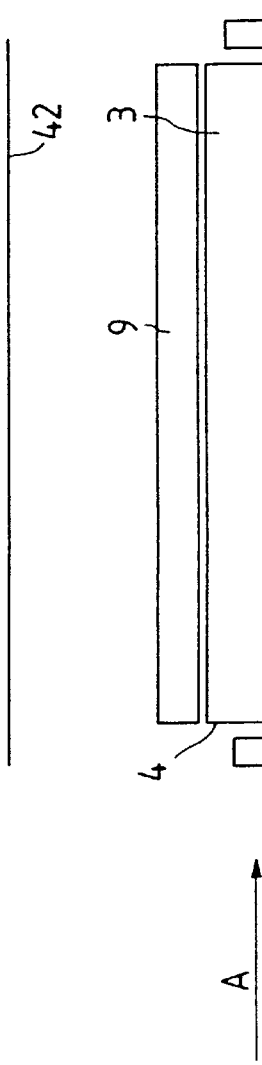
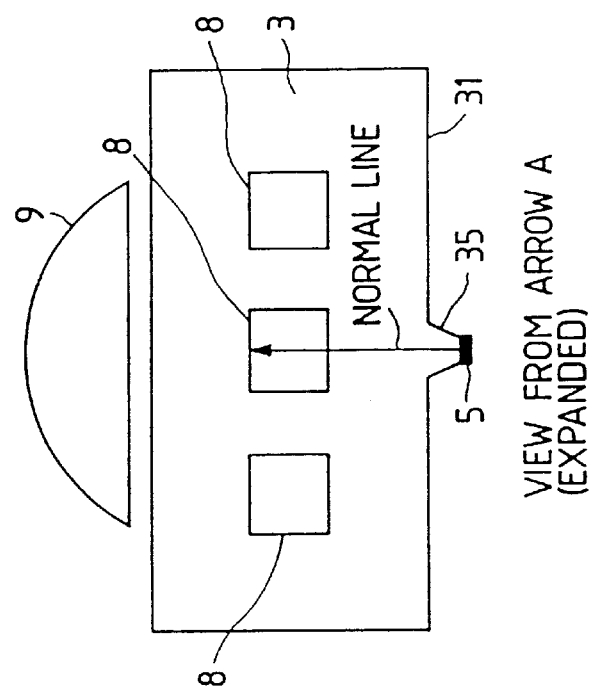

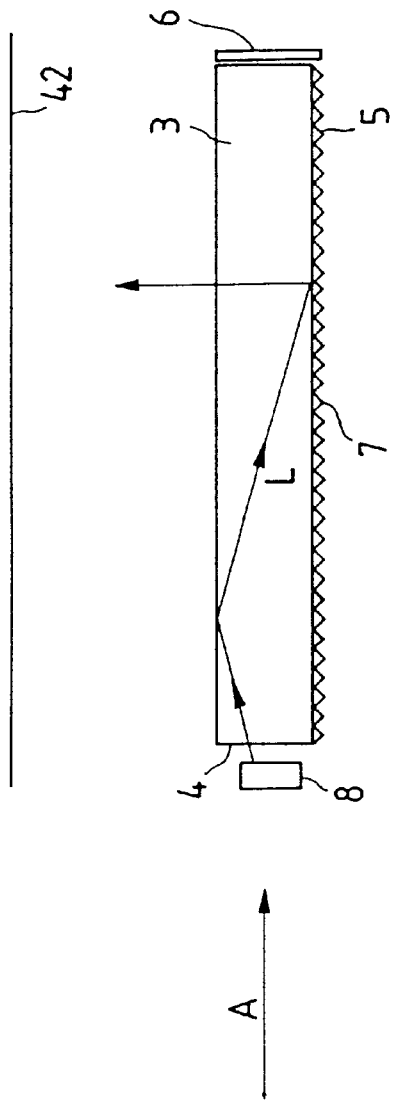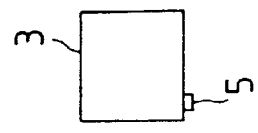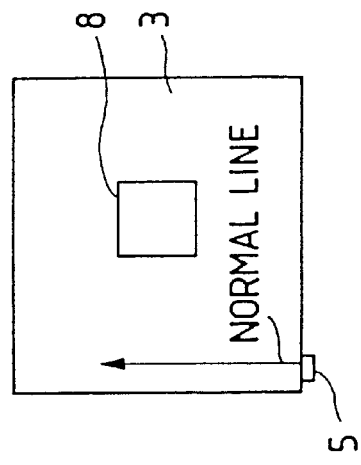

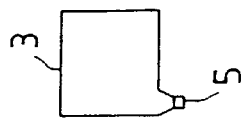
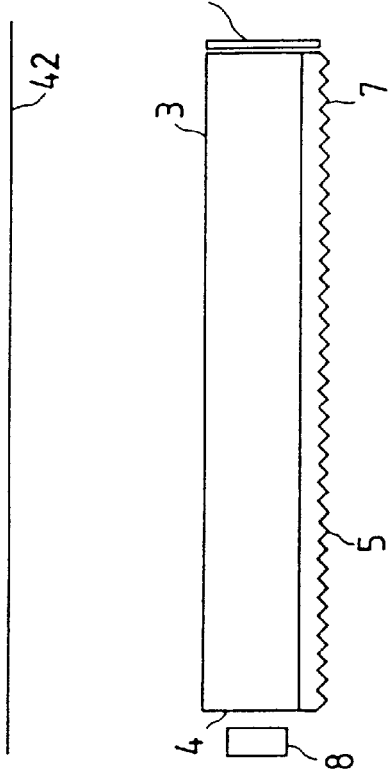
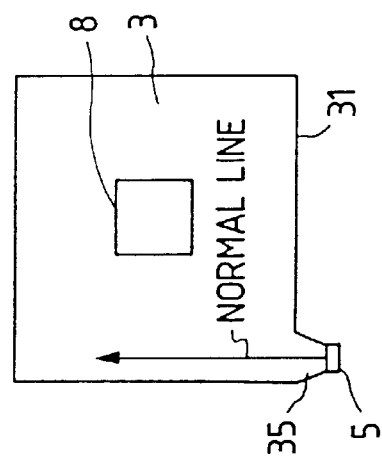

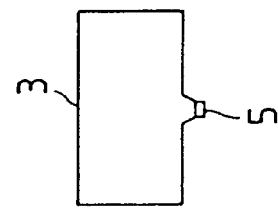
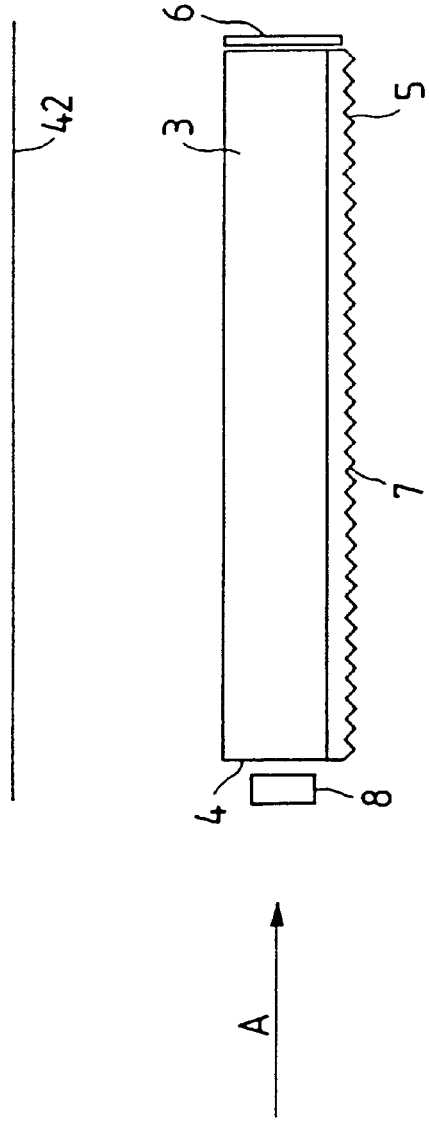
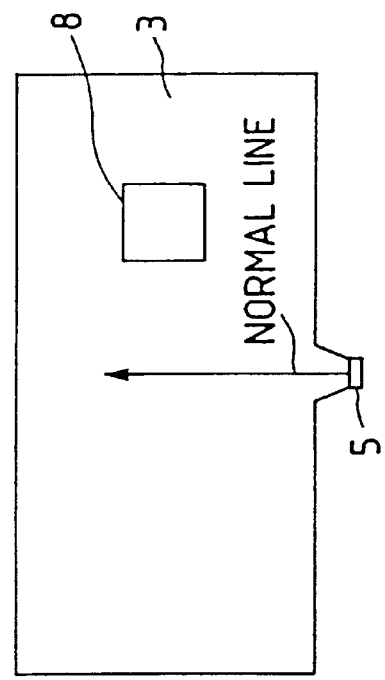

VIEW FROM ARROW A (EXPANDED)

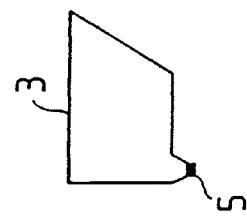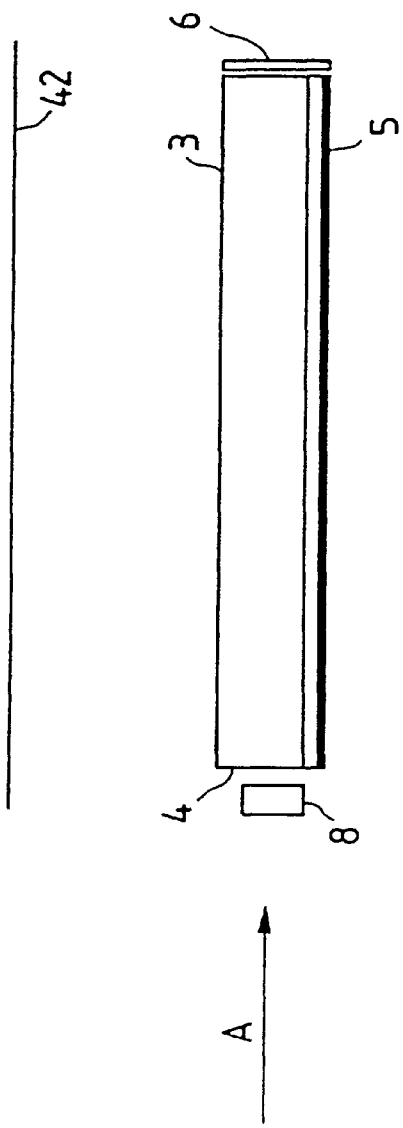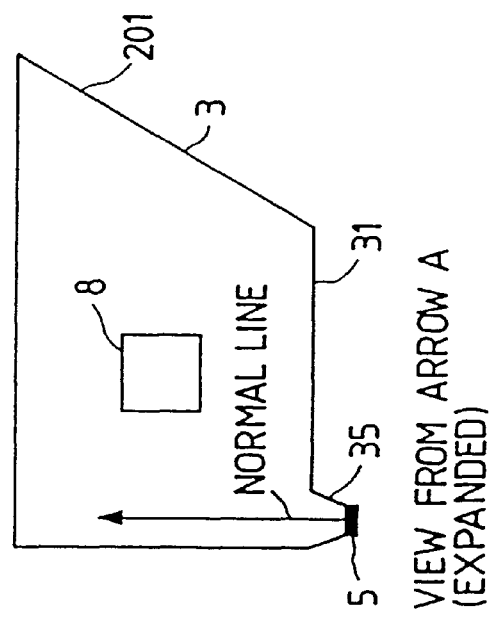

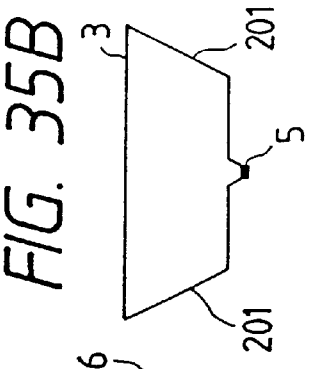
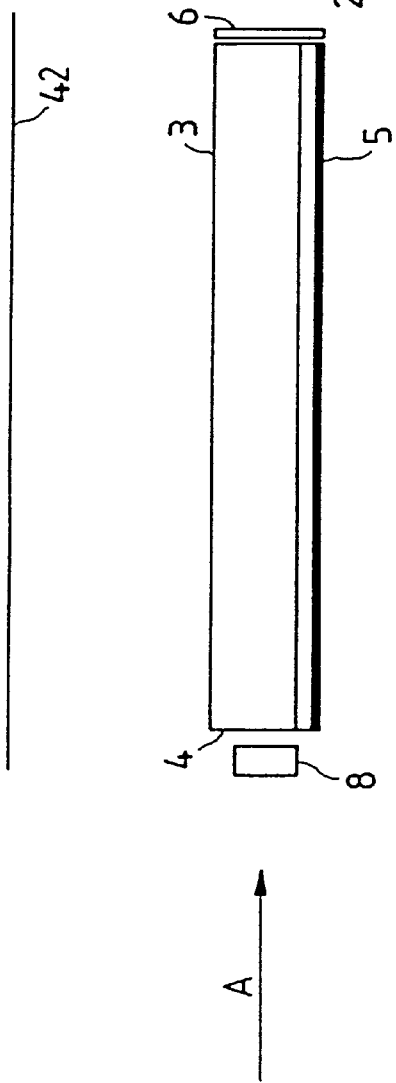
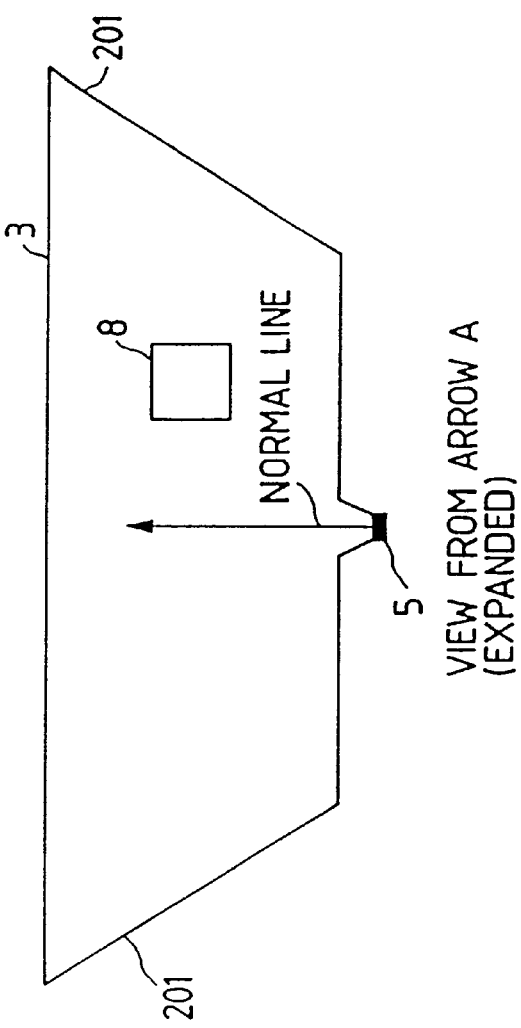

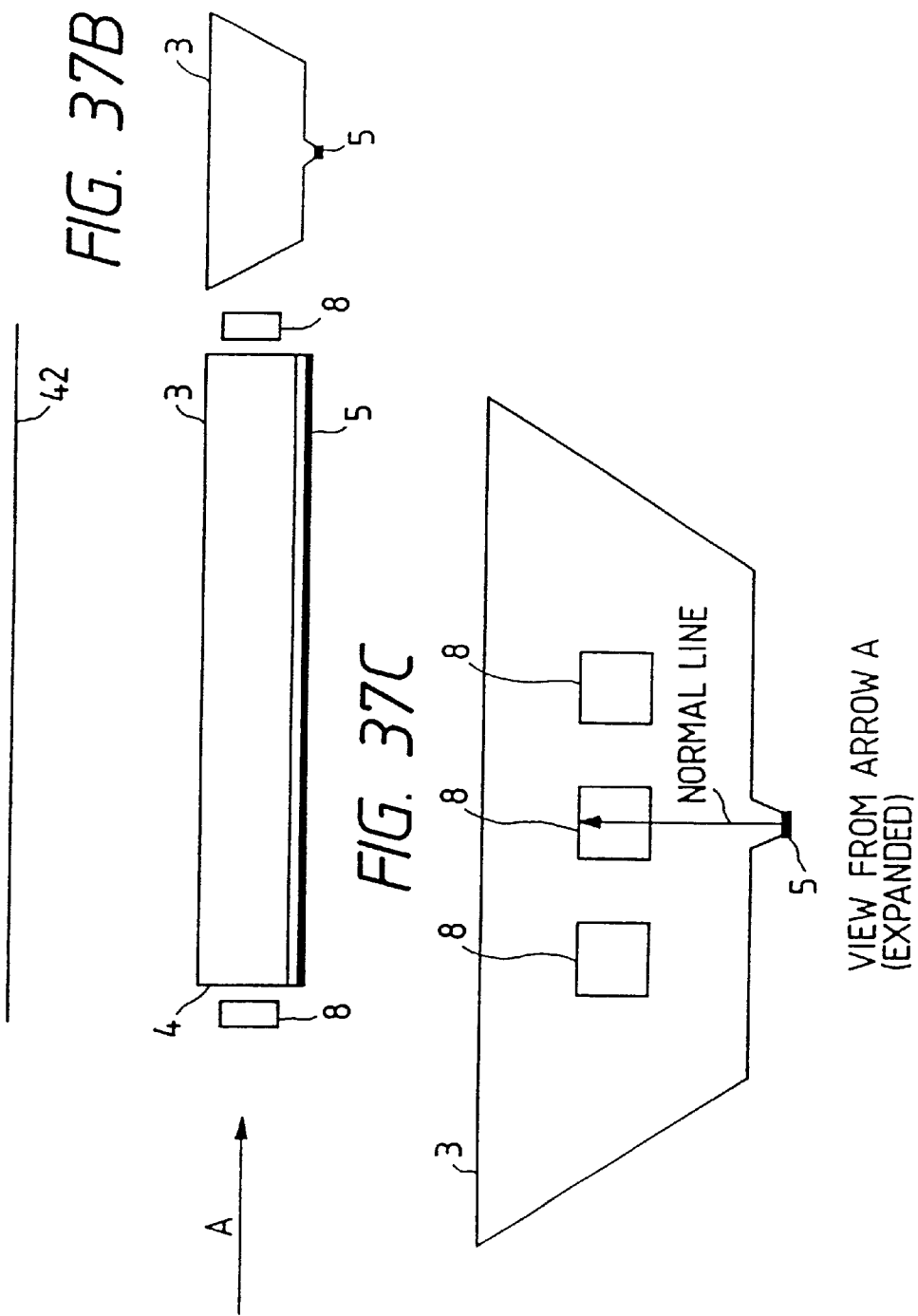

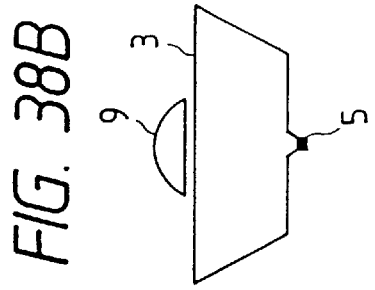
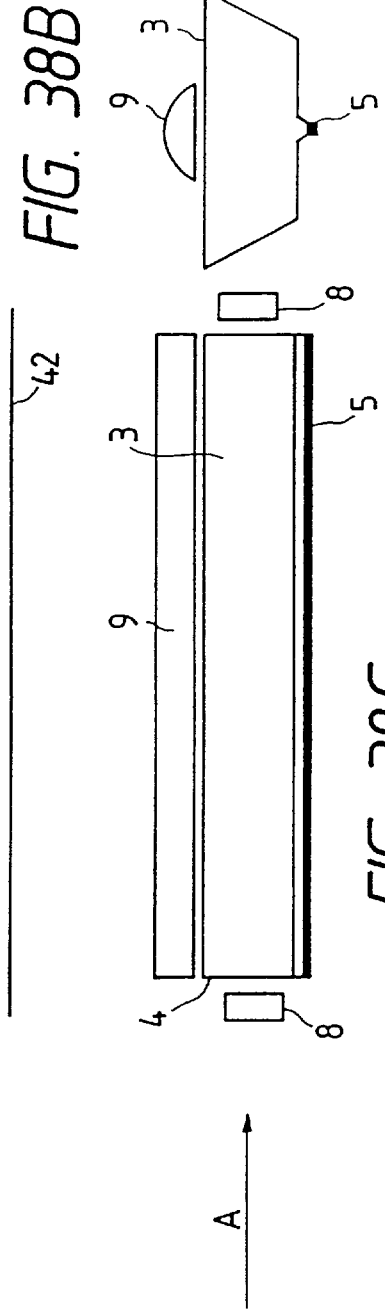
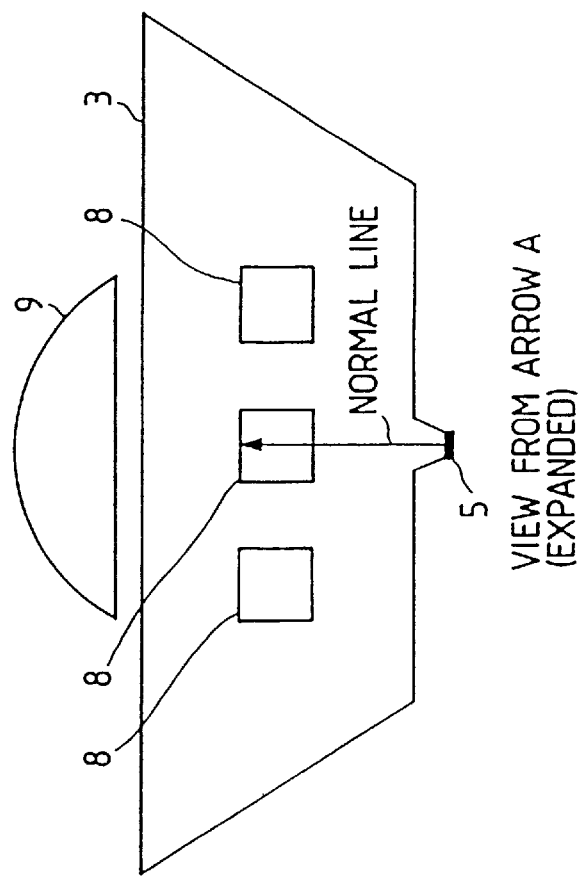

VIEW FROM ARROW A
(EXPANDED)

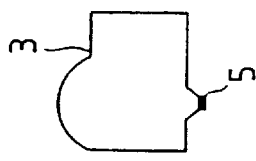
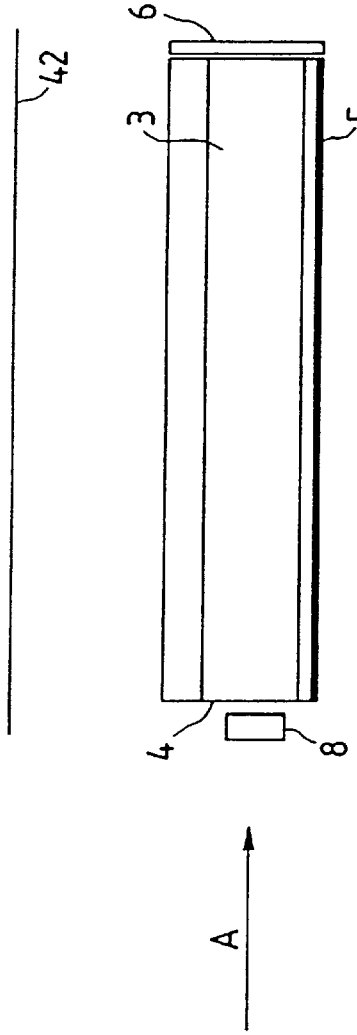
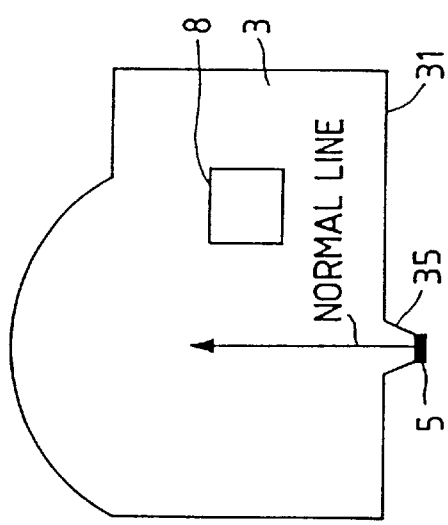
FIG. 42A
FIG. 42B
FIG. 42C
VIEW FROM ARROW A (EXPANDED)

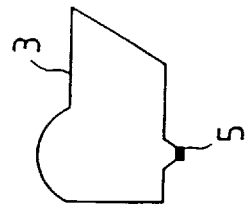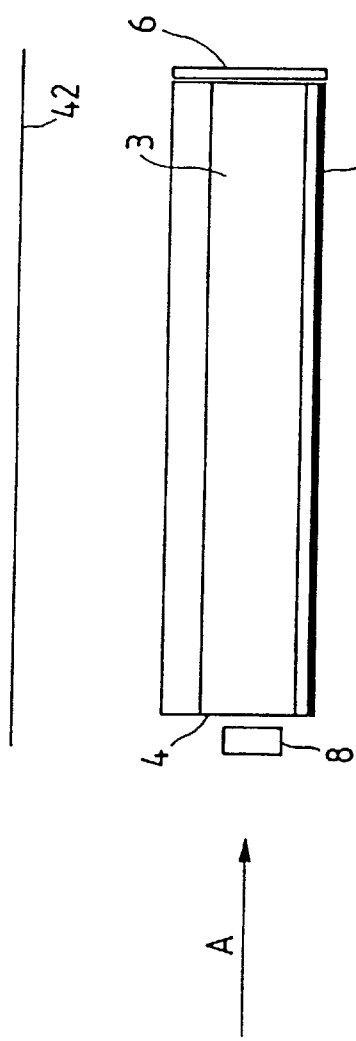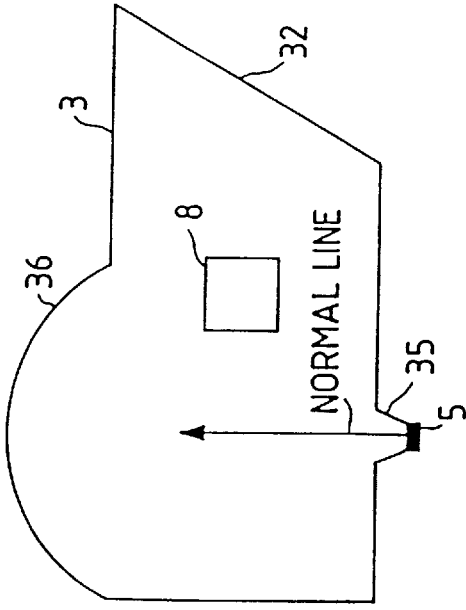

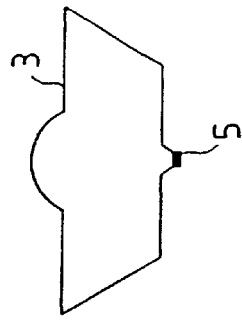
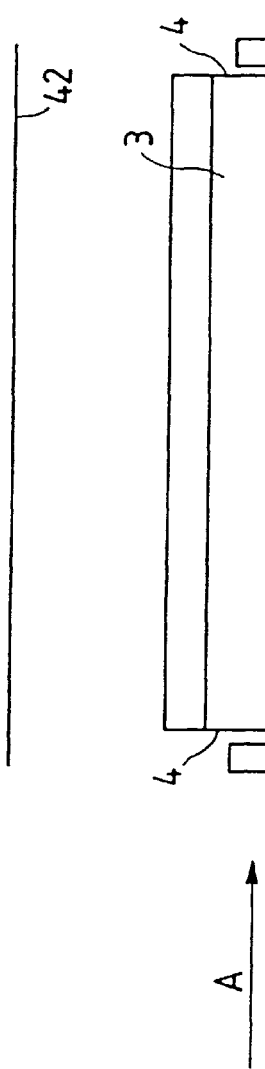
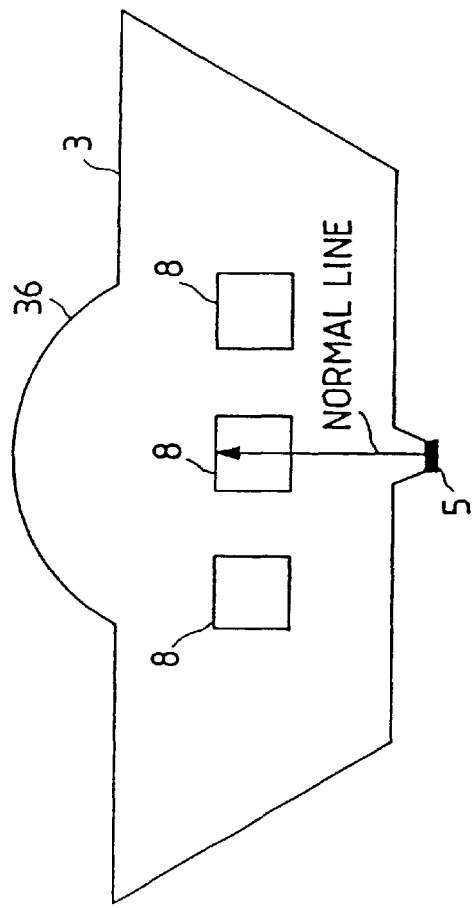

VIEW FROM ARROW A (EXPANDED)

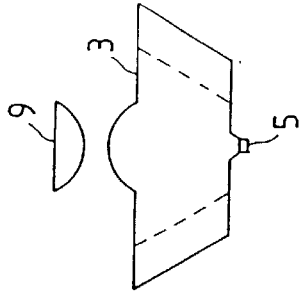
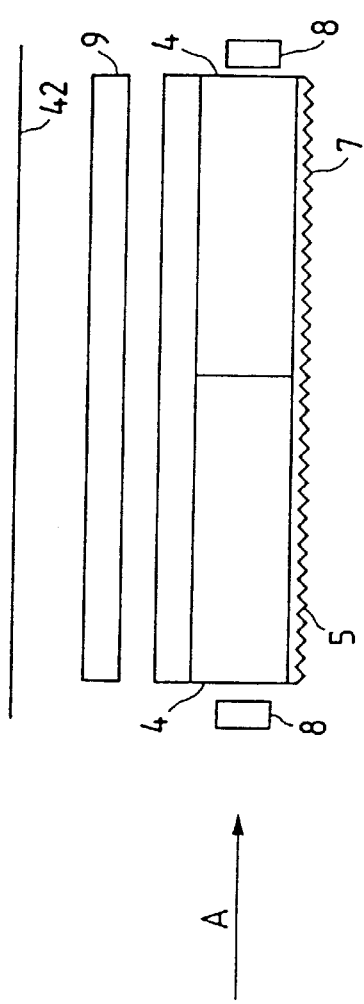
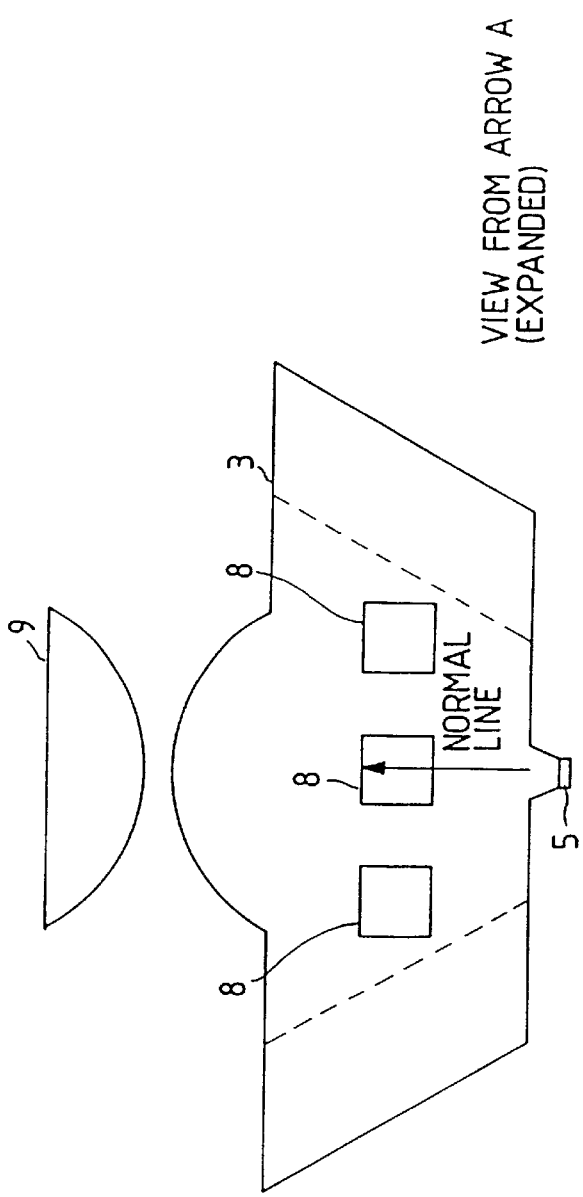
VIEW FROM ARROW A (EXPANDED)

LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

This application is a divisional application of application Ser. No. 08/948,661, filed Oct. 10, 1997, which is a divisional of application Ser. No. 08/471,756, filed Jun. 6, 1995 now abandoned, which is a divisional of application Ser. No. 08/183,367, filed Jan. 19, 1994 now U.S. Pat. No. 5,499,112.

BACKGROUND OF THE INVENTION

1. Field of the Invention

The present invention relates to a light guide, an illuminating device having the light guide, and an image reading device and an information processing apparatus having the illuminating device, and more particularly an information processing apparatus (such as a copying machine, a facsimile apparatus, a scanner or an electronic blackboard), an image reading device adapted for use in such an information processing apparatus, an illumination device adapted for use in such an image reading device, and a light guide adapted for use in such an illumination device.

2. Description of the Related Art

For illuminating the image reading device of the information processing apparatus such as the facsimile apparatus, electronic copying machine or the like, there has conventionally been employed a discharge tube such as a flourescent lamp or an LED array consisting of an array of a plurality of LED's. Particularly in recent years, the LED arrays are being used more widely, because compact and inexpensive products are requested for home-use equipment such as the facsimile apparatus.

An example of the illumination device utilizing such LED array will be explained with reference to FIGS. 1A and 1B, wherein shown are an LED array 41, a plane 42 to be illuminated, such as the surface of an original document, and LED chips 43. FIG. 1A shows the schematic structure of the illumination device employing an LED array, together with the original to be illuminated, while FIG. 1B shows an example of the illumination intensity distribution of the surface of the original when it is illuminated with the illumination device shown in FIG. 1A. As shown in FIG. 1B, a substantially uniform and high illumination intensity can be obtained by increasing the number of the LED chips, namely by densely arranging the LED chips. However, because of the increased number of the LED chips, it is difficult to achieve a sufficiently low cost, and to reduce the power consumption beyond a certain limit even though the power required for an individual LED is quite low.

A reduced number of the LED chips, or a less dense arrangement of the LED chips, for the purpose of cost reduction, will result in an uneven illumination intensity distribution on the illuminated surface, due to the increased gap between the LED chips, as will be explained in the following with reference to FIGS. 2A and 2B, wherein the same components as those in FIGS. 1A and 1B are represented by the same numbers.

FIG. 2A shows the schematic structure of the illumination device utilizing an LED array, together with the illuminated original, as in FIG. 1A, while FIG. 2B shows an example of the illumination intensity distribution when the original is illuminated with the illumination device shown in FIG. 2A. If the number of LED's in the array is decreased, there results, as shown in FIG. 2B, an extremely uneven illumination state in which the illumination intensity on the original surface is high in positions corresponding to the LED chips but is low in positions corresponding to the gaps between the LED chips. The precise original reading becomes difficult under such an illumination intensity distribution, and a circuit is required to compensate for the unevenness in the illumination intensity distribution, eventually leading to a higher cost.

FIG. 3 is a schematic perspective view showing the details of a linear light source similar to that explained above.

As shown in FIG. 3, such a linear light source is composed of LED chips 43, individually constituting a point light source, mounted linearly on a substrate 45 bearing electric wirings 49, and a voltage is applied between input terminals 48 of the wirings 49 to cause light emission from the LED chips 43, thereby constituting a linear light source.

FIG. 4 shows an elevation view of the light source, seen from a direction C shown in FIG. 3, and the light amount distribution on an illuminated surface (not shown), schematically illustrating the variation of the light amount corresponding to the positions of the LED chips 43. A curve 44 indicating the distribution of the light amount becomes higher in positions directly above the LED chips 43 but lower in positions corresponding to the gaps between the LED chips 43, because of the linear arrangement thereof. As a result, there is formed unevenness in the light amount corresponding to the arrangement of the LED chips 43. In reading image information with such a linear light source, the reflected light from the illuminated surface also involves unevenness in the light amount similar to that shown in FIG. 4, so that a large burden is required in the post-process such as image processing for improving the tonal rendition.

On the other hand, there is conceived a linear light source of the configuration as shown in FIG. 5, in which a light bulb, such as a tungsten lamp or a halogen lamp, is employed as the light source and the light emitted from the light source is developed into a linear form. In FIG. 5 there are shown an electric light bulb 1, such as a halogen lamp; a mirror 2 of a light condensing form, such as spherical or elliptical form; a translucent member 3 with a circular cross section, such as a quartz rod; an entrance face 4 where the light beam emitted from the light bulb 1 enters the translucent member 3; an area 5 for taking out the light beam, propagating in the translucent member 3, from the member by reflection or scattering, the area 5 being formed on a part of the translucent member 3 by forming a coarse surface or coating the surface thereof with light diffusing/reflecting paint; and a reflective face 6 provided at an end of the translucent member 3 opposite to the bulb 1 and formed either by evaporating a metal such as aluminum or applying light diffusing/reflecting paint on the end face of the translucent member 3 itself, or as a separate member. The translucent member 3 may also have a square or rectangular cross section.

The light beam L, emitted from the light bulb 1 and entering the translucent member 3 through the entrance face 4 thereof propagates in the member 3 by repeated reflections on the internal walls thereof, then is reflected by the end face opposite to the entrance face 4, and propagates again in the interior of the translucent member 3. In the course of repeated reflections, upon entering the above-mentioned area 5, the light beam is scattered therein and a part 11 of the light beam is released to the exterior through an exit face opposite to the area 5. The remaining part 12 of the diffused light beam, entering the exit face diagonally, is totally reflected thereon and propagates in the translucent member.

The light reaching the entrance face 4 after repeated propagations is released therethrough to the exterior.

When the light bulb 1 is used as the light source, as the amount of light emission can be increased by the use of a larger electric power, there can be obtained a considerably high illumination intensity despite the light loss by the light emission to the exterior through the entrance face 4.

However, the use of the light bulb is associated with the drawbacks of a large electric power consumption in return for a high illumination intensity, difficulty in compactization of the device because of the large heat generation, and lack of maintenance-free character as in the case of LED's, since the electric light bulb has a service life considerably shorter than even that of the fluorescent lamp and has to be replaced when the light amount becomes low or when the filament is broken.

Consequently, the illumination device to be employed as the image reading light source for an information processing apparatus, such as a facsimile apparatus, preferably employs LED's as the light source and is adapted to emit the light beam from the LED's in a linear form. As another example of the illumination device employing the LED chips as the light source, there has been conceived a configuration shown in FIGS. 6A and 6B, which respectively are a schematic view of the illumination device together with an original to be illuminated, and a chart showing an example of the illumination intensity distribution on the illuminated surface 42 when the original is illuminated with the device shown in FIG. 6A. More specifically, the illumination device shown in FIG. 6A is similar to that shown in FIG. 5 except that the light source is replaced by an LED light source 71. In FIG. 6A, the components equivalent to those in FIG. 5 are represented by the same numbers.

The LED light source is available in various types, among which there is known so-called surface mounting LED chips convenient for compactization and actual mounting. FIG. 7 illustrates such a surface mounting LED light source, wherein shown are an LED chip 81; a substrate 82; a reflecting frame 83; translucent resin 84; and electrodes 85, 86 formed on the substrate 82. Such an LED light source is already available in a compact form, with the size of the light source itself of 2–3 mm and the height of 2 mm or less. As the electrodes 85, 86 are extended to the rear side of the substrate 82 through the lateral faces thereof, the light source can be efficiently mounted on the mounting substrate, merely by placing on the mounting substrate printed with cream solder and heating in a reflow oven. Consequently, the use of such an LED light source is more desirable for constructing a linear light source.

However, since such an LED light source has a directionality in the light emission as shown in FIG. 7, in illuminating the original in combination with the translucent member 3 as shown in FIG. 6A, an unevenness will result in the illumination intensity distribution, which is higher at the side of the LED light source 71 and is lower in the remaining part, as shown in FIG. 6B.

This is because the lights diagonally emitted from the LED light source 71 directly enter the area 5 of the translucent member 3, are scattered in the area 5 and released from the translucent member 3.

FIG. 8 is a schematic perspective view of another example of the conventional linear light source, in which light sources are provided on both ends of an oblong translucent member constituting a light guide 3. In FIG. 8, the light is emitted in a direction $l_1$. The oblong translucent member 3 has a constant cross section, and the faces thereof are formed as mirrors except for the light-emitting face. The light is introduced from LED chips 71 provided on substrates 45 into the oblong translucent member 3 through the end faces thereof, and is released to the exterior either directly or after reflection by the mirror faces of the translucent member 3. FIG. 9 shows an elevation view, seen from a direction D shown in FIG. 8, and the illumination intensity distribution on the illuminated surface (not shown). As shown in FIG. 9, there is obtained a uniform light amount within an area a–c, but the level of light amount is low and is considerably different from that in the vicinity of the light source. 10a, 10b and 10c are cross sections at the positions a, b and c of the oblong translucent member 3, and 44a, 44b and 44c indicate the illumination intensity distributions at the corresponding positions. Also hatched portions represent mirror faces (except for the light emitting face and light entering faces of the oblong translucent member 3).

SUMMARY OF THE INVENTION

An object of the present invention is to resolve the drawbacks associated with the conventional illumination means utilizing the linear array of LED chips and with the information processing apparatus employing such an illumination means, such as the difficulty in achieving a sufficiently low cost due to the large number of LED chips to be used, the limit in reducing the electric power consumption even though the electric power consumption in an individual LED chip is relatively low, the uneven illumination state where the illumination intensity on the illuminated original is high in positions corresponding to the LED chips but is low in positions corresponding to the gaps between the LED chips, encountered when the number of the LED chips is reduced in the array, the uneven illumination intensity on the illuminated original encountered when the LED chips are positioned at the end faces of the translucent member, and the cost increase resulting from the necessity for a circuit to compensate for the unevenness in the illumination intensity.

Another object of the present invention is to resolve the drawbacks associated with the conventional illumination means utilizing the electric light bulb and with the information processing apparatus employing such an illumination means, such as the large electric power consumption, the difficulty in compactization of the device because of the large heat generation, and the difficulty in attaining a maintenance-free configuration.

Still another object of the present invention is to provide an illumination device with high uniformity in the illumination intensity, a low electric power consumption and easy compactization, a light guide adapted for use in the illumination device, and an information processing apparatus utilizing the illumination device.

Still another object of the present invention is to resolve the drawbacks of the unevenness in the illumination intensity and of the significant difference in the illumination intensity between a side close to the LED light source and the opposite side, when the LED is employed as the light source for a linear illumination device.

Still another object of the present invention is to provide a light guide having a light entrance face at an end thereof and a light exit face for emitting the introduced light, along the longitudinal direction, different from the end face, comprising an area provided along the longitudinal direction in a part of the side opposite to the light exit face and adapted to reflect and/or diffuse the light beam introduced into the translucent member.

Still another object of the present invention is to provide an illumination device provided with a translucent member having a light entrance face at an end thereof and a light exit face for emitting the introduced light on a face, along the longitudinal direction, different from the end face, and a light source for emitting the light beam to be introduced through the light entrance face, wherein the translucent member comprises an area provided along the longitudinal direction on a part of the side opposite to the light exit face and adapted to reflect and/or diffuse the light introduced into the translucent member, and the center of the light source is aberrated from the direction of a normal line to the area.

Still another object of the present invention is to provide an information processing apparatus provided with:

(a) a photoelectric converting device having a plurality of photoelectric converting elements positioned opposite to the image of an original sheet to be read;

(b) an illumination device for illuminating the original sheet;

(c) transport means for transporting the original sheet;

(d) an output unit for recording an image on a sheet by electrical signals corresponding to image information; and (e) a controller for controlling the photoelectric converting device, the light source, the transport means and the output unit;

wherein the illumination means includes an illumination device provided with a translucent member having a light entrance face at an end thereof and a light exit face for emitting the introduced light, along the longitudinal direction, different from the end face, and a light source for emitting the light beam to be introduced through the light entrance face, wherein the translucent member comprises an area provided along the longitudinal direction on a part of the side opposite to the light exit face and adapted to reflect and/or diffuse the light introduced into the translucent member, and the center of the light source is aberrated from the direction of a normal line to the area.

Still another object of the present invention is to provide an image reading device including an illumination device provided with a translucent member having a light entrance face at an end thereof and a light exit face for emitting the introduced light, along the longitudinal direction, different from the end face, and a light source for emitting the light beam to be introduced through the light entrance face, and also including a photoelectric converting device for receiving the light emitting from the light exit face and reflected by an illuminated area, wherein the translucent member comprises an area provided along the longitudinal direction on a part of the side opposite to the light exit face and adapted to reflect and/or diffuse the light introduced into the translucent member, and the center of the light source is aberrated from the direction of a normal line to the area.

Still another object of the present invention is to provide a light guide for use in an illumination device, composed of a translucent member adapted to receive the light from a light source through a face of the translucent member and to emit the light through a lateral face thereof, wherein the translucent member has uneven light emission characteristics in the longitudinal direction thereof.

Still another object of the present invention is to provide an illumination device including a light source positioned on a face of a translucent member and adapted to emit the light from a lateral face of the translucent member, wherein the translucent member has uneven light emission characteristics along the longitudinal direction thereof.

Still another object of the present invention is to provide an image reading device provided with an illumination device including a light source positioned on a face of a translucent member and adapted to emit the light from a lateral face of the translucent member, and a photoelectric converting device adapted to receive the light emitted by the illumination device and reflected by an illuminated area, wherein the translucent member has uneven light emission characteristics along the longitudinal direction thereof.

Still another object of the present invention is to provide an information processing apparatus provided with:

(a) a photoelectric converting device including a plurality of photoelectric converting elements positioned opposite to the image of an original sheet to be read;

(b) an illumination device for illuminating the original sheet, the device including a light source positioned on a face of a translucent member and adapted to emit the light from a lateral face thereof;

(c) transport means for transporting the original sheet;

(d) an output unit for recording an image on a sheet by electrical signals corresponding to the image information; and (e) a controller for controlling the photoelectric converting device, the light source, the transport means and the output unit;

wherein the translucent member of the illumination means has uneven light emission characteristics along the longitudinal direction thereof.

BRIEF DESCRIPTION OF THE DRAWINGS

FIG. 7 is a schematic cross-sectional view showing an example of the LED light source;

FIGS. 17A to 17C are views showing preferred embodiments of the light guide and the illumination device of the present invention;

FIG. 18 is a view showing preferred embodiments of the light guide and the illumination device of the present invention;

FIGS. 20A to 20C are views showing preferred embodiments of the light guide and the illumination device of the present invention;

FIGS. 21A to 21C are views showing preferred embodiments of the light guide and the illumination device of the present invention;

FIGS. 24A to 24C are views showing preferred embodiments of the light guide and the illumination device of the present invention;

FIGS. 25A to 25C are views showing preferred embodiments of the light guide and the illumination device of the present invention;

FIGS. 26A to 26C are views showing preferred embodiments of the light guide and the illumination device of the present invention;

FIGS. 29A to 29C are views showing preferred embodiments of the light guide and the illumination device of the present invention;

FIGS. 30A to 30C are views showing preferred embodiments of the light guide and the illumination device of the present invention;

FIGS. 34A to 34C are views showing preferred embodiments of the light guide and the illumination device of the present invention;

FIGS. 35A to 35C are views showing preferred embodiments of the light guide and the illumination device of the present invention;

FIGS. 37A to 37C are views showing preferred embodiments of the light guide and the illumination device of the present invention;

FIGS. 38A to 38C are views showing preferred embodiments of the light guide and the illumination device of the present invention;

FIGS. 42A to 42C are views showing preferred embodiments of the light guide and the illumination device of the present invention;

FIGS. 43A to 43C are views showing preferred embodiments of the light guide and the illumination device of the present invention;

FIGS. 45A to 45C are views showing preferred embodiments of the light guide and the illumination device of the present invention;

FIGS. 51A to 51C are views showing preferred embodiments of the light guide and the illumination device of the present invention;

DETAILED DESCRIPTION OF THE PREFERRED EMBODIMENTS

In the illumination device consisting of the aforementioned linear light source, the total light amount is low and the light intensity distribution is uneven as explained before. This is because the light from the light source consisting of the LED chip is not emitted, in a uniform and sufficient manner, from the oblong translucent member (light guide) 3 to the exterior.

According to the present invention, the oblong translucent member (light guide) is given uneven light emission characteristics along the longitudinal direction thereof, thereby attaining almost uniform light emission characteristics along the longitudinal direction over the entire linear light source. Thus the difference in the light amount between an area close to the light source and an area far from the light source can be reduced, and there can thus be realized a linear light source showing reduced unevenness in the light amount on the illuminated surface.

Also there can be realized an illumination device with reduced unevenness in the light amount, by providing the translucent member with an area for reflecting and/or diffusing the light introduced into the member and specifying the position of the area.

Now the present invention will be clarified in detail by preferred embodiments thereof, shown in the attached drawings.

[Embodiment 1]

Figure 1A:
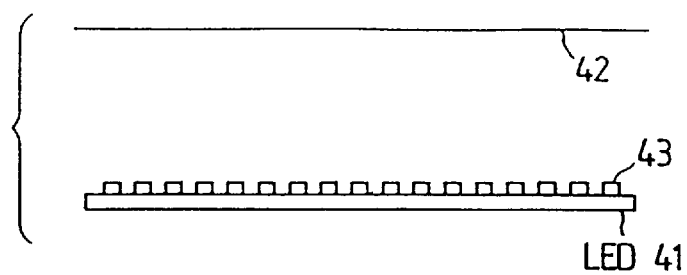
FIGS. 1A, 1B, 2A, 2B, 3 and 4 are views showing examples of the illumination device utilizing an LED array.
Figure 1B:
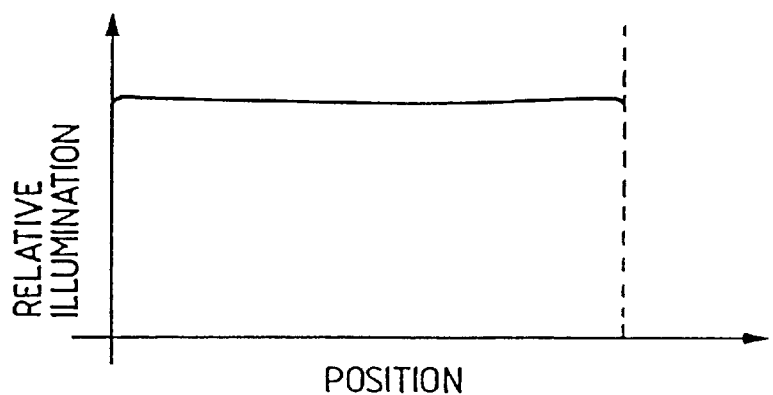
Figure 2A:
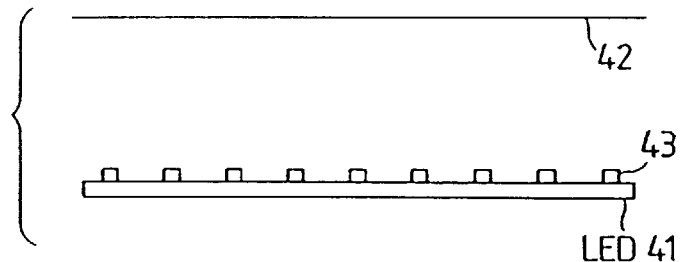
Figure 2B:
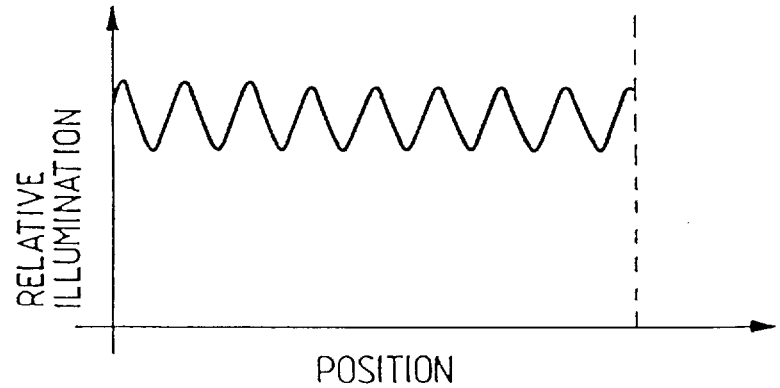
Figure 3:
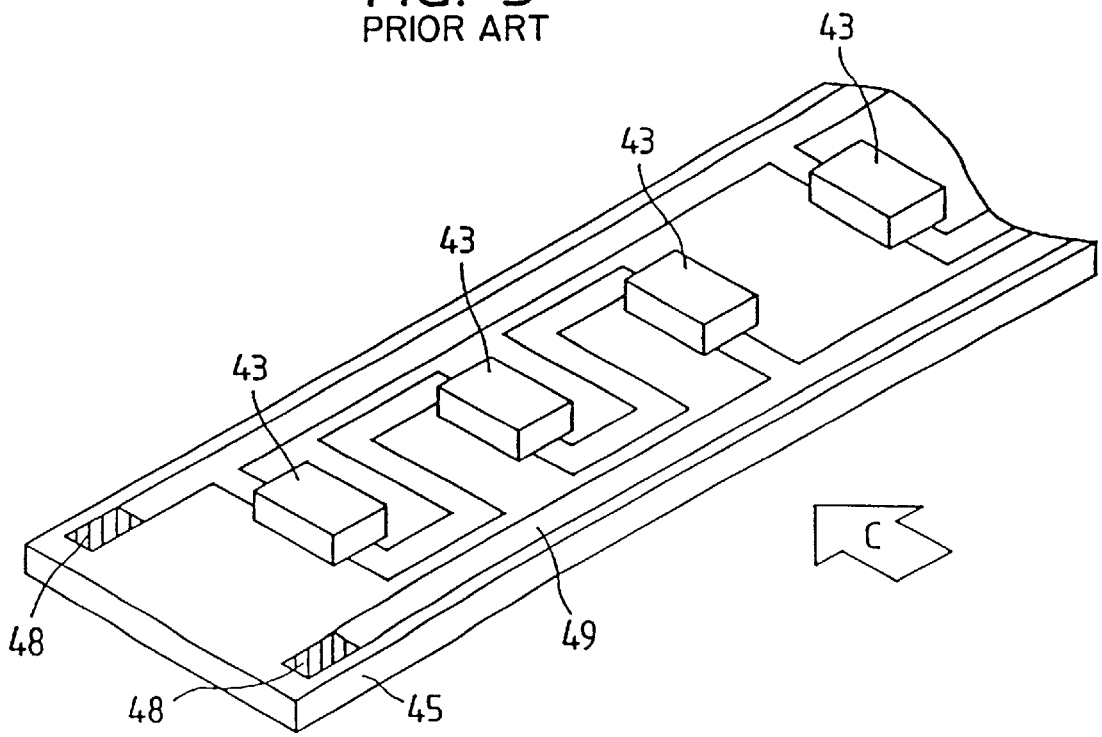
Figure 4:
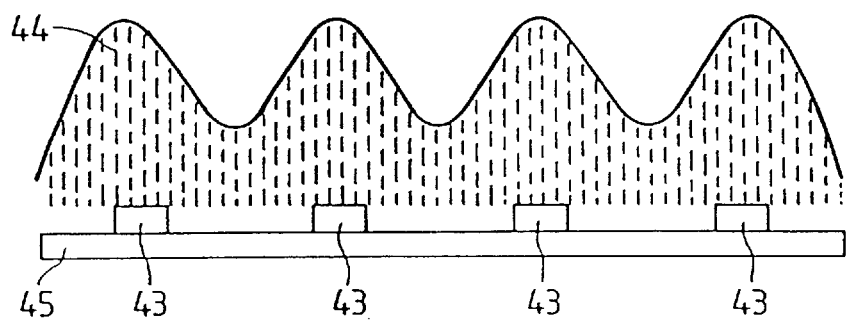
Figure 5:
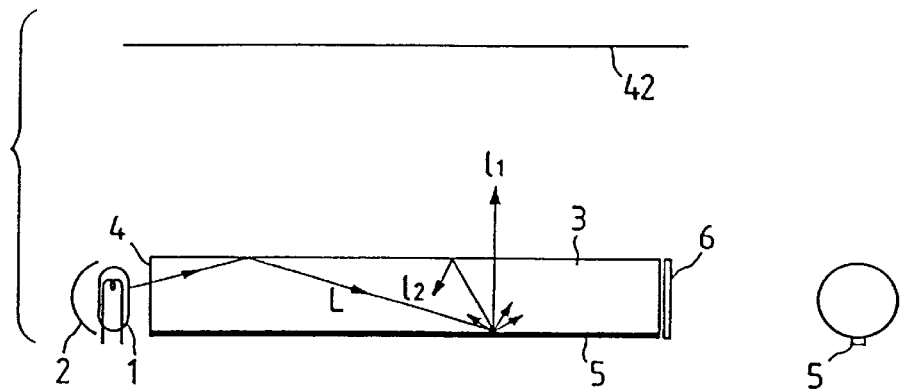
FIGS. 5, 6A and 6B are views showing examples of the illumination device utilizing a translucent member.
Figure 6A:
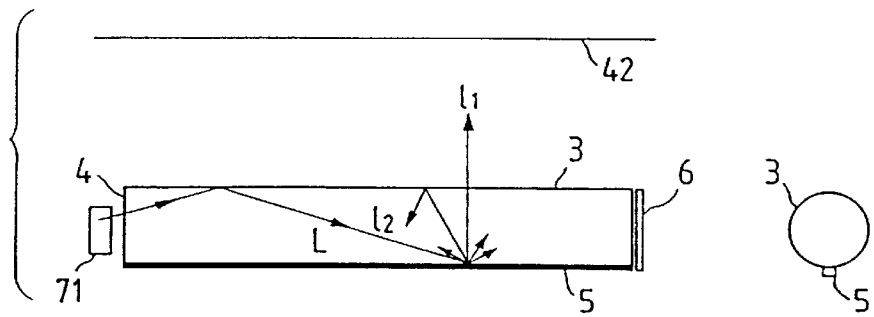
Figure 6B:
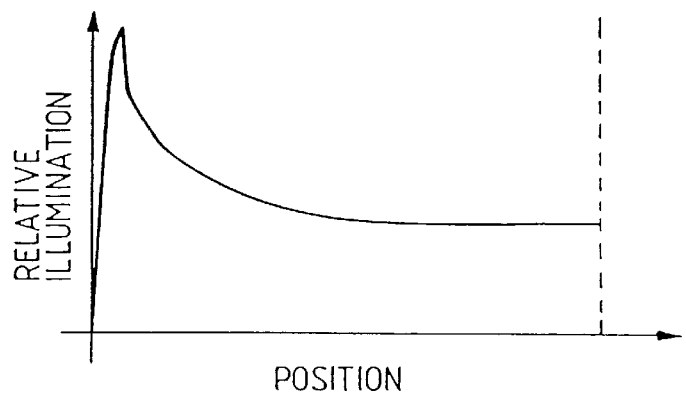
Figure 8:
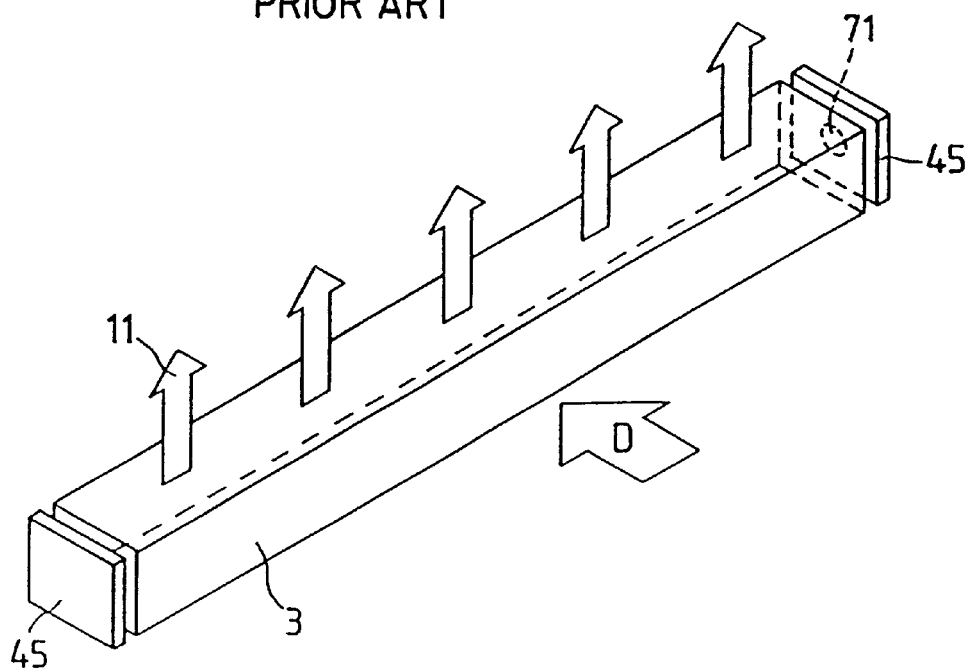
FIG. 8 is a view showing preferred embodiments of the light guide and the illumination device of the present invention.
Figure 9:
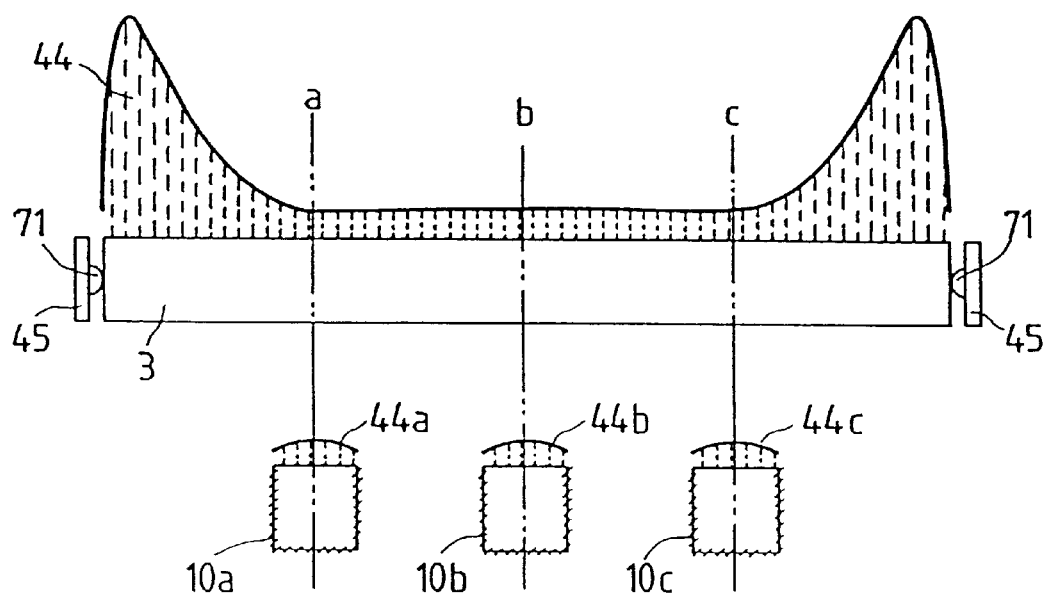
FIG. 9 is a view showing preferred embodiments of the light guide and the illumination device of the present invention.
Figure 10:
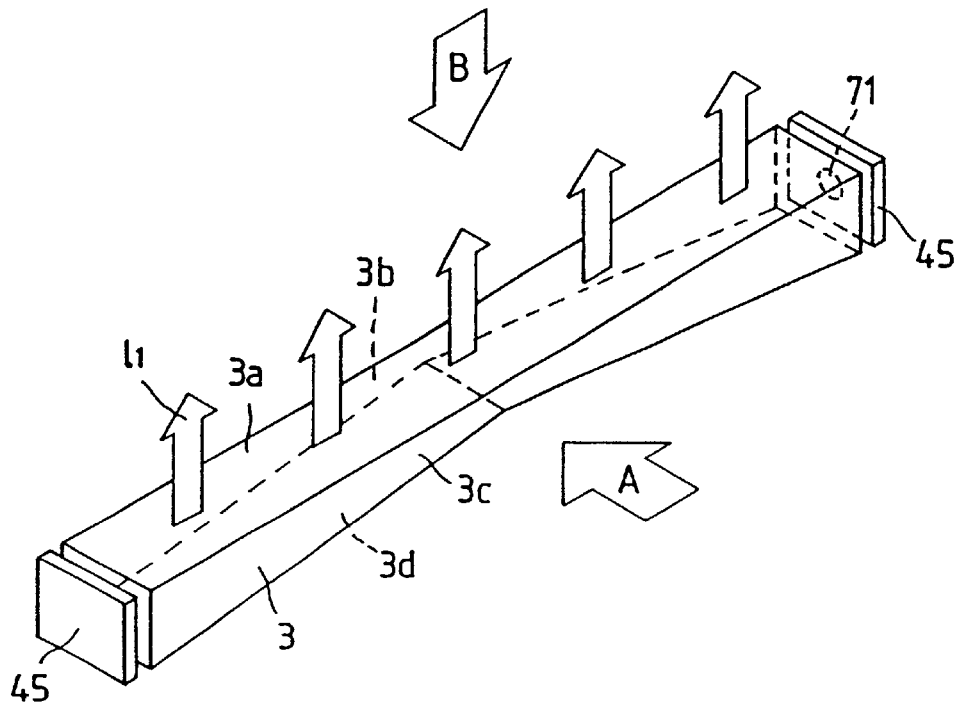
FIG. 10 is a view showing preferred embodiments of the light guide and the illumination device of the present invention.

FIG. 10 is a perspective view showing an embodiment 1 of the linear light source of the present invention, wherein shown are an oblong transparent (translucent) member 3, substrates 45; LED chips 71 mounted on the substrates 45, and a light emitting direction $l_1$. A lateral face 3a of the transparent member 3 constitutes the light emitting face, while other lateral faces 3b, 3c and 3d are formed as mirror faces to constitute light reflecting faces.

The oblong transparent member 3 is provided at both ends thereof with the LED chips 71 constituting the light sources, and the light therefrom enters the transparent member 3 from the end faces thereof and is emitted from the lateral face 3a in the direction $l_1$ either directly or after reflection on the lateral faces 3b, 3c, 3d. In this embodiment, the lateral face 3d is tapered so that the transparent member 3 has a smaller cross section at the center, whereby the light can be efficiently reflected in the direction $l_1$. In this embodiment, the lateral face 3d is inclined by a constant angle, but such a constant angle is not essential.

Figure 11:
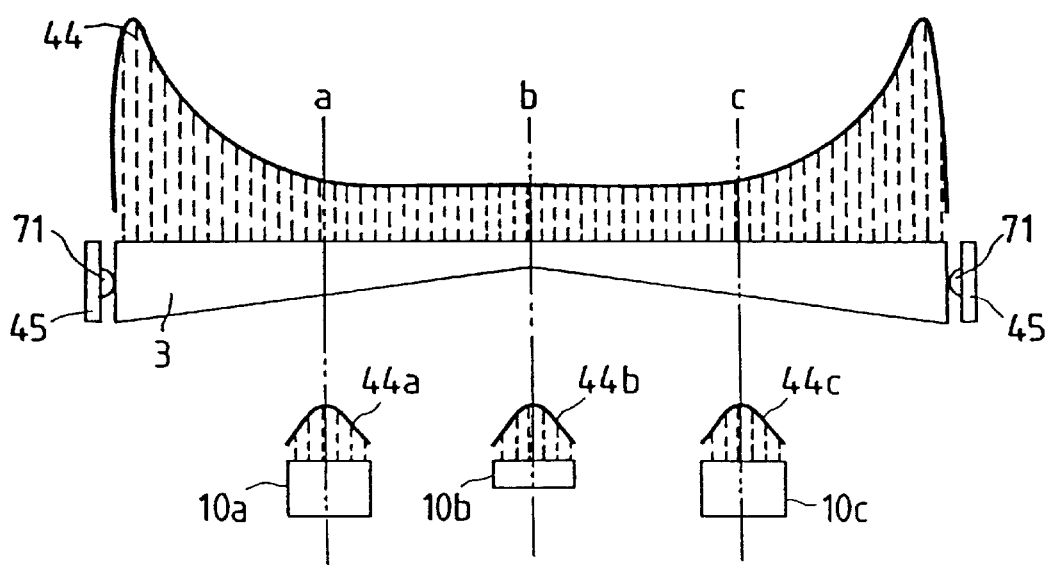
FIG. 11 is a view showing preferred embodiments of the light guide and the illumination device of the present invention.

FIG. 11 shows the elevation view of the light source seen from a direction A in FIG. 10 and the light intensity distribution on an illuminated surface (not shown), wherein a curve 44 shows the illumination intensity distribution, while 10a, 10b, 10c show the cross sections of the transparent member 3 at positions a, b, c, and 44a, 44b, 44c indicate the illumination intensity distributions at the positions. The present embodiment can provide a uniform light amount distribution with an increased amount of light in the area a–c.

[Embodiment 2]

Figure 12:
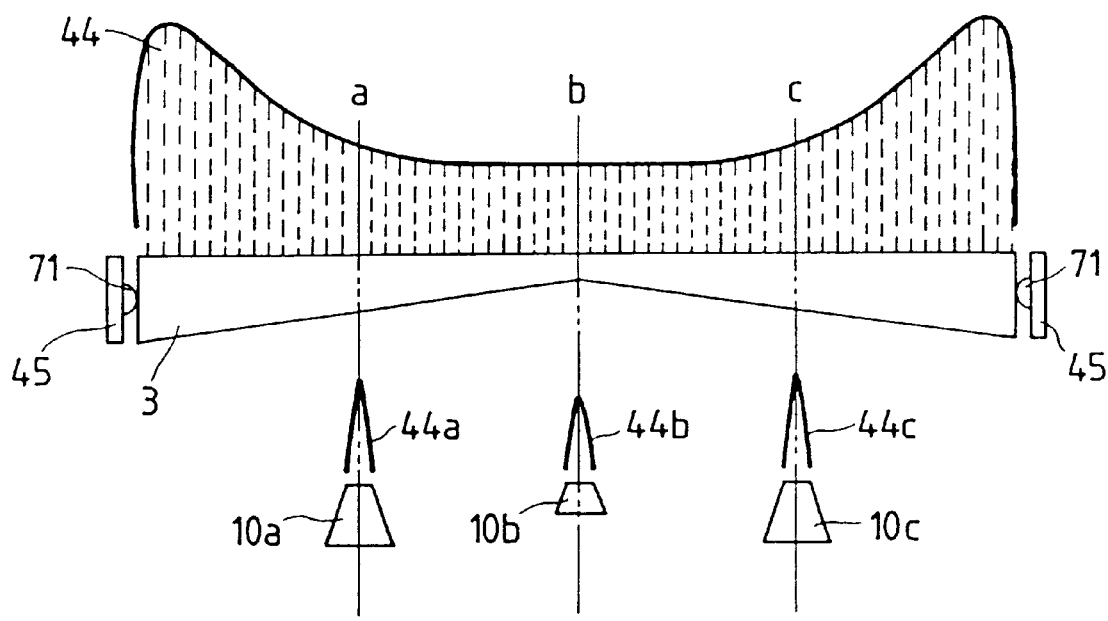
FIG. 12 is a view showing preferred embodiments of the light guide and the illumination device of the present invention.

FIG. 12 shows the elevation view of an embodiment 2 of the linear light source of the present invention, seen from the direction A shown in FIG. 10, and the light amount distribution on an illuminated surface (not shown). Components that are the same as those shown in FIGS. 10 and 11 are represented by the same numbers and will not be explained further.

Figure 13:
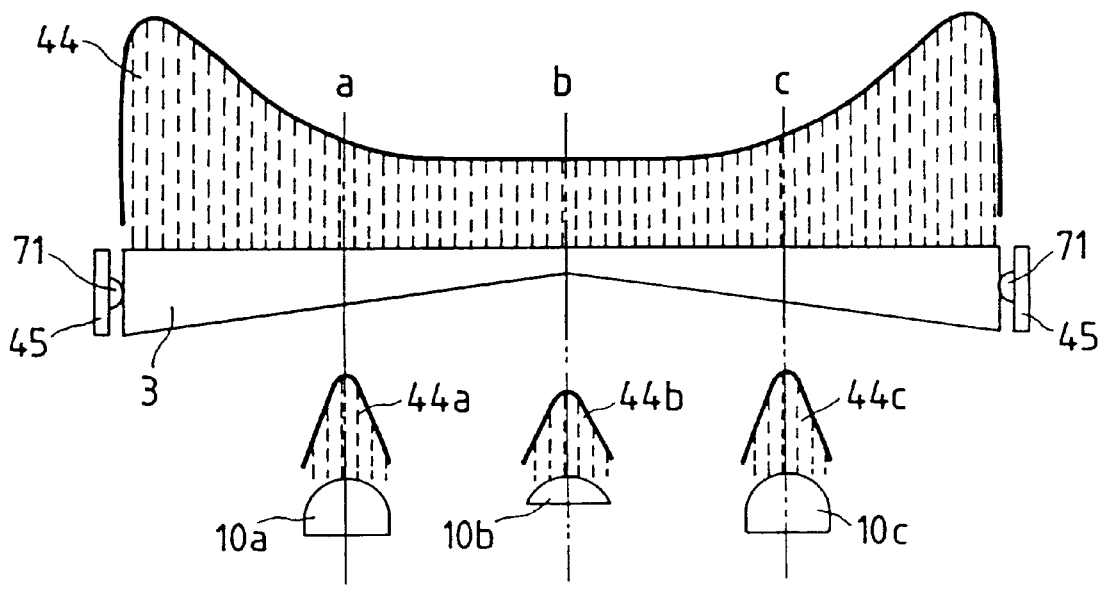
FIG. 13 is a view showing preferred embodiments of the light guide and the illumination device of the present invention.

In the present embodiment, the lateral face 3d of the oblong transparent member 3 is tapered so as to reduce the cross section thereof at the center as in Embodiment 1, and the transparent member 3 is formed so as to have a trapezoidal cross section having the shorter side at the light emitting face and the longer side at the opposite face. Such a trapezoidal cross section, as shown in FIG. 12, allows the light to be emitted in the transparent member 3, in a more condensed state, into the direction $l_1$, thereby increasing the illumination intensity on the illuminated surface, in comparison with Embodiment 1, within the area a–c. The cross section of the oblong transparent member 3 is not limited to the trapezoidal form but may also be formed as a partially cut-off circle, as shown in FIG. 13.

[Embodiment 3]

Figure 14:
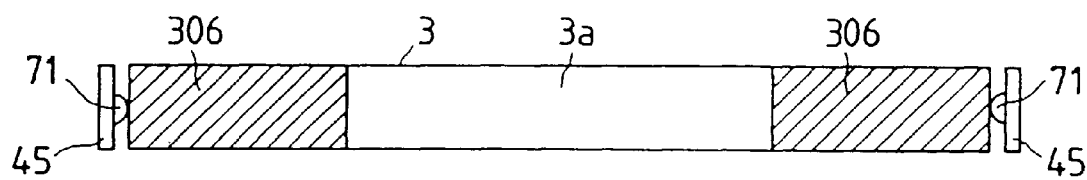
FIG. 14 is a view showing preferred embodiments of the light guide and the illumination device of the present invention.
Figure 16:
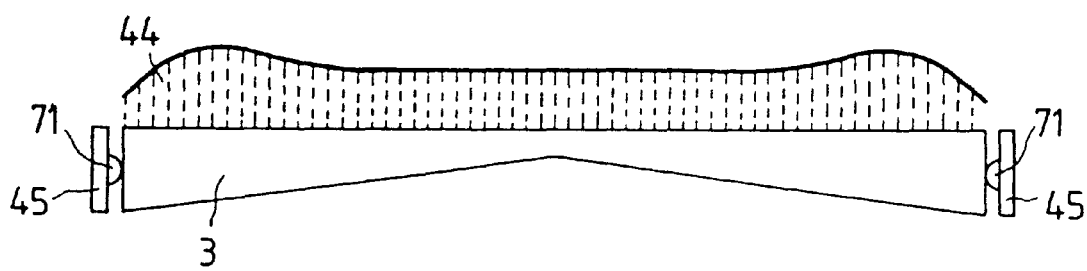
FIG. 16 is a view showing preferred embodiment of the light guide and the illumination device of the present invention.

FIG. 14 is a plan view of an embodiment 3 of the linear light source of the present invention, seen from a direction B shown in FIG. 10, and FIG. 16 shows the elevation view of the embodiment seen from a direction B shown in FIG. 10 and the light amount distribution. Components that are the same as those shown in FIGS. 10 and 11 are represented by the same numbers and will not be explained further.

As shown in FIG. 14, the oblong transparent member 3 of this embodiment is provided, in the vicinities of the light sources on the light emitting lateral face 3a, with light attenuating films 306, which attenuate the light emitted from the vicinity of the light sources, thereby providing a light amount distribution, as shown in FIG. 16, on the illuminated surface.

Figure 15:
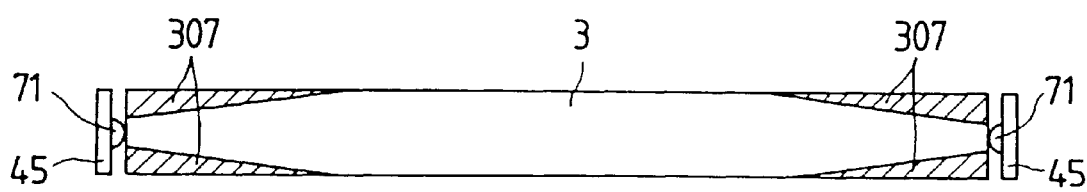
FIG. 15 is a view showing preferred embodiments of the light guide and the illumination device of the present invention.

The attenuating films 306 may be replaced by light shielding films 307 for reducing the light amount in the vicinity of the light source. FIG. 15 is a plan view showing an example in which the light shielding films are provided in the vicinities of the light sources, on the light emitting lateral face 3a of the oblong transparent member 3. The light amount distribution, as shown in FIG. 16, may also be obtained on the illuminated surface by intercepting the light in the vicinity of the light source by means of the light shielding films 307 as shown in FIG. 15.

[Embodiment 4]

FIGS. 17A to 17C are schematic views of an embodiment 4 of the illumination device of the present invention, wherein FIG. 17A is a schematic lateral view of the device, illustrated together with an original constituting the illuminated surface, FIG. 17B is a schematic cross-sectional view of the translucent member 3 and an area 5, cut in a plane perpendicular to the plane of FIG. 17A, and FIG. 17C is a schematic lateral view of the device, seen from a direction A shown in FIG. 17A. As shown in these drawings, the illumination device of this embodiment is provided with an LED light source 8 at an end face in the longitudinal direction of a translucent member 3 of a rectangular cross section, and with an area 5 for reflecting (or diffusing) the light beam, provided in a part of the translucent member 3 on a face opposed to the light emitting area thereof and formed by a coarse surface or by a coating with light diffusing-reflecting paint. On the end face opposite to the LED light source 8, there is formed a reflecting portion 6 adapted to reflect the light propagating in the translucent member 3 and formed by evaporation of a metal such as aluminum or by coating of light diffusing-reflecting paint on the end face itself of the translucent member 3 or by forming such means as a separate member.

In this embodiment, as shown in FIG. 17C, the center of the LED light source is aberrated (with an offset) from the normal line passing through the center of the shorter width of the area 5.

The light beam emitted from the LED light source 8 normally propagates inside the translucent member by repeated reflections therein, and returns toward the LED light source 8 after reaching the reflecting portion 6. Also, the light entering the area 5 in the course of propagation is diffused or reflected therein and emitted through the exit portion toward the original constituting the illuminated surface ($l_1$) or propagates again within the translucent member by reflections therein ($l_2$).

In this embodiment, since the LED light source 8 is aberrated from the normal line passing through the center of the width of the area 5, the light directly entering the area 5 from the LED light source 8 is reduced, so that there can be sufficiently resolved the unevenness that the illumination intensity is higher only at the side of the LED light source 8 in the longitudinal direction of the translucent member 3. Also since the light entering the area 5 is principally the indirect light reflected inside the translucent member 3 after being emitted from the LED light source 8, the light beam emitted from the exit portion is made uniform over the longitudinal direction of the translucent member 3.

These situations will be explained further in the following, with reference to the attached drawings.

FIG. 18 shows a lateral face that is the same as that shown in FIG. 17C, wherein a part of the light emitted from the LED light source 8 is indicated by arrows $l_3$, $l_4$, which respectively indicate direct and indirect lights from the light source 8.

In the present embodiment, since the LED light source 8 is aberrated from the normal line passing through the center of the area 5, the proportion of the direct light 13 decreases while that of the indirect light $l_4$ increases, so that the light beam emitted from the exit portion can be made uniform over the entire translucent member 3.

The amount of the aberration of the LED light source 8 is defined as at least out of the normal line passing through the center of the area 5, but it should be suitably determined in practice, because in case of an excessively large amount of aberration, the light coming from the LED light source 8 is mostly composed of the indirect light and there will also result in a loss of the light beam in the translucent member 3. In particular, an extremely large aberration should he avoided since the illumination intensity becomes lower at the side of the LED light source 8.

Figure 19A:
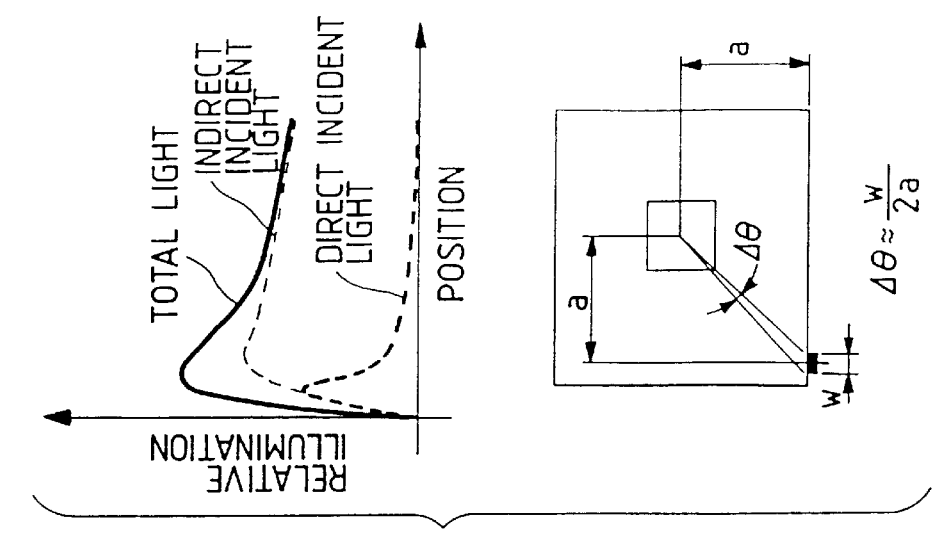
FIGS. 19A to 19C are views showing preferred embodiments of the light guide and the illumination device of the present invention.
Figure 19B:
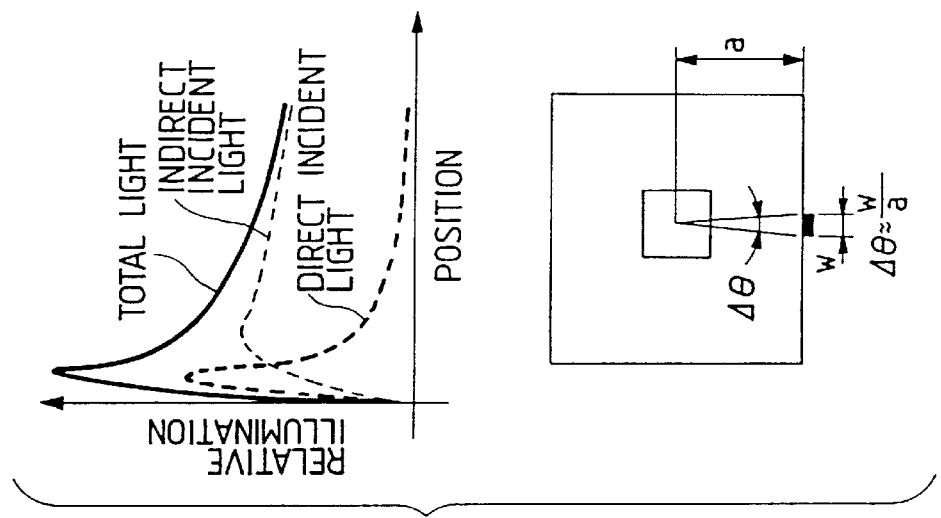
Figure 19C:
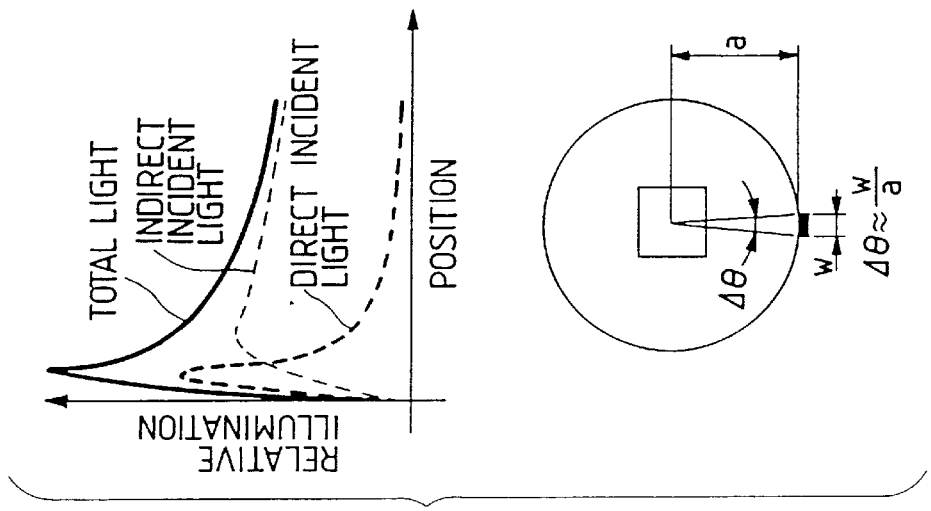

FIGS. 19A to 19C are given for explaining the difference between the illumination device of the present embodiment and other illumination devices. In these drawings there are shown schematic lateral views of the translucent member and the LED light source, seen from a direction similar to the direction A in FIG. 17A and corresponding illumination intensity distributions along the longitudinal direction of the translucent member. FIGS. 19A and 19B illustrate a reference example to be compared with the device of the present embodiment, while FIG. 19C illustrates the device of the present embodiment.

FIG. 19A shows an example employing a translucent member of circular cross section, which is positioned so that the center thereof coincides with the center of the LED light source and the center lies on the normal line passing through the center of the area 5. Also FIG. 19B shows an example employing a translucent member of rectangular cross section, which is positioned so that the crossing point of the diagonals of the rectangular cross section coincides with the center of the LED light source and the center lies on the normal line passing through the center of the area 5.

On the other hand FIG. 19C shows an example of the illumination device of the present embodiment, employing a translucent member of rectangular cross section, wherein the center of the LED light source 8 is aberrated by a distance "a" from the normal line passing through the center of the width of the area 5.

In all the cases, the center of the light source is separated by a same distance "a" from a face of the translucent member on which the area 5 is formed.

The light emitted from the LED light source 8 and introduced into the translucent member can be divided into direct incident light entering the area 5 directly without any reflection on the internal walls of the translucent member, and indirect incident light entering the area 5 after at least a reflection on the internal walls of the translucent member.

The amount of the direct incident light depends on the angle $\Delta\theta$ of the area 5 seen from the LED light source 8, and increases with an increase in the angle. In the arrangements shown in FIGS. 19A and 19B, where the LED light source is positioned directly above the area 5, the angle can be represented as $\Delta\theta = \{2\tan^{-1}(w/2)/2\} \equiv w/a$, wherein "w" is the width of the area 5 and "a" is the distance along the normal line from the LED light source to the light exit face.

On the other hand, in the present embodiment shown in FIG. 19C, wherein the LED light source is not positioned directly above the area 5 but is aberrated laterally by a distance "a", the angle can be represented as $\Delta\theta = 2\tan^{-1}\{(w/2\times2^{1/2})/2^{1/2}\times a\} \equiv w/2a$ and is therefore about a half of the angle that is depicted in the arrangements shown in FIGS. 19A and 19B.

For this reason, the amount of the direct incident light becomes lower in the present embodiment than in the conventional configurations. On the other hand, the amount of indirect incident light increases correspondingly. As a result, the entire illumination intensity distribution is improved, because of the relaxation of the peak in the vicinity of the LED light source.

These situations will be readily understood from the curves of the relative illumination intensity as a function of the distance from the light source. In the case of FIGS. 19A and 19B, the direct incident light has a peak and shows a high light amount at the side of the light source, so that the total light amount, consisting of the direct and indirect incident lights, is uneven, having a peak at the side of the light source. On the other hand, the present embodiment shown in FIG. 19C provides a uniform light amount over the entire device, though the light amount at the light source side is lowered. Consequently, the illumination device of the present embodiment is more convenient for use.

[Embodiment 5]

FIGS. 20A to 20C show a variation of the illumination device of the present invention shown in FIGS. 17A to 17C. The variation is different from the latter in that the translucent member 3 is provided with a protruding portion 35, and the area 5 is formed on an end face of the protruding portion 35, in order to further reduce the direct incident light from the LED light source.

As the area 5 is formed on the lower face of the protruding portion 35, extended from a face 31 of the translucent member 3, as shown in FIGS. 19A to 19C, the amount of direct incident light from the LED light source to the area 5 becomes smaller in comparison with the case shown in FIGS. 17A to 17C. Stated differently, most of the light emitted from the LED light source does not enter the area 5 directly but after at least a reflection within the translucent member 3.

Thus, in the illumination device shown in FIGS. 20A to 20C, the amount of direct incident light decreases and the proportion of the indirect incident light becomes even higher. In comparison with the case shown in FIG. 19C, the illumination intensity at the light source side is lower due to the decreased proportion of the direct incident light, and the illumination intensity of the indirect incident light increases, though slightly, due to the increased proportion of the indirect incident light.

Consequently, in the configuration shown in FIGS. 20A to 20C, providing the translucent member 3 with a protruding portion and forming the area 5 on the end face thereof allows obtaining a higher illumination intensity with improved uniformity.

[Embodiment 6]

FIGS. 21A to 21C show another variation of the device shown in FIGS. 17A to 17C. In this variation, the translucent member 3 is extended to a side opposite to the LED light source, with respect to the area 5.

Such a configuration achieves more uniform illumination intensity for the indirect incident light, so that, though the illumination intensity is higher at the light source side, the illumination intensity becomes more uniform in the remaining portion excluding a part at the light source side.

[Embodiment 7]

Figure 22B:
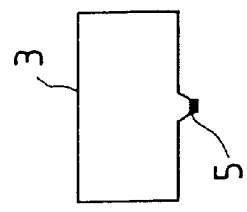
FIGS. 22A to 22C are views showing preferred embodiments of the light guide and the illumination device of the present invention.
Figure 22A:
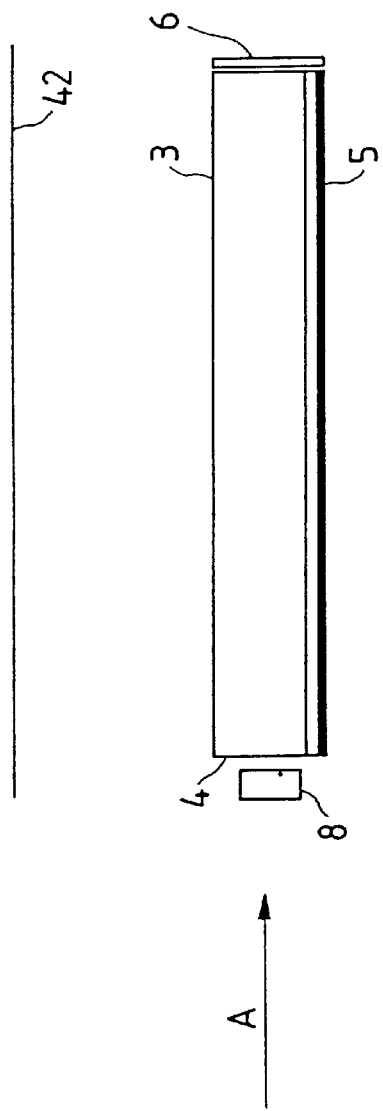
Figure 22C:
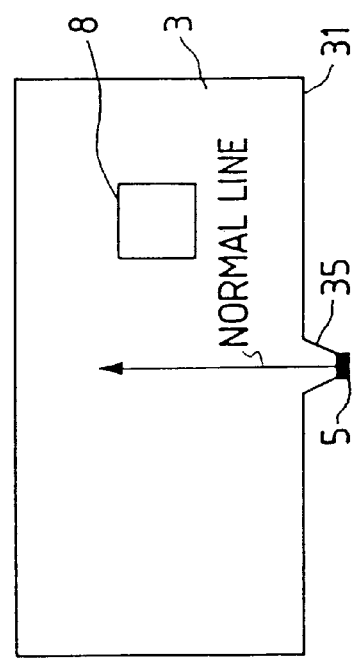

FIGS. 22A to 22C show an illumination device in which the configurations shown in FIGS. 20A to 20C and FIGS. 21A to 21C are combined. More specifically, the translucent member is provided, on a face opposite to the light exit face, with a protruding portion 35, and the area 5 is formed on the end face of the protruding portion 35, and the translucent member 3 is extended to a side opposite to the light source 8 with respect to the area 5.

In such a combined structure, the area 5 principally receives the indirect incident light more reflected within the translucent member 3, so that the illumination intensity distribution becomes more uniform for the indirect incident light. The situation for the direct incident light is similar to the configuration shown in FIGS. 20A to 20C.

Consequently, the total illumination intensity becomes more uniform in comparison with the case shown in FIGS. 20A to 20C, since the contribution of the indirect incident light is made more uniform.

[Embodiment 8]

The light amount of the LED light source is less than that of the incandescent electric bulb. For increasing the light amount, the number of the LED chips can be increased.

For positioning a larger number of the LED light sources while satisfying the principle of the present invention, the end face of the translucent member, where the LED light sources are to be positioned, can be made larger.

Figure 23A:
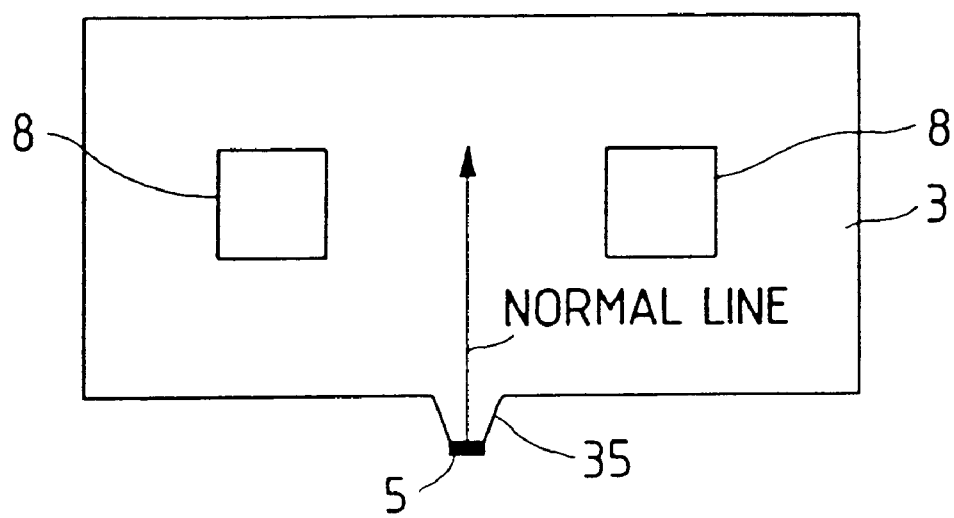
FIGS. 23A and 23B are views showing preferred embodiments of the light guide and the illumination device of the present invention.

For example, as shown in FIG. 23A, an increase in the light amount can be achieved by positioning an LED light source 8 also on the extended side of the translucent member 3. In such a case, both the direct and indirect incident lights to the area 5 increase, but the illumination intensity can be made more uniform over the entire area, without local increase at the side of the LED light source 8, by suitably balancing the amounts of the direct and indirect incident lights from the LED light source 8 to the area 5 (for example, by suitably separating the position of the LED light source 8 from the protruding portion 35 (area 5)).

Figure 23B:
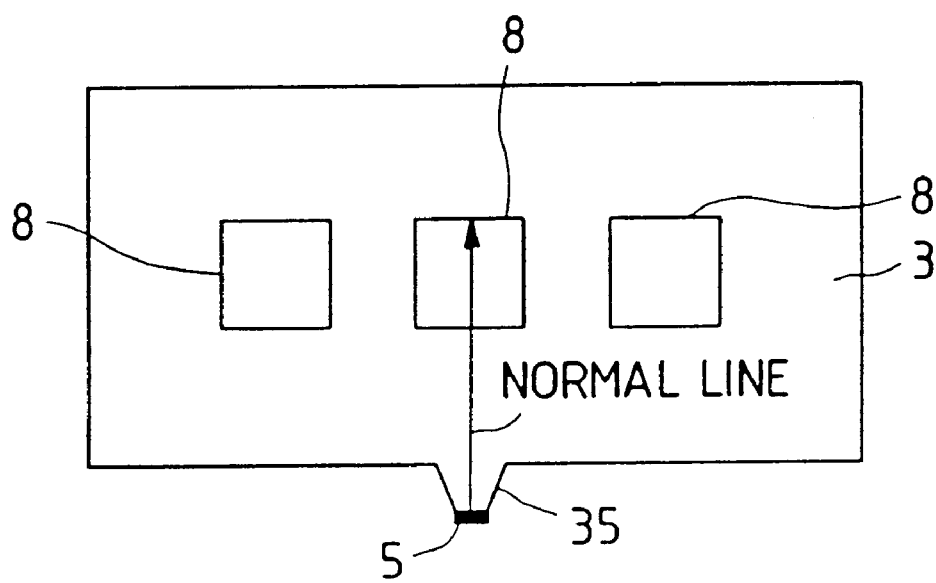

On the other hand, if the LED light sources 8 on both sides of the area 5 (protruding portion 35) are separated from the area 5, the illumination intensity may decrease at the side of the LED light sources 8 due to the decrease of the direct incident light into the area 5 and may increase at the side far from the LED light sources 8 due to the increased proportion of the indirect incident light into the area 5. In such a case, there may be provided an additional LED light source 8, as shown in FIG. 23B, in a position corresponding to the area 5 (protruding portion 35) of the translucent member. Such an arrangement increases the illumination intensity both at the side of the LED light sources 8 and at the side far therefrom. Naturally, such an arrangement of the LED light sources 8 is to be designed in consideration of the balance of the direct and indirect incident lights into the area 5.

Since the illumination intensity of the illumination device is approximately proportional to the number of the LED chips, the configuration as shown in FIG. 23A or 23B enables an additional increase in the illumination intensity.

The arrangement of the LED light sources as shown in FIG. 23A or 23B, which has little effect on the size of the illumination device in comparison with those shown in FIGS. 21A to 21C and 22A to 22C, is desirable in case a higher illumination intensity is required.

[Embodiment 9]

For achieving a more uniform and higher illumination intensity, it is desirable, instead of providing the LED light source 8 only at an end face of the translucent member 3 as in the foregoing embodiments, to provide the LED light sources 8 on both end faces of the translucent member 3.

An example of such an arrangement is shown in FIGS. 24A to 24C, wherein FIG. 24A is a schematic lateral view of the illumination device of the present embodiment, illustrated together with an original constituting the illuminated surface, while FIG. 24B is a schematic cross-sectional view of the translucent member 3 and the area 5 along a plane perpendicular to the plane of FIG. 24A, and FIG. 24C is a schematic lateral view of the illumination device seen from a direction A shown in FIG. 24A.

As shown in these drawings, the illumination device of the present embodiment is provided with the LED light sources 8 on both end faces of the translucent member 3, so that the illumination intensity can be increased further and the distribution of the illumination intensity can be made symmetrical along the longitudinal direction of the translucent member 3. Also in the foregoing embodiments 4 to 8, there may naturally be provided the LED light sources 8 on both end faces of the translucent member 3. Such LED light sources 8 are preferably provided in the same number and arranged in a similar manner on both end faces, but such conditions are not essential.

[Embodiment 10]

Figure 41:
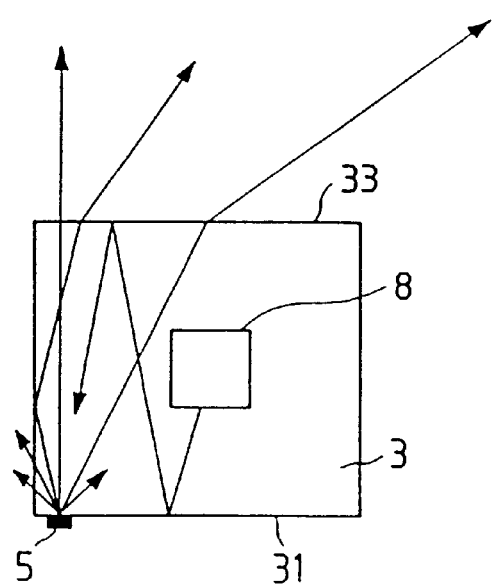
FIG. 41 is a view showing preferred embodiments of the light guide and the illumination device of the present invention.
Figure 44A:
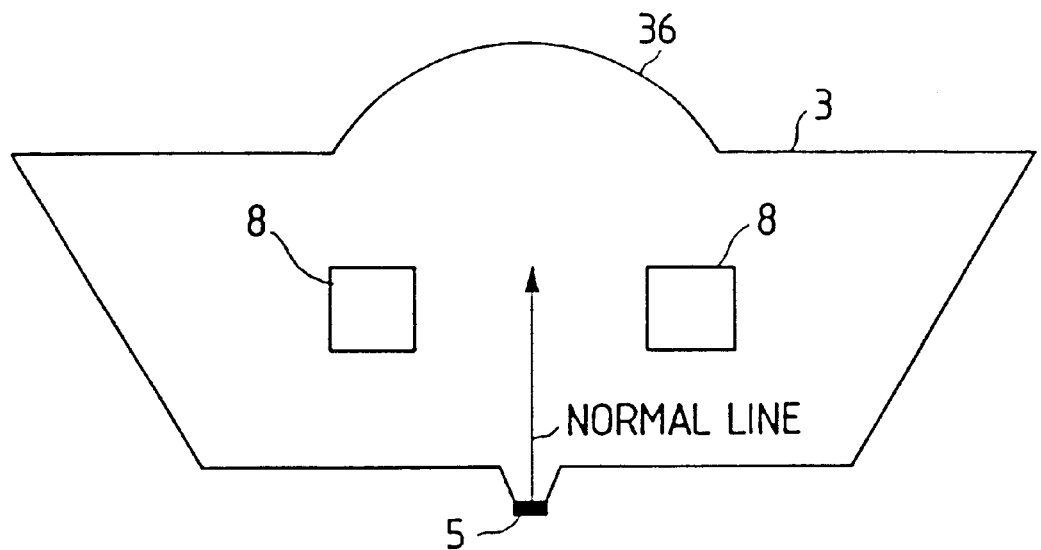
FIGS. 44A and 44B are views showing preferred embodiments of the light guide and the illumination device of the present invention.
Figure 44B:
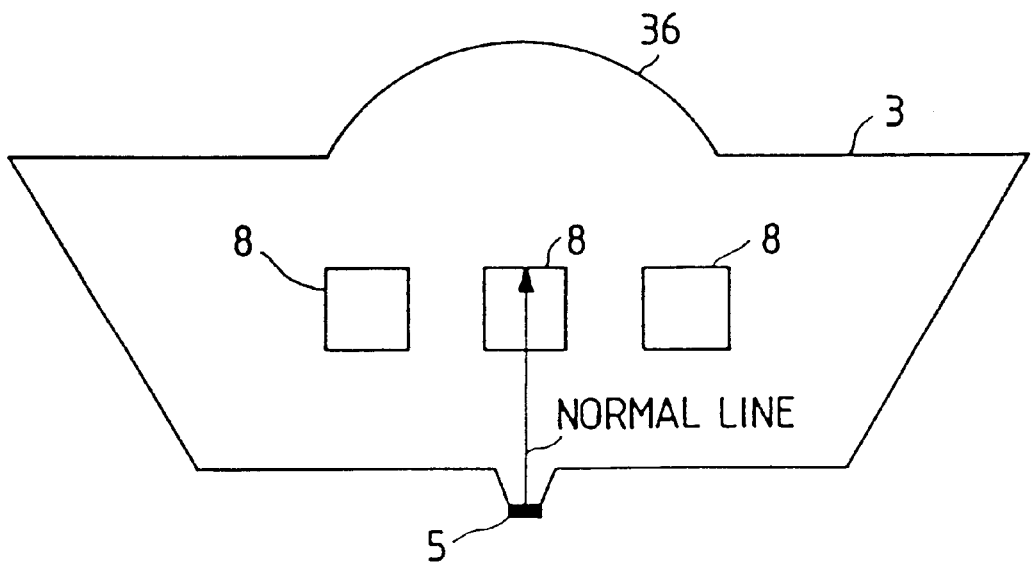

In an information processing apparatus, such as a facsimile apparatus, the area read by the line sensor in a scanning period, in a direction perpendicular to the scanning direction, namely in the direction of relative movement between the original and the sensor, is not so large. Also, among the light scattered and/or reflected in the area 5, only a portion emitted from the exit portion opposite to the illuminated surface contributes to the illumination thereof, as illustrated in FIG. 41, and, since the admitted light is diffuse, the illumination intensity on the illuminated surface declines rapidly with an increase in distance from the light exit portion of the translucent member 3 to the illuminated surface.

Therefore, if a higher illumination intensity is desired, it is effective to condense the light, emitted from the translucent member 3, by means of a lens.

FIGS. 25A to 25C show an example of such an arrangement, in which a cylindrical lens 9 is provided, facing the illuminated surface and along the translucent member 3 of the illumination device shown in FIGS. 24A to 24C. As shown in FIGS. 25A to 25C, the cylindrical lens 9 is effectively positioned so that the center thereof corresponds to the area 5, but such positioning is not essential as long as the necessary illumination intensity can be obtained.

Such a lens arrangement, being capable of illumination of the illuminated surface by condensation of the light emitted from the translucent member 3, allows increasing the average illumination intensity, though the distribution thereof is substantially not affected.

Such an arrangement enables the use of a sensor of a lower sensitivity, or image reading with higher speed if the sensitivity of the sensor is not changed. It can also resolve the loss in the light amount resulting from the color filters used in color image reading, while maintaining a sufficiently high image reading speed.

[Embodiment 11]

The above-explained area 5, formed by a coarse surface or by coating with the light diffusing paint can uniformly diffuse the incident light, but it is not satisfactory in terms of the efficiency of utilization of the light emitted from the LED light source 8, since a proportion of the light returns to the end face of the translucent member 3. To further increase the average illumination intensity, therefore, the above-mentioned area 5 may be replaced by a reflecting face of sawtooth shape.

FIGS. 26A to 26C show an embodiment in which the area 5 of the illumination device, shown in FIGS. 17A to 17C, is formed as a reflecting face of sawtooth shape. The sawtooth-shaped reflecting face of the area 5 can be formed, in a part of the lateral face of the translucent member 3, by integral molding with the translucent member 3, or by cutting work thereon, or by adhesion of a separate sawtooth-shaped member onto the lateral face of the translucent member 3 with adhesive material or by ultrasonic adhesion. Among these, the integral molding with the translucent member 3 is preferable in consideration of the cost and the decrease of the manufacturing steps. The surface of the area 5 constituting the sawtooth-shaped reflecting face is preferably subjected to the evaporation of a bright metal such as aluminum or silver.

As shown in FIG. 26A, a part of the light emitted from the LED light-source 8 enters the area 5, is reflected by the reflecting face of the area 5 and illuminates the illuminated surface. Since the area 5 in this case is not composed of a coarse surface or a coating of the light diffusing paint, the light entering the area 5 is substantially not subjected to diffuse reflection. Consequently, the incident light is efficiently reflected toward the illuminated surface.

Figure 27:
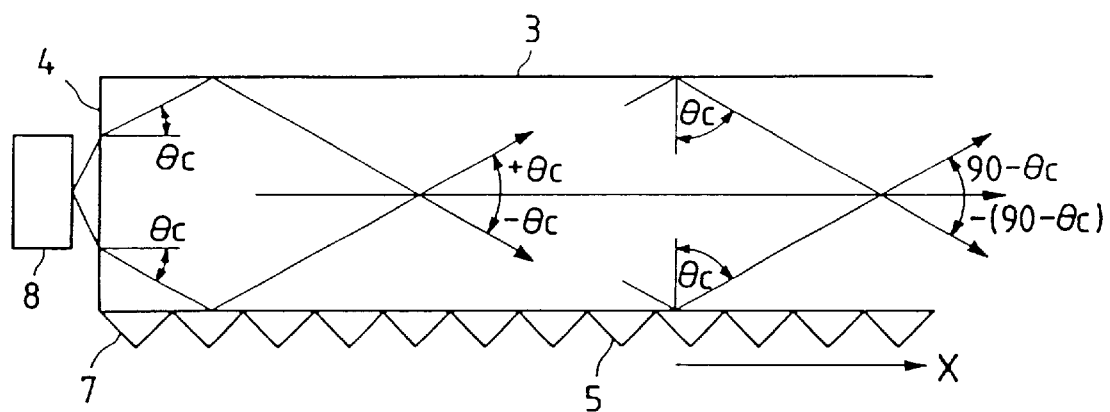
FIG. 27 is a view showing preferred embodiments of the light guide and the illumination device of the present invention.
Figure 28:
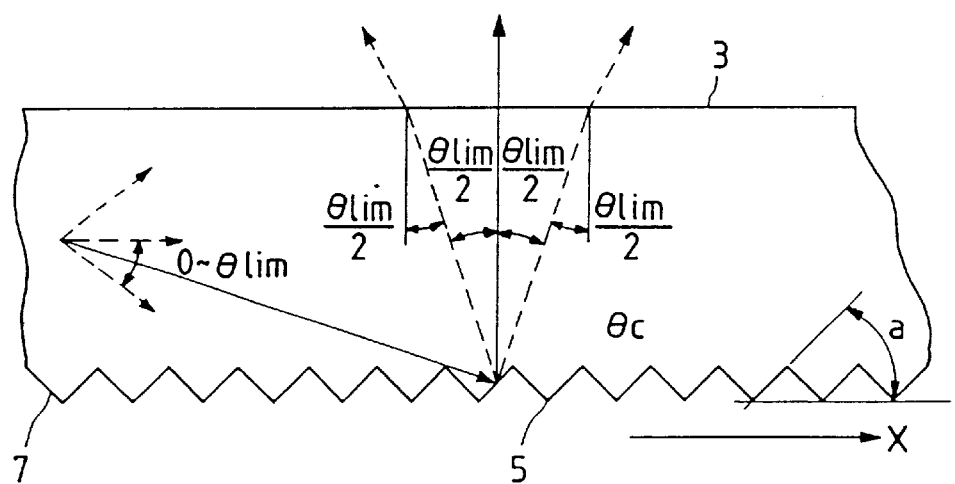
FIG. 28 is a view showing preferred embodiments of the light guide and the illumination device of the present invention.

Now reference is made to FIGS. 27 and 28 for further explaining the sawtooth-shaped reflecting face constituting the area 5.

FIG. 27 is a schematic cross-sectional view of the translucent member 3, and FIG. 28 is a partial magnified view of FIG. 27. The light L emitted from the LED light source 8 enters the translucent member 3 through the entrance end face 4, and propagates in the translucent member 3, repeating reflections therein. A part of the light L reaches the sawtooth-shaped reflecting face 7 of the area 5 after being reflected in the translucent member 3, then is reflected in the area 5 and emerges from the translucent member 3.

In this manner, the light from the LED light source 8 enters the reflecting faces 7, arranged along the X-direction, of the area 5, then is reflected by the reflecting faces and is taken out to the exterior.

The angle $\theta$ of the incident light from the LED light source 8 to the X-axis in the translucent member satisfies a relation $-\theta_c<\theta<\theta_c$, wherein $\theta_c$ is the critical angle determined by the refractive indexes of the translucent member and of the external medium (normally air).

Also, when the light propagates by repeating total reflections on the lateral face of the translucent member, the angle $\theta$ of such propagating light satisfies a condition $-(90-\theta_c)<\theta<(90-\theta_c)$, because the light has to have an angle exceeding the critical angle $\theta_c$ with respect to the normal line to the lateral face.

Consequently, in order that the light beam emitted from the LED light source 8 and entering the translucent member through the end face thereof can propagate in the member by repeated reflections, the angle $\theta$ of the light beam with respect to the X-axis has to satisfy the narrower one of the above-mentioned two conditions.

If $\theta_{lim}$ is taken as the smaller one of $\theta_c$ and $(90-\theta_c)$, there should be satisfied a condition $-\theta_{lim}<\theta<\theta_{lim}$.

In order that the light beam can enter and be reflected by the sawtooth-shaped reflecting faces 7, the angle $\theta$ of the light beam has to be in the negative range, or a range from 0 to $-\theta_{lim}$, as shown in FIG. 28. If the angle $\alpha$ of each reflecting face 7, with respect to the X-axis, is selected as $\alpha=\{90+(-\theta_{lim}/2)\}/2$, the light beam is reflected within an angular range of $90°±(\theta_{lim}/2)$ with respect to the X-axis and is released to the exterior through an exit area positioned opposite to the area 5. If the exit area and the X-axis are substantially parallel, the incident angle of the light beam to the exit area does not exceed $(\theta_{lim}/2)$. Since $\theta_{lim}$ is defined as the smaller one of $\theta_c$ and $(90-\theta_c)$, there stands a relation $\theta_{lim} \leq \theta_c$, indicating that the incident angle to the exit area is smaller than the critical angle.

Consequently, there is reduced the proportion of the light which is totally reflected on the exit area, then proceeds inversely in the translucent member and is released from the entrance end face thereof, and there is obtained an illumination device of a higher illumination intensity, with a higher efficiency of utilization of the light.

Even if the above-mentioned angle $\alpha$ does not completely coincide with the foregoing definition $\{90+(-\theta_{lim}/2)\}/2$, a similar effect can be obtained as long as a condition: $(90-\theta_c)<\alpha<(90+\theta_c-\theta_{lim})$ is satisfied, because the incident angle of the light beam reflected by the sawtooth-shaped reflecting faces 7 and entering the exit area exceeds the critical angle $\theta_c$.

For example, if the translucent member 3 is composed of acrylic resin, there is obtained a condition $\theta_{lim}=\theta_c \equiv 42°$. Thus, by selecting the angle a as $\{90+(-42/2)\}/2=34.5 \equiv 35°$, it is possible to efficiently take out the light beam, entering from the LED light source 8, from the translucent member 3. In terms of the angle $\alpha$ mentioned above, this corresponds to a condition $24°<\alpha<47°$.

If the diameter of the translucent member 3 is sufficiently smaller than the length thereof, the light propagating therein is almost uniformly distributed within a range from $+\theta_{lim}$ to $-\theta_{lim}$. It is therefore preferable to select the angle $\alpha$ as close as possible to $90+(-\theta_{lim}/2)$ because the principal ray of the emerging light beam becomes perpendicular to the exit area.

FIGS. 29A to 29C and 30A to 30C respectively show variations of the illumination devices shown in FIGS. 20A to 20C and 21A to 21C, wherein the area 5 is modified to the sawtooth-shaped reflecting faces 7.

Such sawtooth-shaped reflecting faces formed on the end face of the protruding portion 35 allow not only to reduce the unevenness in the illumination intensity but also to increase the average illumination intensity.

[Embodiment 12]

Figure 33:
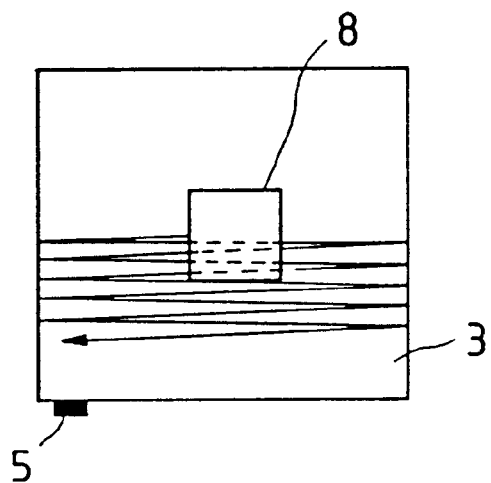
FIG. 33 is a view showing preferred embodiments of the light guide and the illumination device of the present invention.
Figure 36A:
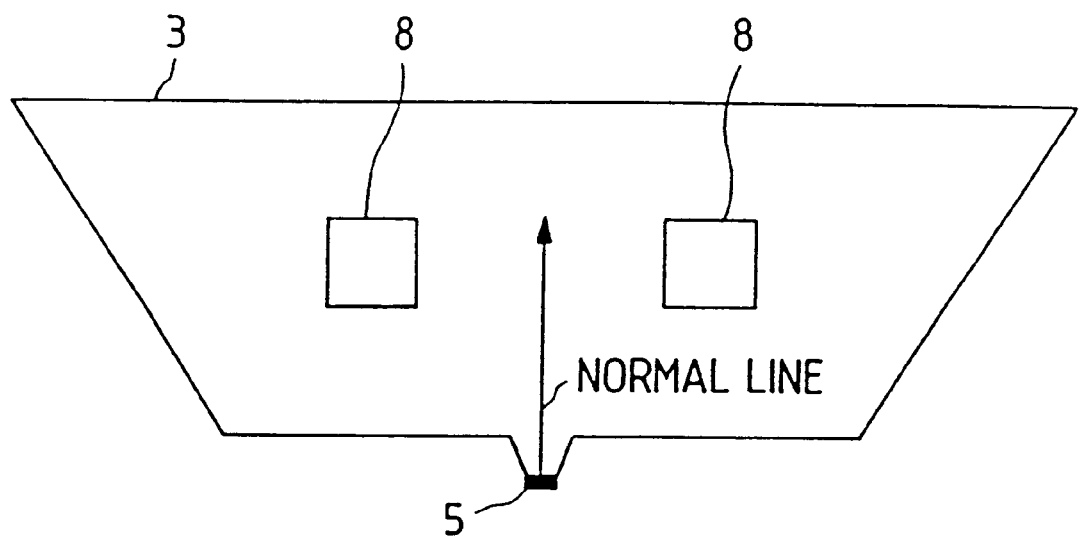
FIGS. 36A and 36B are views showing preferred embodiments of the light guide and the illumination device of the present invention.
Figure 36B:
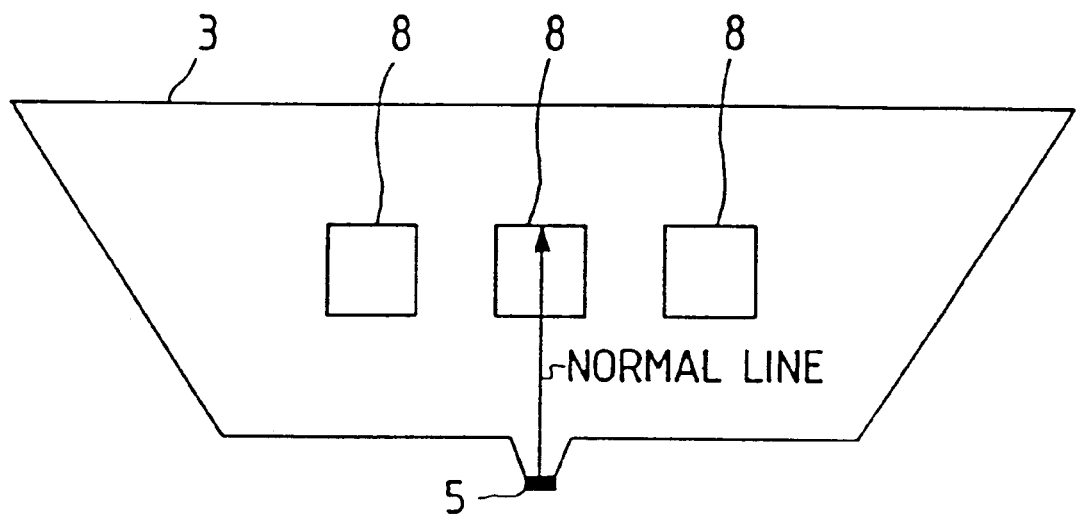

As explained in the foregoing, the light entering the translucent member 3 may be released to the exterior upon reaching the end face thereof, and such phenomenon results in a lowered efficiency of light utilization. Such loss is mostly represented by a proportion of the light that has never entered the area 5 during repeated reflections within the translucent member 3. Also, among the light emitted from the LED light source 8, an angular component perpendicular to the lateral faces of the translucent member 3 or close thereto repeats the reflections between the lateral faces, as shown in FIG. 33, and does not easily enter the area 5. It is therefore possible to further improve the illumination efficiency by causing a reflection so as to facilitate the entry of the light into the area 5 in the course of propagation within the translucent member 3, as will be explained in the following.

Figure 31B:
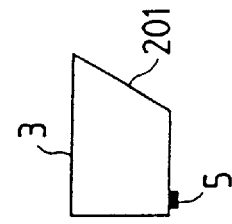
FIGS. 31A to 31 C are views showing preferred embodiments of the light guide and the illumination device of the present invention.
Figure 31A:
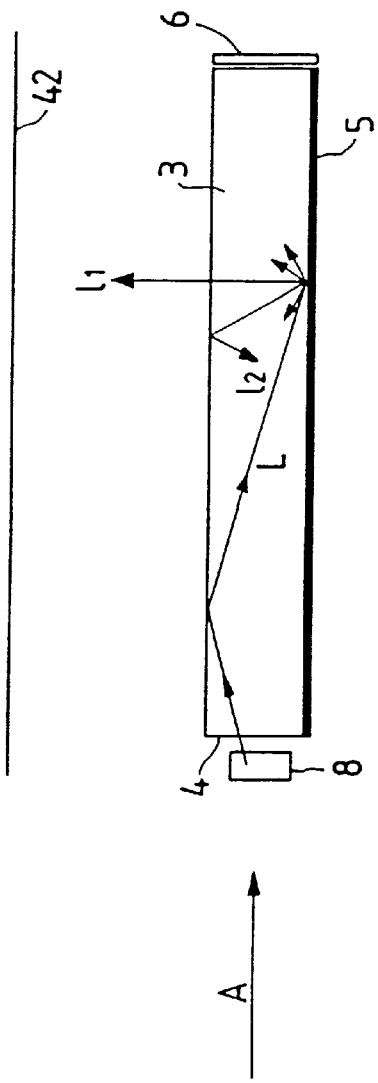
Figure 31C:
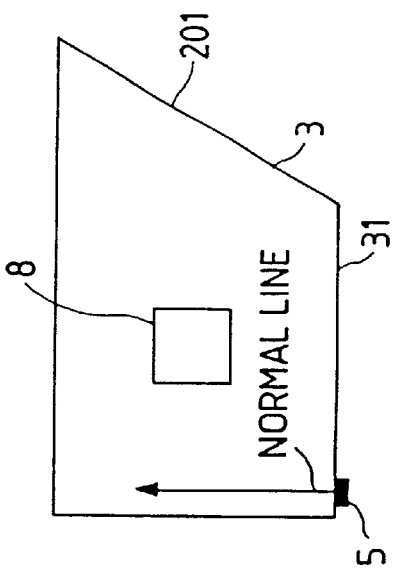

FIGS. 31A to 31C schematically show another embodiment of the illumination device of the present invention, wherein FIG. 31A is a schematic lateral view of the illumination device, illustrated together with an original constituting the illuminated surface, while FIG. 31B is a schematic cross-sectional view of the translucent member 3 and the area 5, along a plane perpendicular to that of FIG. 31A, and FIG. 31C is a schematic lateral view of the device, seen from a direction A shown in FIG. 31A. The basic configuration of the illumination device of the present embodiment is the same as that shown in FIGS. 17A to 17C, except that a lateral face of the translucent member 3, positioned opposite to the area 5, is made non-parallel to another lateral face at the side of the area 5, and that the transversal length of a face, bearing the area 5 thereon, of the translucent member 3 is made shorter than that of the opposite face at the illuminated surface side. Stated differently, a lateral face of the translucent member 3, positioned farther from the area 5, is formed as an inclined face 201, spread toward the illuminated surface.

Figure 32:
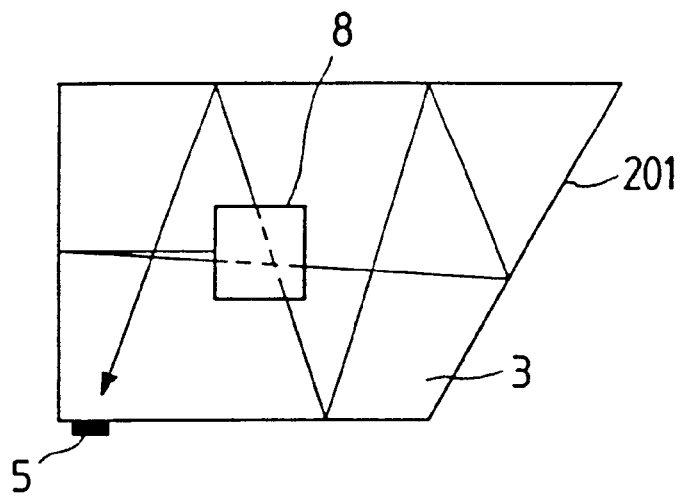
FIG. 32 is a view showing preferred embodiments of the light guide and the illumination device of the present invention.

A part of the light emitted from the LED light source 8 repeats reflections within the translucent member 3 as mentioned above and as illustrated in FIG. 32, but, in this embodiment, the inclined lateral face modifies the angle of reflection, thereby increasing the probability of entry into the area 5. As a result, the efficiency of utilization of the light emitted from the LED light source is improved, whereby the illumination intensity can be increased.

Such an inclined lateral wall is also applicable to the foregoing translucent members of other shapes. In any case, the presence of such an inclined lateral face increases the probability of light entry, thereby attaining a further increase in the illumination intensity. As examples, FIGS. 34A to 34C show a variation, having such an inclined lateral face 201 in the translucent member 3, in the illumination device shown in FIGS. 20A to 20C, and FIGS. 35A to 38C show variations, having similar inclined lateral faces 201 on both lateral faces of the translucent member 3, in the embodiments shown in FIGS. 22A to 25C. In the translucent member including the extended portion, as shown in FIGS. 35A to 38C, the inclined face may be formed on at least either of the lateral faces. Also, the area 5 in these cases may naturally be either of the diffusing type and the reflecting type explained before.

[Embodiment 13]

For further increasing the illumination intensity, as explained in the foregoing, it is effective to condense the light beam, emerging from the translucent member, with a lens. However, if such lens is incorporated as a separate component into the illumination device, there will result an increase in the cost, because of the high precision required for alignment of the lens, and of an increased number of assembling steps. Also, since the lens is formed as a separate component, there will result a loss of the light, at the entry of the emerging light into the lens, by reflection on the lens surface. Although such a loss by reflection is about 4% at maximum, such a loss should naturally be prevented in order to increase the illumination intensity.

Such a reflection loss can be substantially avoided by applying an antireflective treatment to the lens surface. However, such a treatment raises the cost, because of the steps required for such an antireflective treatment. Also, the antireflective treatment can resolve the problem of reflection on the lens surface, but is unable to resolve the above-mentioned problems associated with the precision of assembling or the number of steps required therefor.

It is therefore desirable, in the formation of the translucent member with a plastic material such as acrylic resin or with glass, to integrally form the lens at the same time. With either material, the translucent member and the lens can be integrally formed, for example, by molding.

Figure 39B:
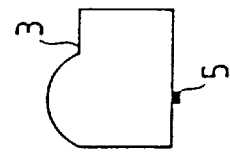
FIGS. 39A to 39C are views showing preferred embodiments of the light guide and the illumination device of the present invention.
Figure 39A:
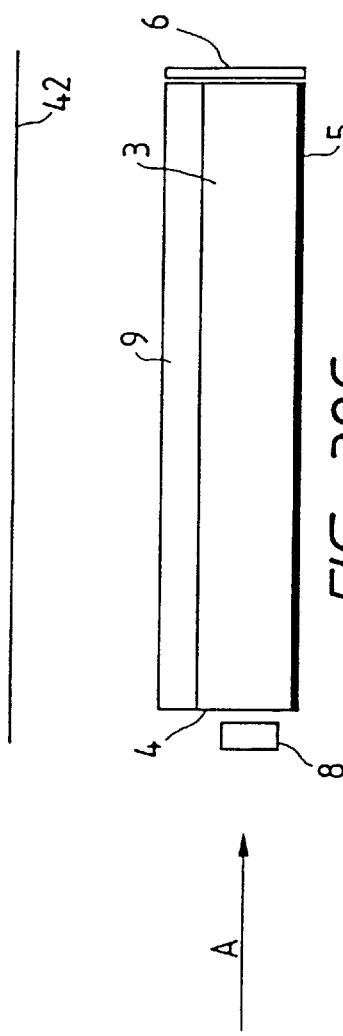
Figure 39C:
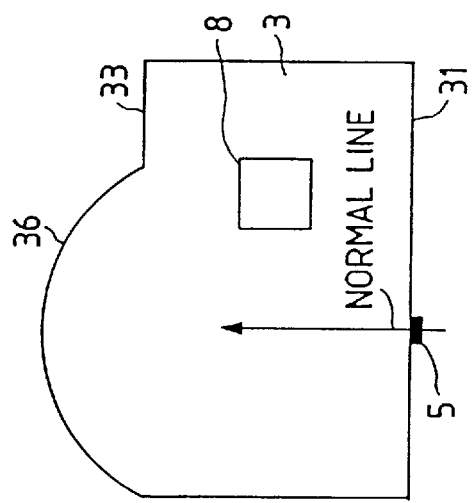

FIGS. 39A to 39C schematically show another embodiment of the illumination device of the present invention, wherein FIG. 39A is a schematic lateral view of the device, illustrated together with an original constituting the illuminated surface, FIG. 39B is a schematic cross-sectional view of the translucent member 3 and the area 5 along a plane perpendicular to that of FIG. 39A, and FIG. 39C is a schematic lateral view of the device, seen from a direction A shown in FIG. 39A. The basic structure of this embodiment is the same as that shown in FIG. 17A to 17C, except that a face of the translucent member 3, opposite to the face bearing the area 5 thereon, is formed as a convex lens 36.

With such a configuration, the light beam diffused and reflected in the area 5 is condensed by the function of the lens portion 36. In the device shown in FIGS. 39A to 39C, the light diffused and reflected in the area 5 emerges from the lens portion 36 of the translucent member 3 in a state of a substantially parallel light beam, as will be explained in the following with reference to FIG. 40.

Figure 40:
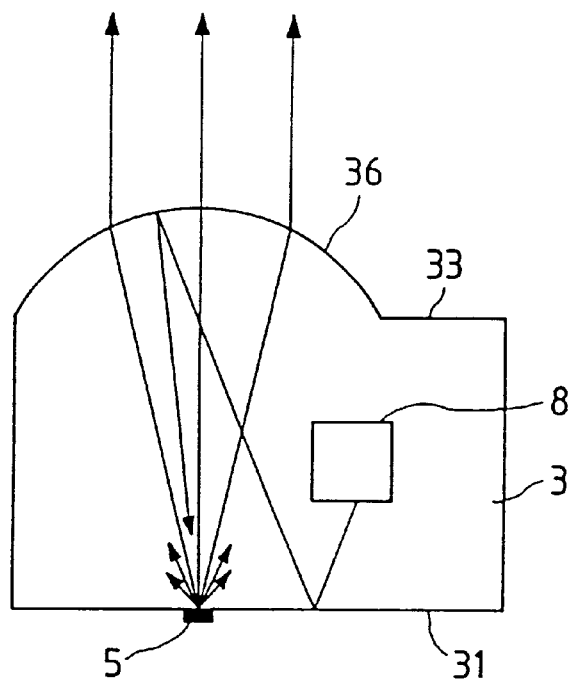
FIG. 40 is a view showing preferred embodiments of the light guide and the illumination device of the present invention.

As shown in FIG. 40, a part of the light emitted from the LED light source 8 enters the area 5 after at least a reflection in the translucent member 3. The incident light to the area 5 is diffuse reflected therein, and a part of the light is reflected again in the translucent member 3, while the remaining part proceeds toward the lens portion 36, and, upon emerging therefrom, it is condensed by the lens effect thereof and is emitted, in a state of a substantially parallel light beam, toward the illuminated surface.

Therefore, since the illuminated surface can be illuminated with a sufficiently high illumination intensity even when the illumination device is distanced from the surface, there can be achieved extremely efficient illumination. Also, for the same reason, the information processing apparatus employing the illumination device has a larger freedom in designing.

Furthermore, the structure shown in FIGS. 39A to 39C can achieve more uniform illumination, in comparison with the structure shown in FIGS. 17A to 17C, because the translucent member 3 is extended laterally by the lens portion 36.

In the present invention, the lens is not required to completely condense (or focus) the light, which is diffused or reflected in the area 5, onto the illuminated surface.

The above-explained translucent member 3 with lens function can not only achieve compactization and cost reduction, but can also provide an illumination device with more uniform illumination intensity. Such translucent member 3 with lens function is not limited to the embodiment shown in FIGS. 39A to 39C, but, as illustrated in FIGS. 42A to 46C, the lens function may naturally be given to the translucent members 3 of the illumination devices shown in FIGS. 20A to 20C, 31A to 31C, 36A to 36C and 37A to 37C.

[Embodiment 14]

Figure 48A:
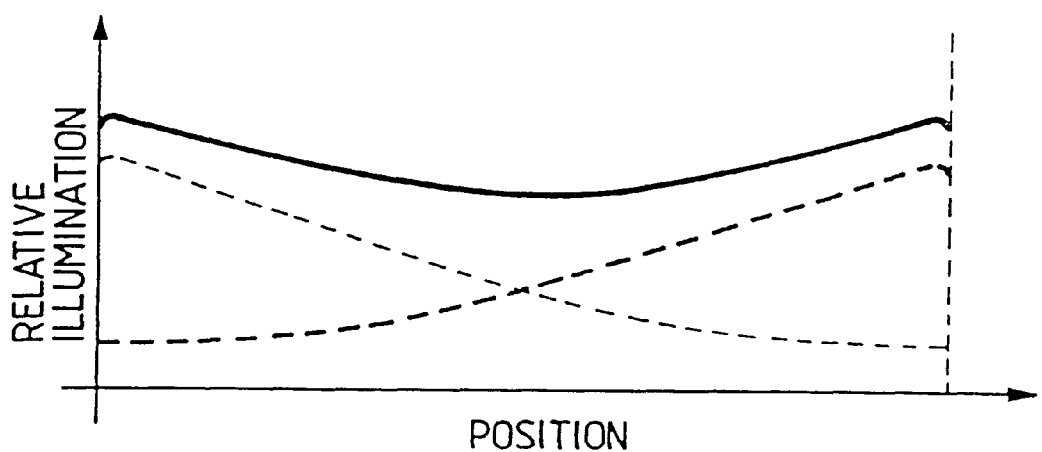
FIGS. 48A and 48B are views showing preferred embodiments of the light guide and the illumination device of the present invention.

The intensity of the indirect incident light emitted from the LED light source and entering the area 5 decreases as the light propagates inside the translucent member 3 (or as the distance from the LED light source increases). Also, the intensity of the direct incident light entering the area 5 decreases as the distance from the LED light source increases. Consequently, the illumination intensity at the center of the translucent member tends to become lower if it is extended longitudinally, even when it is provided with the LED light sources at both ends. FIG. 48A shows the relative illumination intensity along the longitudinal direction of the translucent member 3, in the illumination device shown in FIGS. 45A to 45C. As will be apparent from these charts, the distribution of the illumination intensity is significantly uniform in comparison with that in the conventional devices. Nevertheless, the relative illumination intensity is lower in the central portion in the longitudinal direction, and it is desirable to rectify such unevenness, as will be explained in the following.

Figure 46B:
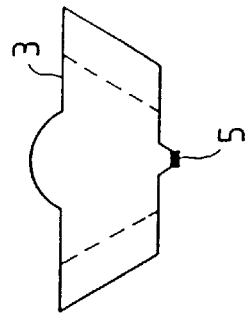
FIGS. 46A to 46C are views showing preferred embodiments of the light guide and the illumination device of the present invention.
Figure 46A:
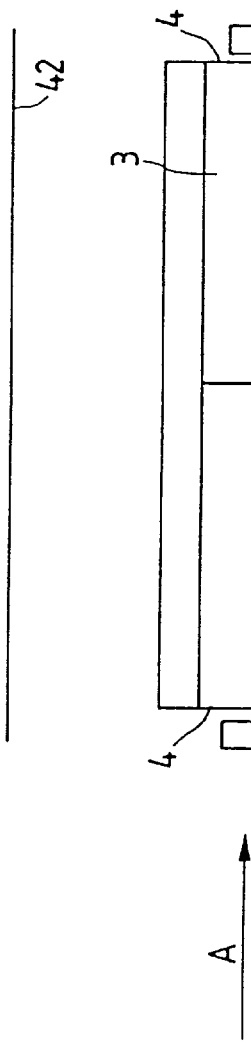
Figure 46C:
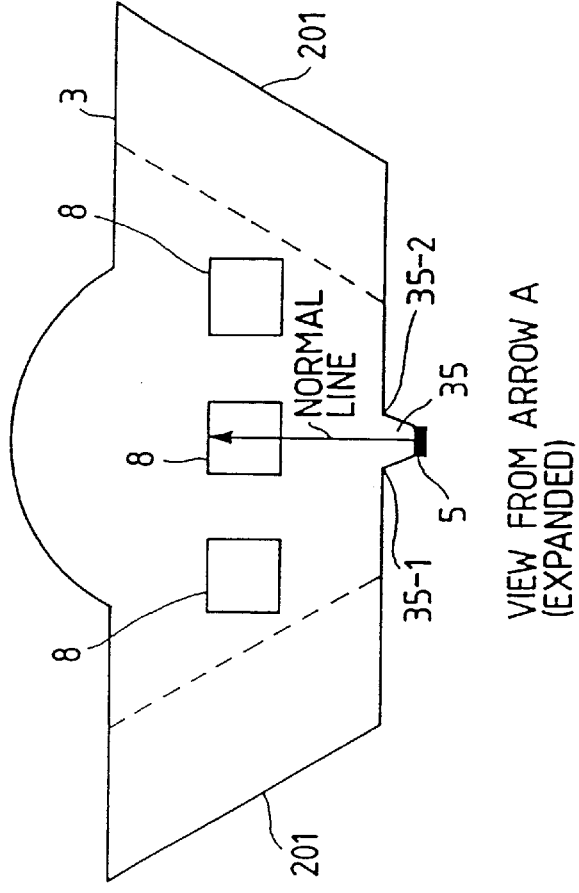

FIGS. 46A to 46C schematically illustrate another embodiment of the illumination device of the present invention, wherein FIG. 46A is a schematic lateral view of the device, illustrated together with an original constituting the illuminated surface, FIG. 46B is a schematic cross-sectional view of the translucent member 3 and the area 5 along a plane perpendicular to that of FIG. 46A, and FIG. 46C is a schematic lateral view of the device, seen from a direction A shown in FIG. 46A.

As shown in these drawings, the illumination device of the present embodiment is provided with the LED light sources 8 on both end faces of the translucent member 3 having a lens portion (light condensing portion). The translucent member 3 is further provided, in a position opposite to the lens portion, with a protruding portion 35, and the area 5 is formed on the end face of the protruding portion 35. The cross section of the translucent member 3 is trapezoidal, with the shorter side closer to the area 5, bearing a convex lens portion thereon. On each end face, there are provided three LED light sources 8, one being at a position corresponding to the area 5 and the remaining two being positioned on both sides thereof. Also, in the illustrated device, the translucent member 3 is made thinner in the central portion in the longitudinal direction, than in the end portions thereof.

Figure 47A:
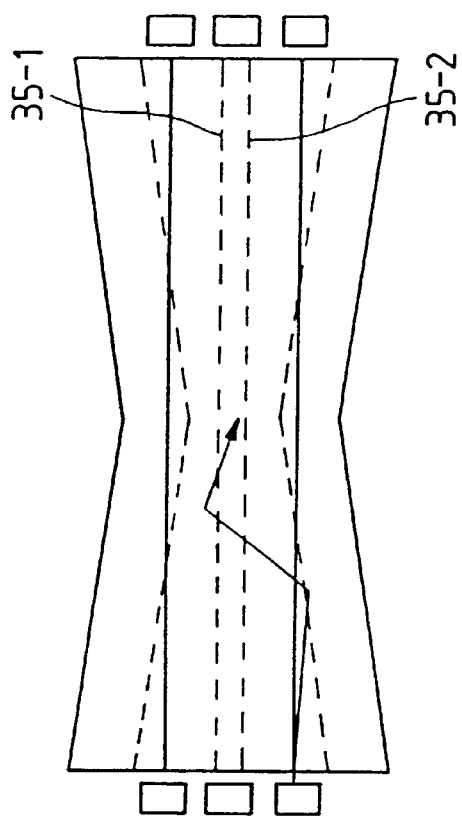
FIGS. 47A to 47C are views showing preferred embodiments of the light guide and the illumination device of the present invention.
Figure 47B:
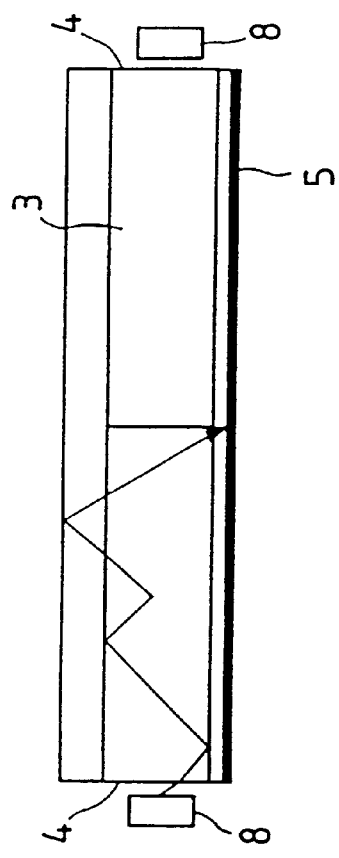
Figure 47C:
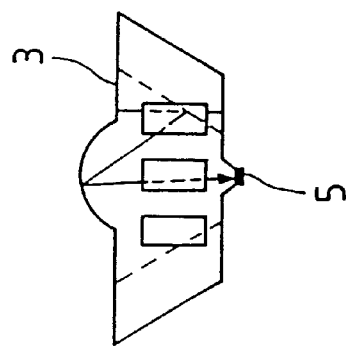

FIGS. 47A and 47B are respectively a schematic plan view and a schematic lateral view of the device of the present embodiment, and FIGS. 47B and 47C respectively correspond to FIGS. 46A and 46C. In the present embodiment, as shown in these drawings, the outstretched portions of the translucent member decrease toward the center in the longitudinal direction, so that the cross sectional area of the member decreases from both ends thereof toward the center.

Figure 48B:
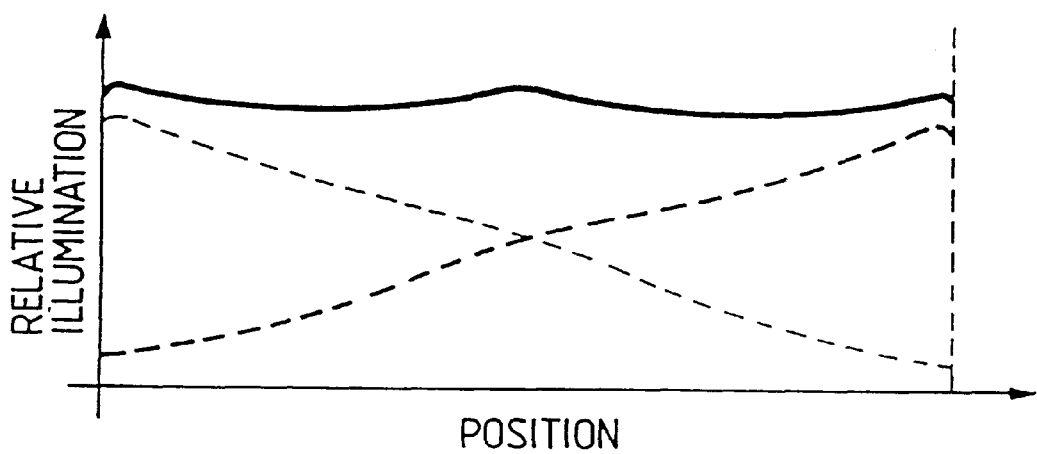

FIG. 48B shows the illumination intensity distribution of the above-explained illumination device, along the longitudinal direction of the translucent member 3. When the translucent member 3 is constricted in shape at the central portion as in the present embodiment, the illumination intensity in the central portion increases because the light emitted by the LED light source 8 at an end has a higher probability of entering the area 5 (namely becoming the indirect incident light) before reaching the other end. More specifically, the light proceeding from an end to the other by repeated reflections is eventually reflected by the inclined face 201 to constitute the indirect incident light, due to the decrease of the out-stretched portions. Consequently, in comparison with the case without such constriction, the amount of the incident light to the area 5 increases, whereby the illumination intensity over the entire area, particularly that in an area distant from the LED light source, can be increased.

The amount of the constriction is preferably determined in consideration of the length, thickness and cross sectional area of the translucent member, the width of the area 5, arrangement of the LED light source, etc.

When the translucent member has the lens portion, it is desirable that the constriction does not affect the characteristic, for example the shape, of the lens portion, and it is also desirable to maintain a constant distance between the area 5 and the lens face.

Also, the shape of the constriction may be linear as shown in the foregoing drawings, or may be curved or a combination of these shapes.

Figure 49:
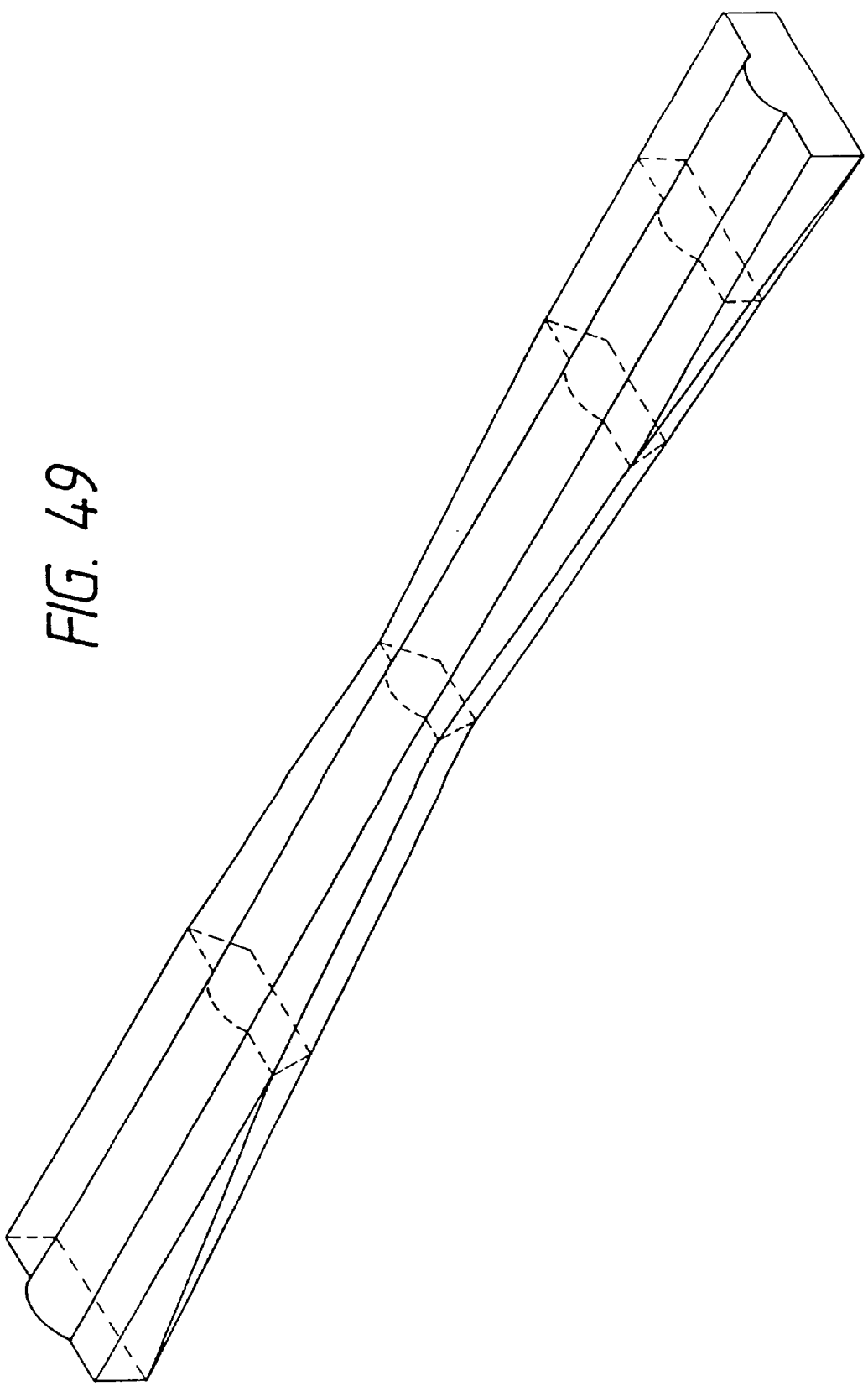
FIG. 49 is a view showing preferred embodiments of the light guide and the illumination device of the present invention.

Furthermore, the translucent member 3 may be formed as shown in FIG. 49. The translucent member 3, excluding the lens portion, has a rectangular entrance end face for the light from the LED light source, and a trapezoidal cross section with the shorter side at the bottom, at the central portion in the longitudinal direction. In a position closer to the center from the entrance end face, the cross section is rectangular with cut-off lower corners, and the cut-off areas are progressively enlarged to develop into the inclined lateral faces of the trapezoidal cross section.

Such illustrated form can provide an illumination device having more uniform illumination intensity characteristics in the longitudinal direction.

Figure 50B:
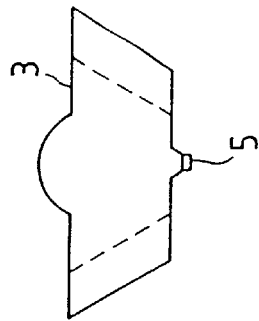
FIGS. 50A to 50C are views showing preferred embodiments of the light guide and the illumination device of the present invention.
Figure 50A:
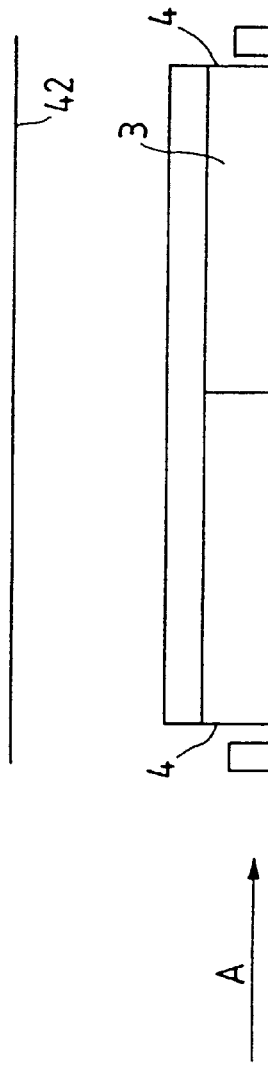
Figure 50C:
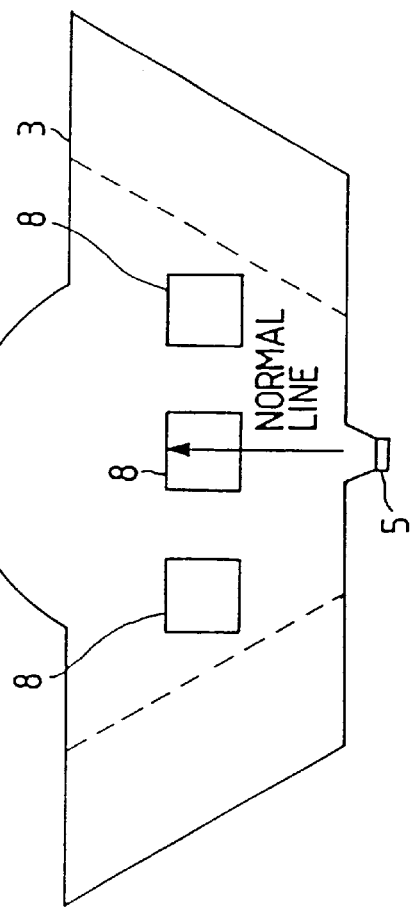

FIGS. 50A to 50C show a variation in which the area 5 of the illumination device shown in FIGS. 46A to 46C is changed from the diffusing surface to the sawtooth-shaped reflecting faces explained before. If the angle of the light condensing part, seen from the area 5, is sufficiently large (for example 60° or larger, though it depends on the depth and shape of the protruding portion), the incident angle to the area 5 becomes close to the perpendicular entry, but the sawtooth-shaped reflecting faces employed in the present embodiment reflect the incident light principally to the light condensing part, whereby the light emerges therefrom in a parallel or substantially parallel light beam. Consequently, the configuration of the present embodiment provides an illumination device with a higher illumination intensity which is more uniform in the longitudinal direction.

FIGS. 51A to 51C show a variation in which a cylindrical lens 9 as the light condensing part is added to the illumination device shown in FIGS. 50A to 50C. Such a configuration, being capable of further condensing the emerging parallel light beam, can illuminate the object surface with a further increased intensity.

[Embodiment 15]

In the following there will be explained the method of mounting the LED light source. In the foregoing embodiments there have been explained the arrangements of the LED light sources, but the specific mounting method therefor has not been explained. In the following there will be given a detailed explanation of such a mounting method. Such a mounting method is applicable to any of the aforementioned illumination devices, or to any variation or combination thereof.

In the mounting of the LED light source, there are required the mounting precisely at the designed position, a simple mounting process including the maintenance of precision, and the possibility of introduction of the light from the LED light source into the translucent member with minimum loss. The mounting method for the LED light source has no particular limitation, as long as these requirements are met.

A simplest example of the mounting method is to adhere the LED chip onto the end face of the translucent member. However, such an adhesion method does not allow easy replacement of the LED light source, and may lead to certain drawbacks, such as peeling of adhesive or breakage of the LED due to the expansion and contraction resulting from variations in temperature and humidity, particularly when the translucent member is composed of a resinous material such as acrylic resin.

Also, if the LED light source is positioned separate from the translucent member, there may result a light loss due to a variation in the distance between the LED light source and the end face of the translucent member, resulting from expansion and contraction thereof.

Figure 52:
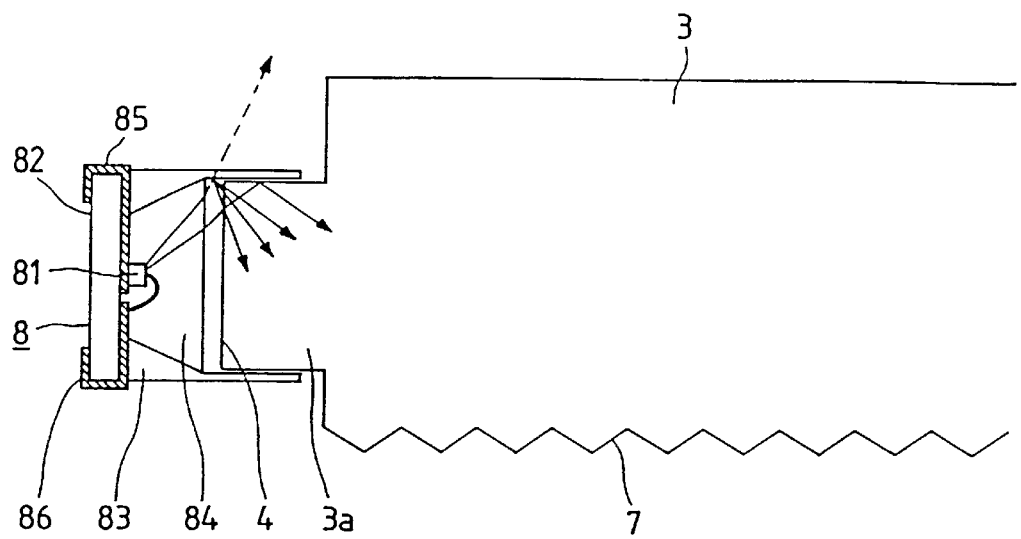
FIGS. 52 and 53 are schematic cross-sectional views showing preferred mounting methods of the light source.

FIG. 52 shows a mounting method capable of avoiding these drawbacks.

In this embodiment, as shown in FIG. 52, the translucent member 3 has a protruding portion 3a on the end face thereof, and the LED light source 8 is provided with a reflecting frame 83 extended so as to fit on the protruding portion 3a.

Such a structure can avoid the light leakage to the exterior due to the presence of the reflecting frame 83, despite the eventual presence of a gap between the external surface of transparent sealing resin 84 and the entrance end face 4 of the translucent member 3. Also, since a part of the light reflected by the reflecting frame 83 enters the translucent member 3 through the entrance end face 4, the efficiency of utilizing the light, emitted from the LED chip 81, can be improved. The reflecting frame 83 may be adhered to the protruding portion 3a of the translucent member 3, but it is preferably fitted merely on the protruding portion, in order to relax the stress resulting from the expansion or contraction of the translucent member 3 and the reflecting frame 83.

Also, the precision of positioning of the LED light source 8 can be improved by fitting the light source 8 onto the protruding portion 3a formed on the translucent member 3, and the mounting process can be simplified if the mount is conducted by mere fitting only.

Figure 53:
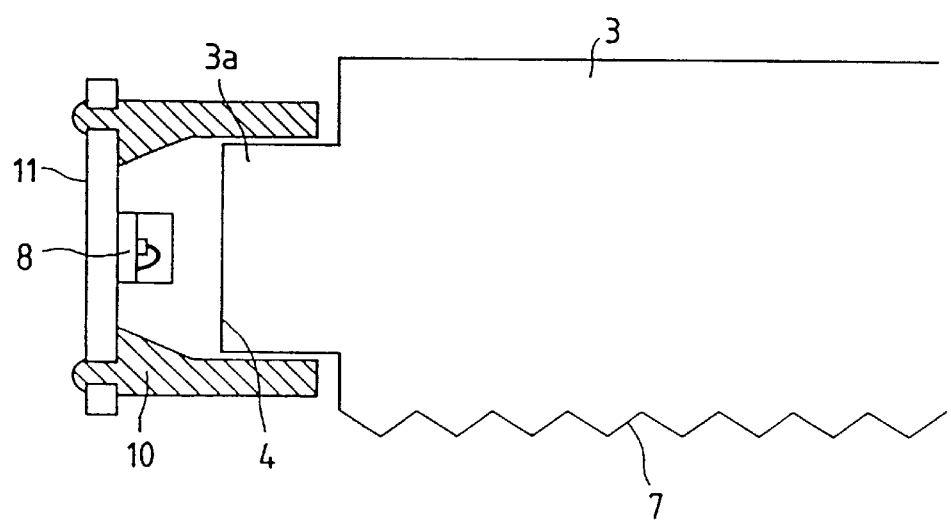

FIG. 53 shows a variation of the mounting method for the LED light source shown in FIG. 52. In this variation, the LED chip is surface mounted on a mounting board 11, and is surrounded by a reflecting frame 10, which is made of white resin or a metal integrated with the board 11 and is fitted on the protruding portion 3a.

Such a configuration allows one to obtain illuminating characteristics matching the requested performance in an easier manner, since the protruding portion 3a can be formed with a desired shape and size and the LED light source can be mounted on such a protruding portion.

An additional reflecting portion may be formed in at least a part of the area, other than the mounting area for the LED light source. The presence of such reflecting portion causes the light, returning from the other end face of the translucent member, to continue the internal reflections without being released from the entrance end face, thereby improving the efficiency of light utilization.

The presence of the above-mentioned protruding portion 3a is not essential, but is preferable in consideration of the aforementioned improvement in the positioning accuracy. The protruding portion 3a can be molded simultaneously with the formation of the translucent member 3, but it may also be formed, if necessary, by cutting and/or grinding.

The LED light source may also be mounted by fitting into a recess formed on the entrance end face of the translucent member. Such a mounting method causes a loss in a part of the light emitted from the LED chip, but is effective in the positioning precision and in a smaller protruding distance in the mounting portion.

Figure 54:
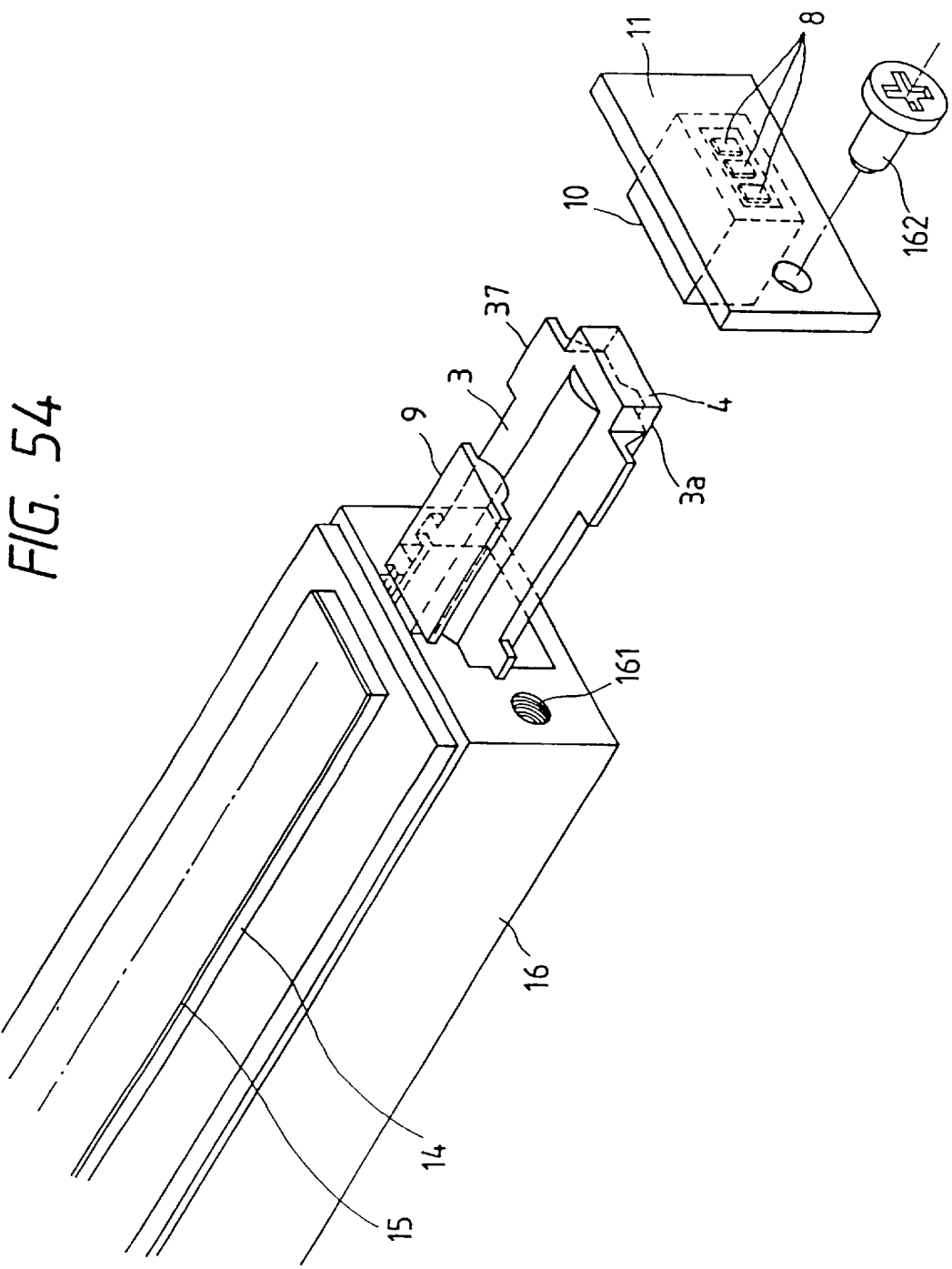
FIG. 54 is a view showing preferred embodiments of the light guide and the illumination device of the present invention.

FIG. 54 is a schematic perspective view of an example of the photoelectric converting device, utilizing the illumination device of the present invention shown in FIG. 53 and constituting an image reading device. There are shown a sensor substrate 14, a protecting glass 15, and a casing 16 of the photoelectric converting device. On the sensor substrate 14, there is provided a one-dimensional array (or plural arrays) of a plurality of photoelectric converting elements, which are formed utilizing a thin semiconductor layer for example of amorphous silicon or polysilicon. The protective glass 15 is provided on the plural photoelectric converting elements (not illustrated), for protecting the elements from eventual breakage caused by the contact with the moving original. The casing 16 is provided therein with a space for fitting with the illumination device and the cylindrical lens 9, which are set in a predetermined position by insertion from an end face of the casing 16. The LED light sources 8 are mounted on a mounting board 11 and mounted on the protruding portion 3a of the translucent member 3 by fitting the reflecting frame 10 thereon, and the mounting board 11 is fixed by a screw 162 fitted into a threaded hole 161 formed on the casing.

The translucent member 3 is provided with mounting portions 37, engaging with the casing 16. Naturally, the mounting portions 37 are not essential, nor are they limited to the illustrated shape. Such mounting portions 37 may naturally be provided also in the translucent members 3 in the foregoing embodiments 1 to 14.

[Embodiment 16]

In the following, there will be explained application of the illumination device of the present invention to an information processing apparatus.

Figure 55:
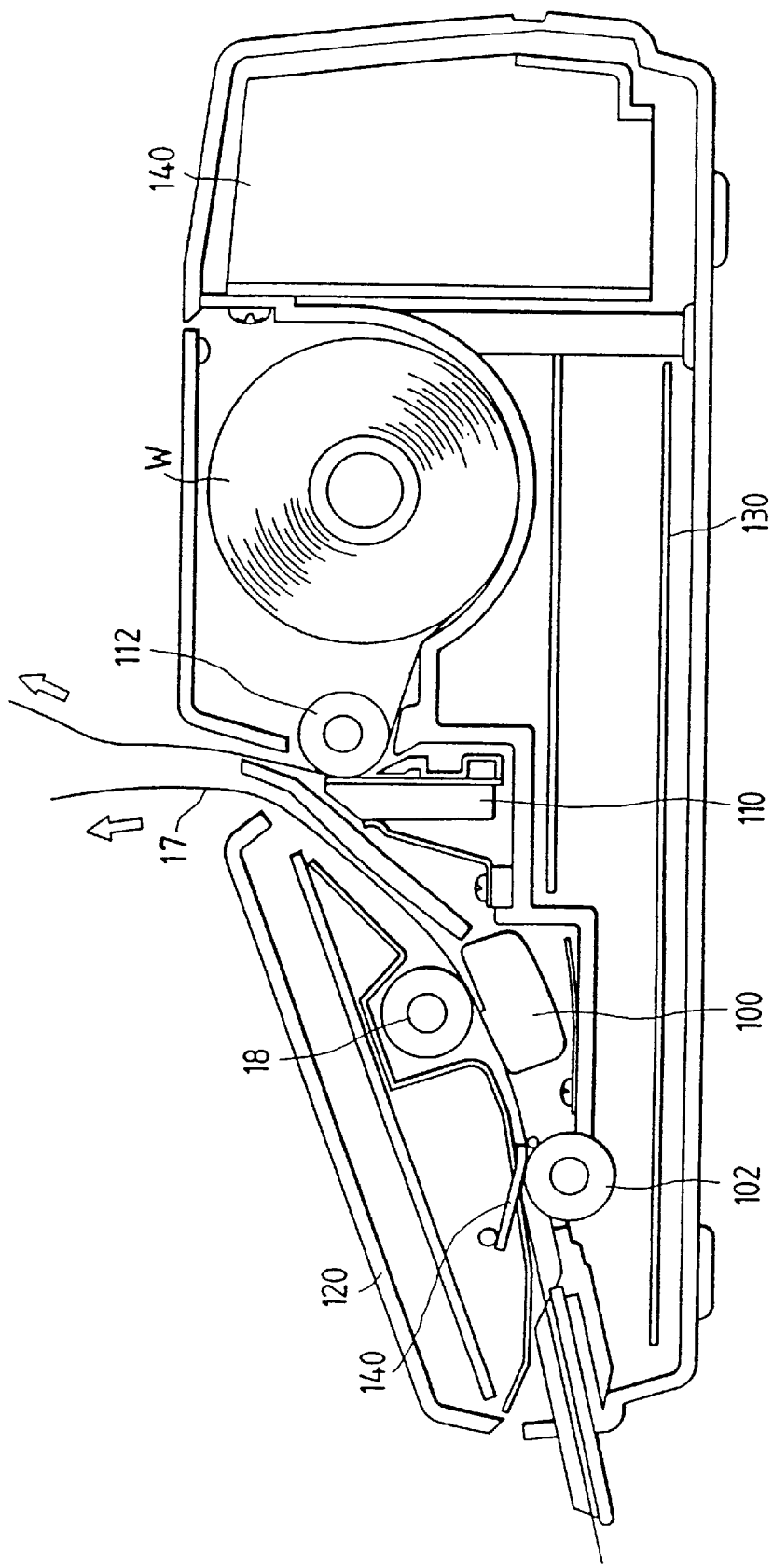
FIG. 55 is a schematic cross-sectional view of an information processing apparatus in which the illumination device of the present invention is applicable.

FIG. 55 illustrates an example of the information processing apparatus (for example, a facsimile apparatus) utilizing the photoelectric converting device of the present invention.

There are shown a feed roller 102 for feeding an original 17 to a reading position; a separating member 104 for securely separating the originals P one by one; and a transport roller 18 provided at the image reading position of a photoelectric converting device 100, for defining the image reading plane of the original 17 and also serving to transport the original 17.

A recording medium W, in the form of rolled paper, is subjected to formation of an image read by the photoelectric converting device 100, or, in the case of a facsimile, an image transmitted from the outside. A recording head 110, for the image formation, can be of various types such as a thermal head or an ink jet recording head. Also, the recording head can be of serial type or of line type. A platen roller 112 is provided for transporting the recording medium W to the recording position by the recording head 110 and for defining the recording plane of the recording medium.

An operation panel 120 is provided with switches for entering commands for operations, and with a display unit for displaying messages and a status of the apparatus.

There are further provided a system control board 130, provided thereon with a control unit for controlling various units of the apparatus, a driving circuit for the photoelectric converting elements, a processing unit for the image information, a transmission-reception unit, etc., and a power source 140 for the apparatus.

Figure 56:
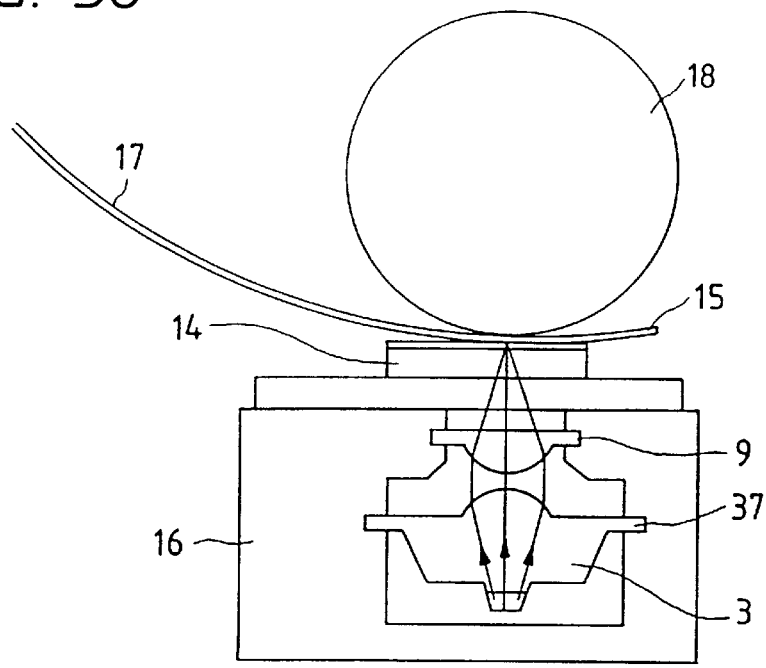
FIGS. 56 to 58 are schematic partial cross-sectional views showing information processing apparatus employing the illumination device of the present invention.
Figure 57:
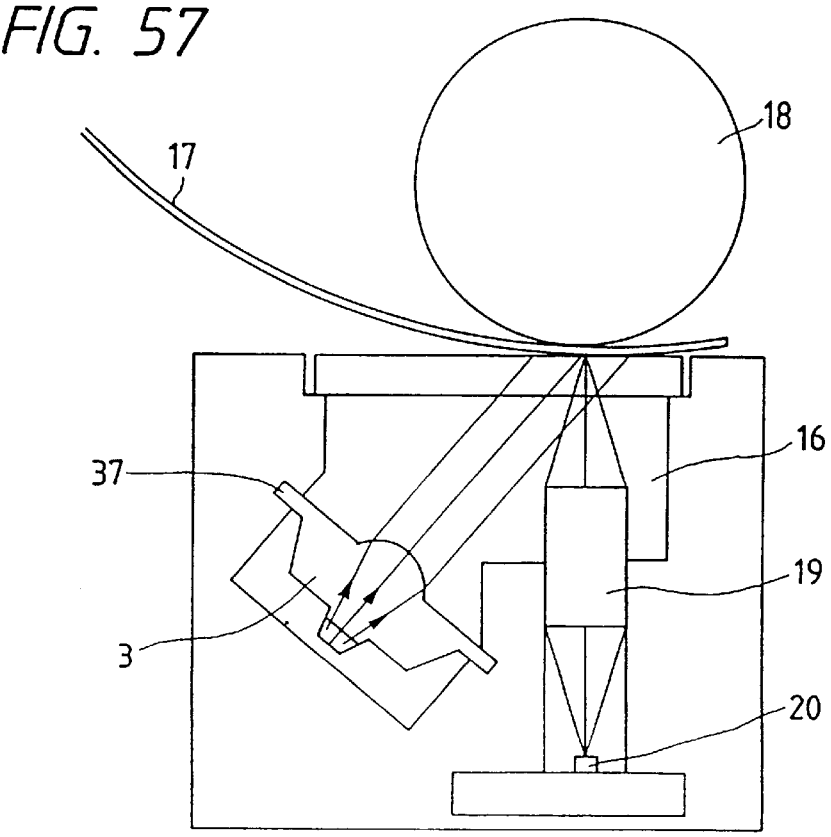

FIGS. 56 and 57 are schematic magnified views of the photoelectric converting device, employable in the information processing apparatus shown in FIG. 55. FIG. 56 shows the case of a contact sensor, utilizing the photoelectric converting device (image reading device) shown in FIG. 54. FIG. 57 shows the case of a system employing an imaging optical system 19, wherein the original 17 is illuminated by the light emitted by illumination means of the embodiment 14 shown in FIGS. 46A to 46C, and the reflected light, corresponding to the image information, is focused on the photoelectric converting device 20 through the imaging optical system 19.

Figure 58:
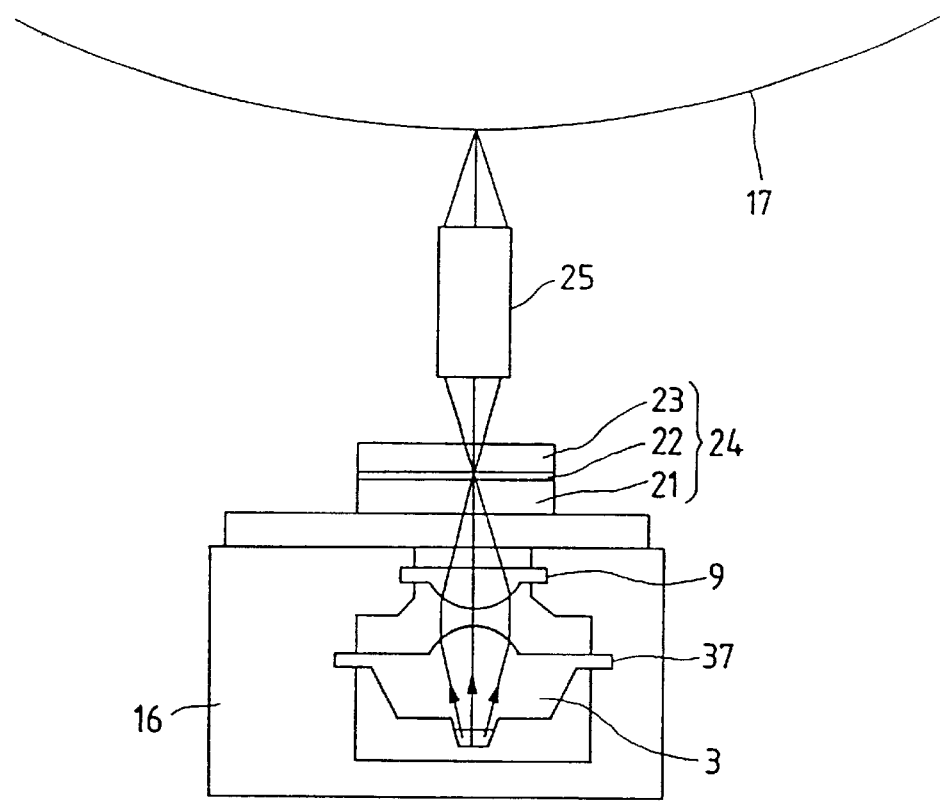

It is also possible, as shown in FIG. 58, to form an imaging optical system 25 at the original side, and to read the image by focusing, through a protective layer (protective glass) 23, on a photoelectric converting device 22 formed on a sensor substrate 21, utilizing a thin semiconductor layer.

In both cases, the original surface was illuminated with extremely uniform distribution of illumination intensity, so that the image could be read in an extremely excellent state.

Also, other illumination devices explained in the foregoing embodiments 1 to 13 enables much superior image reading, in comparison with the case employing the conventional illumination devices.

The illumination device of the present invention, being capable of providing a sufficiently high light amount, is also suitable for color image reading. Also, for modifying the color temperature or the hue of the illuminating light, a filter may be provided between the LED light source and the end face of the translucent member 3, or the translucent member itself may be dyed. In the case of such a dyeing, the entrance end face is preferably dyed, but, if surficial dyeing is enough for the purpose, the light exit face of the translucent member is preferably dyed. This is because, if the entire translucent member is dyed or colored, the light is attenuated significantly in the course of internal reflections, whereby the light intensity becomes lower in the central portion or in a position distant from the LED light source.

For image output applicable to the information processing apparatus shown in FIG. 55, there can be considered, as explained above, the thermal transfer recording method or thermal recording method utilizing the thermal head, and the ink jet recording method utilizing the ink jet recording head.

In the following, there will be explained an embodiment of the information processing apparatus, employing such a recording head as the output means. The following explanation will be limited to the output part only.

Among various ink jet recording methods, the present invention brings about a particular effect when applied to a recording head of a system utilizing thermal energy for ink discharge, because the entire information processing apparatus can fully enjoy the effect of compactization of the illumination device, as the recording head itself can be made compact.

The principle and representative configuration of the system are disclosed, for example, in U.S. Pat. Nos. 4,723,129 and 4,740,796. This system is applicable to so-called on-demand recording or continuous recording, but is particularly effective in the on-demand recording because the entire apparatus can be compactized.

In brief, in this system, an electrothermal converting member positioned corresponding to a liquid channel or a sheet containing therein is given at least a drive signal, corresponding to the recording information and capable of causing a rapid temperature increase exceeding nucleate boiling, to generate thermal energy in the electrothermal converting member, thereby inducing film boiling on a heat action surface of the recording head and forming a bubble in the ink in one-to-one correspondence to the recording signal. The ink is discharged from a discharge opening by the growth and contraction of the bubble, thereby forming at least an ink droplet. The signal is preferably formed as a pulse, as it realizes instantaneous growth and contraction of the bubble, thereby attaining highly responsive discharge of the ink.

Such a pulse-shaped drive signal is preferably as disclosed in U.S. Pat. Nos. 4,463,359 and 4,345,262. Also, the conditions described in U.S. Pat. No. 4,313,124 relative to the temperature increase rate of the heat action surface allows one to obtain a further improved recording.

The configuration of the recording head is given by the combinations of the ink discharge openings, liquid channels and electrothermal converter elements with linear or rectangular liquid channels, as disclosed in the above-mentioned patents, but a configuration disclosed in U.S. Pat. No. 4,558,333 in which the heat action part is positioned in a flexed area, and a configuration disclosed in U.S. Pat. No. 4,459,600 also belong to the present invention.

Furthermore, the present invention is effective in a structure disclosed in Japanese Patent Laid-open Application No. 59-123670, having a slit common to plural electrothermal converter elements as a discharge opening therefor, or in a structure disclosed in Japanese Patent Laid-open Application No. 59-138461, having an aperture for absorbing the pressure wave of thermal energy, in correspondence with each discharge opening.

A full-line type recording head, capable of simultaneously recording over the entire width of the recording sheet, may be obtained by plural recording heads combined so as to provide the required length as disclosed in the above-mentioned patents, or may be constructed as a single integrated recording head.

Furthermore, there may be employed a recording head of an interchangeable chip type, which can receive an ink supply from the main apparatus and can be electrically connected therewith upon mounting on the main apparatus, or a recording head of cartridge type in which an ink cartridge is integrally constructed with the recording head.

Also, the information processing apparatus of the present invention is preferably provided with the discharge recovery means and other auxiliary means for the recording head, in order to realize a further advanced maintenance-free system.

Examples of such means for the recording head include capping means, cleaning means, pressurizing or suction means, heating means composed for example of an electrothermal converter element for heating the recording head, and means for effecting an idle ink discharge independent from the recording operation, all of which are effective for achieving stable recording operation.

Furthermore, the recording mode is not limited to recording of a single main color, such as black, but also covers recording of plural colors or a full-color image, by means either of an integrally constructed recording head or of a combination of plural recording heads.

In the foregoing explanation, the ink is assumed to be liquid, but there may also be employed ink which is solid below room temperature but softens at room temperature. In the above-explained ink jet recording system, the ink itself is usually temperature controlled within a range of 30° C.–70° C. for maintaining the ink viscosity within a stable discharge range, so that the ink needs to be liquid only when the recording signal is given. In addition, there may also be employed ink which is intentionally changed from solid to liquid by heating with thermal energy.

In the following, there will be given a brief explanation on an ink jet recording head, utilized in such an ink discharge recording system utilizing thermal energy.

Figure 59:
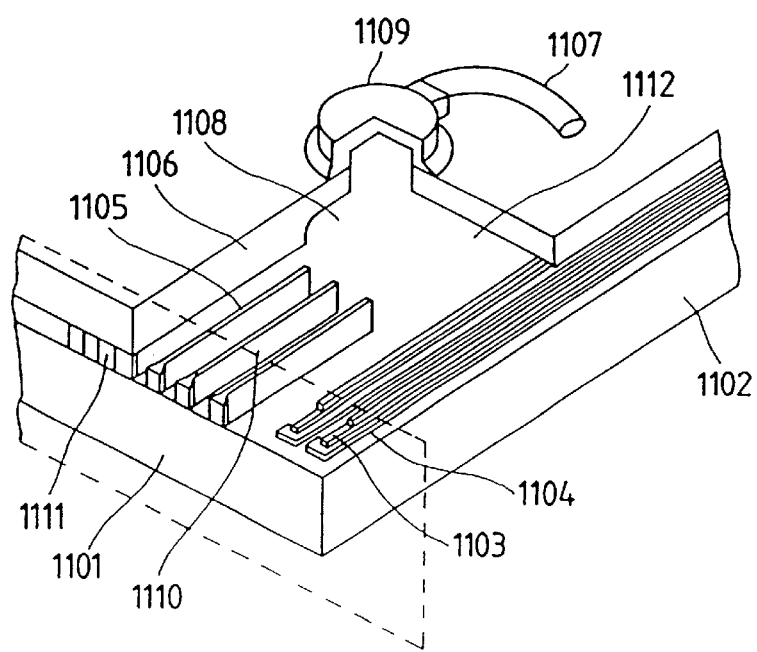
FIG. 59 is a schematic perspective view of an ink jet recording head applicable to the information processing apparatus of the present invention.

FIG. 59 is a schematic view of such an ink jet recording head, composed of electrothermal converter elements 1103, electrodes 1104, liquid channels 1105 and a ceiling plate 1106, formed on a substrate 1102 through a semiconductor process involving the steps of etching, evaporation, sputtering, etc. The recording ink 1112 is supplied from an unrepresented ink reservoir to a common ink chamber 1108 of the recording head 1101 through a supply pipe 1107, provided with a connector 1109 therefor.

The ink 1112 in the common ink chamber 1108 is supplied into the liquid channel 1110 by capillary action, and is stably held therein, by forming a meniscus at the discharge opening (orifice) at the end thereof. Electric power supply to the electrothermal converter element 1103 rapidly heats the liquid thereon, thus forming a bubble in the liquid chamber, and the liquid is discharged from the opening 1111 by the expansion and contraction of the bubble, thereby forming a liquid droplet.

The above-explained configuration allows to arrange the discharge openings with a high density such as 16 nozzle/mm or even higher, thereby obtaining an ink jet head with 128 or 256 discharge openings, or even a full-line ink jet recording head having an array of the discharge openings over the entire recording width.

Figure 60:
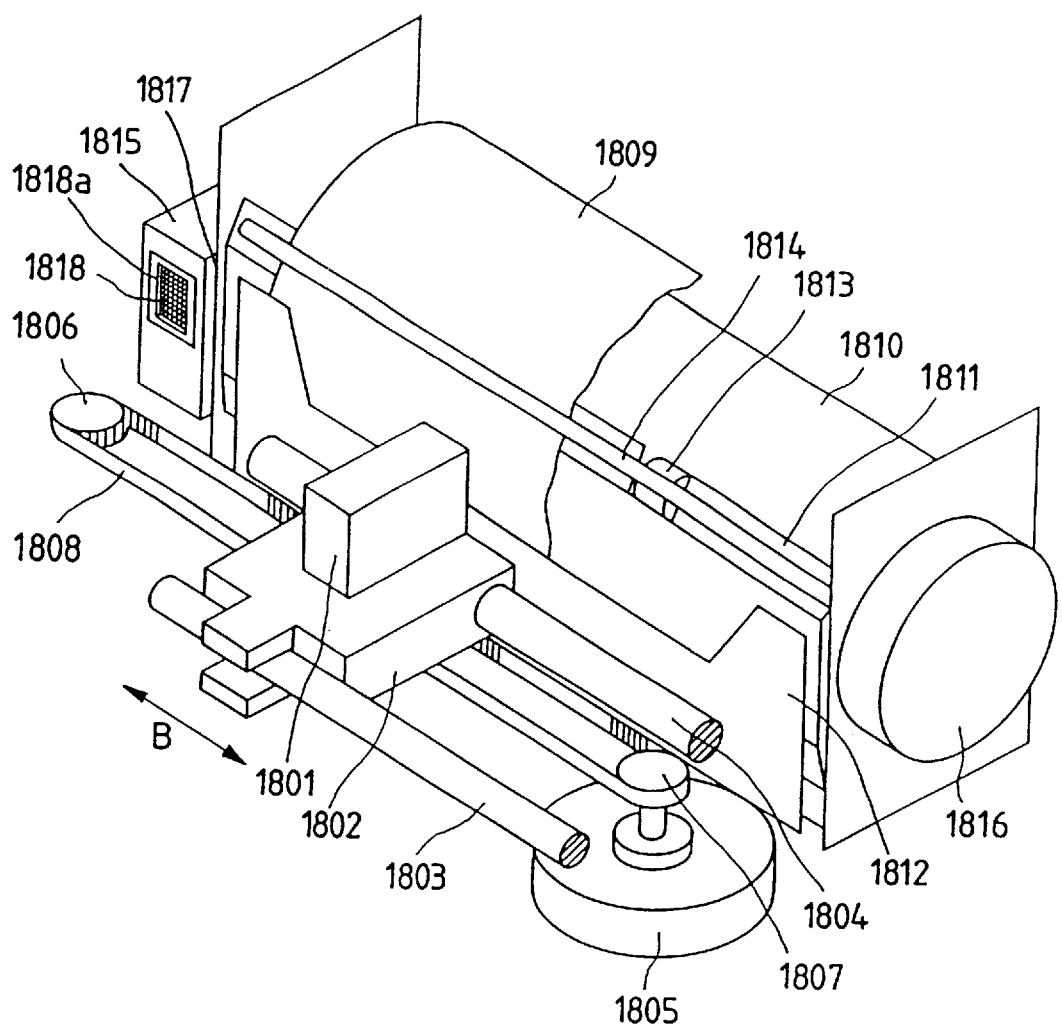
FIGS. 60 and 62 are schematic perspective views showing examples of the ink jet recording unit applicable to the information processing apparatus of the present invention.

FIG. 60 is a schematic perspective view of the external structure of an output unit utilizing the ink jet recording method.

In FIG. 60 there are shown an ink jet recording head 1801 for discharging ink according to the recording signals, thereby recording a desired image; and a carriage 1802 for moving the recording head 1801 in the recording (main scanning) direction. The carriage 1802 is slidably supported by guide shafts 1803, 1804, and reciprocates in the main scanning direction by means of a timing belt 1808, which is supported by pulleys 1806, 1807 and driven by a carriage motor 1805 through the pulley 1807.

A recording sheet 1809 is guided by a paper pan 1810, and is pressed, by pinch rollers, to an unrepresented transport roller for transporting the sheet.

The sheet transportation is achieved by a feeding motor 1816. The transported recording sheet 1809 is given a tension by a discharge roller 1813 and a grooved roller 1814, and is transported in close contact with a heater 1811, by means of an elastic pressure plate 1812. Thus the recording sheet 1809, bearing thereon the ink, discharged from the recording head 1801 and deposited on the sheet, is heated by the heater 1811, whereby the deposited ink is dried and fixed to the recording sheet 1809.

A recovery unit 1815 is provided for maintaining the proper ink discharge state of the recording head 1801, by removing the dusts and highly viscous ink, deposited on the discharge openings (not illustrated) of the recording head 1801.

A cap member 1818a, constituting a part of the recovery unit 1815, is provided to cap the discharge openings of the recording head 1801, thereby preventing the clogging of the openings. Inside the cap 1818a, there is preferably provided an ink absorbent member 1818.

At a side of the recovery unit 1815, closer to the recording area, there is provided a blade 1817 for coming into contact with a face, having the discharge openings, of the recording head 1801, thereby eliminating the dust and ink sticking to the face.

Figure 61:
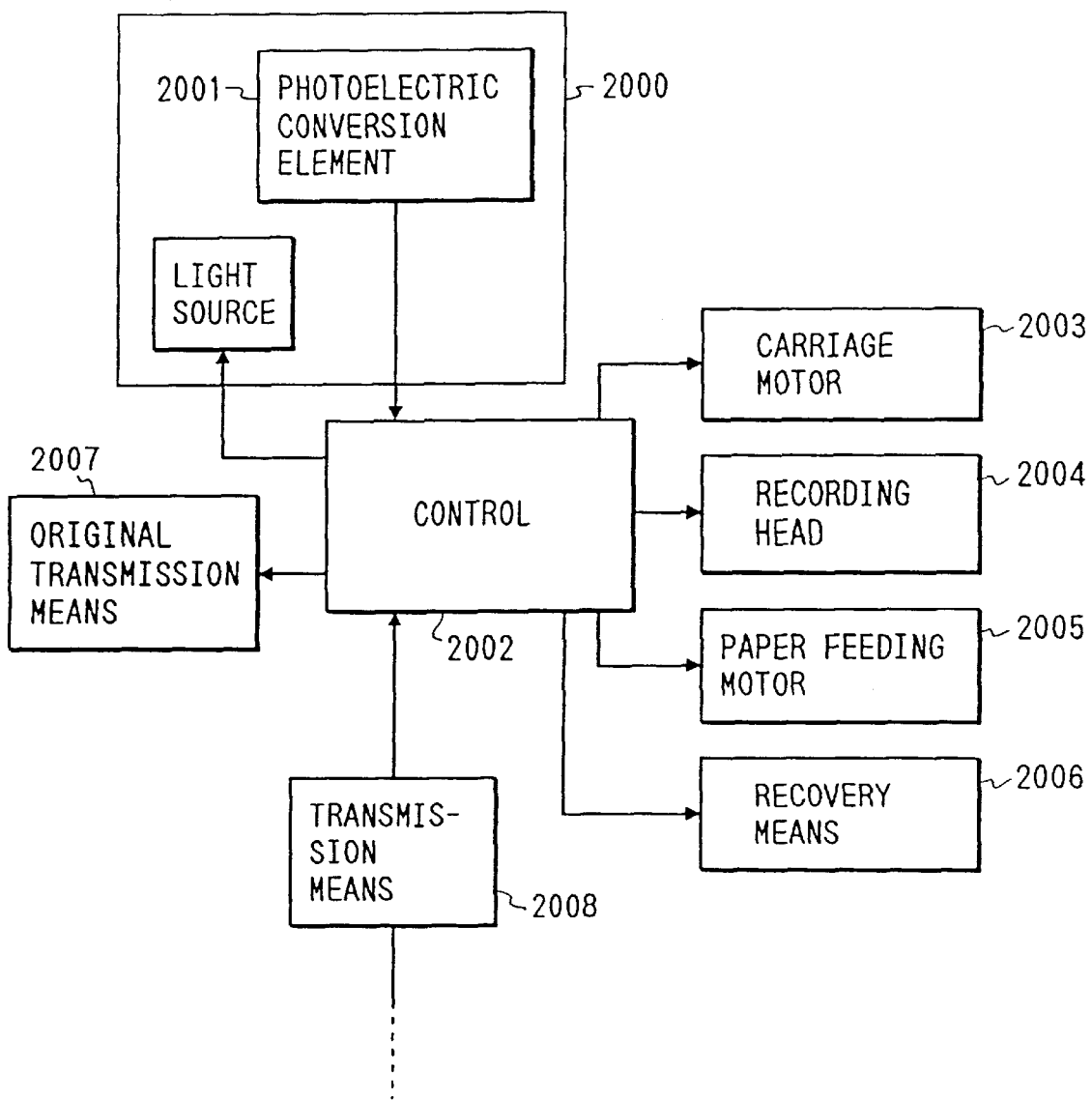
FIG. 61 is a block diagram showing an example of the configuration of the information processing apparatus of the present invention.

In the present invention, as shown in a block diagram in FIG. 61, the original transported by original transmission means 2007 to the image reading part of an image reading device 2000 is read by photoelectric converter elements 2001 thereof, then thus obtained electrical signals bearing image information are converted by image processing means (not shown) into electrical signals for recording, and the recording operation is conducted by a controller such as a CPU 2000 controlling the carriage motor 2003, recording head 2004, sheet feeding motor 2005, recovery unit 2006, etc.

The electrical signals bearing image information may be transmitted through communication means 2008 to another image processing apparatus for image output therein, or may be received from another information processing apparatus through the communication means 2008 and recorded by the above-mentioned recording head 2004.

Figure 62:
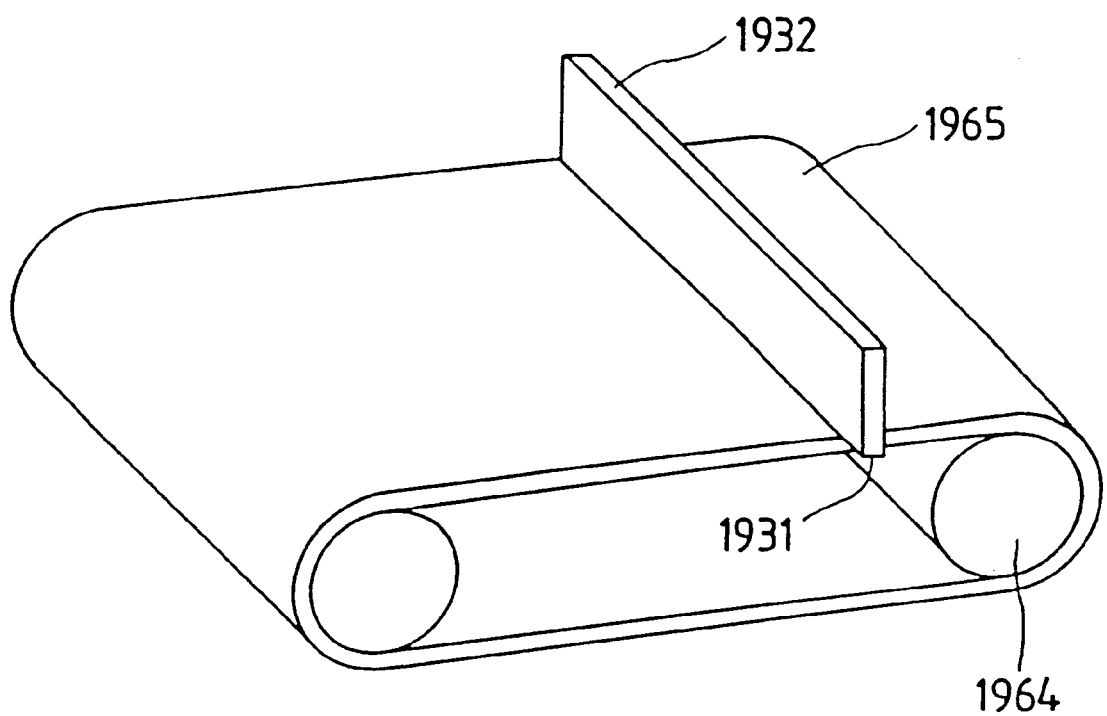

FIG. 62 schematically shows the output unit provided with a recording head 1932 of full-line type.

A conveyor belt 1965 transports an unrepresented recording medium, by the rotation of a transport roller 1932. The bottom face 1931 of the recording head 1932 is provided with a plurality of discharge openings, corresponding to the recording area of the recording medium.

Also, in this case the recording operation can be conducted in a similar manner as in the recording head of serial type explained above.

Naturally, the output units explained above are given as examples, and there can be conceived various modifications.

However, the above-explained ink discharge system utilizing thermal energy, being capable not only of compactization but also of more highly precise recording, can exhibit the effect of the present invention more conspicuously, and can therefore provide an information processing apparatus excellent in overall performance.

As explained in detail in the foregoing, the present invention can provide a compact illumination device capable of uniform illumination with a high intensity.

Also, the present invention can provide an illumination device which is simple in structure and can simplify also the manufacturing process.

Furthermore, the present invention can provide a photoelectric converting device and an information processing apparatus capable of stable image reading.

Furthermore, the present invention can provide a secure mounting method for the light source, which is simplified in the mounting steps.

Furthermore, the present invention can realize a linear light source with reduced unevenness in the amount of illuminating light on the illuminated surface, thereby achieving improved tonal rendition without increasing the burden of image processing.

The present invention is subject to various modifications within the scope and spirit of the appended claims. Also, the embodiments explained before may naturally be combined in suitable manner.

What is claimed is:

1. An illumination unit comprising:
    an elongated light guide;
    a light source that injects light into an end surface of said light guide, in a longitudinal direction of said light guide;
    a light output surface, formed on said light guide along the longitudinal direction thereof, which outputs in a line shape light injected from said light source into the end surface of said light guide; and
    an elongated reflector and/or diffuser formed along the longitudinal direction on a side of said light guide opposite the light output surface of said light guide,
    wherein the light output surface and the reflector and/or diffuser are formed in respective predetermined areas, a middle of each of which is offset from a middle of the end surface of said light guide when viewed in the longitudinal direction of said light guide.

2. An illumination unit according to claim 1, wherein said reflector and/or diffuser has a length substantially equal to the length of said light guide in the longitudinal direction thereof.

3. An illumination unit according to claim 1, wherein a middle of said light source is arranged with no offset relative to the middle of the end surface of said light guide when viewed in the longitudinal direction of said light guide.

4. An illumination unit according to claim 1, wherein said light output surface is a curved surface.

5. An illumination unit according to claim 4, wherein said curved surface is a convex surface.

6. An illumination unit according to claim 1, wherein said reflector and/or diffuser includes light-reflecting paint.

7. An illumination unit according to claim 1, wherein said reflector and/or diffuser includes a coarse surface.

8. An illumination unit according to claim 1, wherein said reflector and/or diffuser includes a sawtooth-shaped reflecting surface.

9. A image reading apparatus comprising:
   a line sensor, having a main scanning direction, that receives image light of an original and outputs an image signal; and
   an illumination unit including:
      an elongated light guide,
      a light source that injects light into an end surface of the elongated light guide, in a longitudinal direction of said light guide,
      a light output surface, formed on said light guide along the longitudinal direction thereof, which outputs in a line shape light injected from said light source into the end surface of said light guide, and
      an elongated reflector and/or diffuser formed along the longitudinal direction on a side of said light guide opposite said light output surface,
      wherein the light output surface and the reflector and/or diffuser are formed in respective predetermined areas, a middle of each of which is offset from a middle of the end surface of said light guide when viewed in the longitudinal direction of said light guide.

10. An image reading apparatus according to claim 9, wherein said reflector and/or diffuser has a length substantially equal to the length of said light guide in the longitudinal direction thereof.

11. An image reading apparatus according to claim 9, wherein a middle of said light source is arranged with no offset relative to the middle of the end surface of said light guide when viewed in the longitudinal direction of said light guide.

12. An image reading apparatus according to claim 9, wherein said light output surface is a curved surface.

13. An image reading apparatus according to claim 9, wherein said curved surface is a convex surface.

14. An image reading apparatus according to claim 9, wherein said reflector and/or diffuser includes a light-reflecting paint.

15. An image reading apparatus according to claim 9, wherein said reflector and/or diffuser includes a coarse surface.

16. An image reading apparatus according to claim 9, wherein said reflector and/or diffuser includes a sawtooth-shaped reflecting surface.

17. An image processing system comprising:
   a line sensor, having a main scanning direction, that receives image light of an object and outputs an image signal;
   an illumination unit including:
      an elongated light guide,
      a light source that injects light into an end surface of said light guide in a longitudinal direction of said light guide,
      a light output surface, formed on said light guide along the longitudinal direction thereof, which outputs in a line shape light injected from said light source into the end surface of said light guide, and
      an elongated reflector and/or diffuser formed along the longitudinal direction on a side of said light guide opposite the light output surface of said light guide,
      wherein the light output surface and the reflector and/or diffuser are formed in respective predetermined areas, a middle of each of which is offset from a middle of the end surface of said light guide when viewed in the longitudinal direction of said light guide; and
   a control circuit that controls operation of said line sensor and said illumination unit.

18. An image processing system according to claim 17, wherein said reflector and/or diffuser has a length substantially equal to the length of said light guide in the longitudinal direction thereof.

19. An image processing system according to claim 17, wherein a middle of said light source is arranged with no offset from the middle of the end surface of said light guide when viewed in the longitudinal direction of said light guide.

20. An image processing system according to claim 17, wherein said light output surface is a curved surface.

21. An image processing system according to claim 20, wherein said curved surface is a convex surface.

22. An image processing system according to claim 17, wherein said reflector and/or diffuser includes light-reflecting paint.

23. An image processing system according to claim 17, wherein said reflector and/or diffuser includes a coarse surface.

24. An image processing system according to claim 17, wherein said reflector and/or diffuser includes a sawtooth-shaped reflecting surface.

25. An image processing system according to claim 17, further comprising communication means for communicating with an external apparatus, wherein said control circuit controls said communication means.

26. An image processing system according to claim 17, further comprising a processor that converts an image signal output from said line sensor into different electrical signals.

27. An image processing system according to claim 26, wherein the different electrical signals are used for recording.

28. An image processing system according to claim 27, further comprising driving means for shifting a relative position between an original illuminated by said illumination unit and said line sensor.

29. An image processing system according to claim 27, further comprising a driving unit that shifts a positional relationship between an original illuminated by said illumination unit and said line sensor.

30. An image processing system according to claim 17, further comprising a communication unit that communicates with an external apparatus, wherein said control circuit controls said communication unit.

31. An information communication apparatus comprising:
   a line sensor, having a main scanning direction, that receives image light of an original and outputs an image signal;
   an illumination unit including:
      an elongated light guide,
      a light source that injects light into an end surface of said light guide, in a longitudinal direction of said light guide,
      a light output surface, formed on said light guide along the longitudinal direction thereof, which outputs in a line shape light injected from said light source into the end surface of said light guide, and
      an elongated reflector and/or diffuser formed along the longitudinal direction on a side of said light guide opposite the light output surface, wherein the light output surface and the reflector and/or diffuser are formed in respective predetermined areas, a middle of each of which is offset from a middle of the end surface of said light guide when viewed in the longitudinal direction of said light guide; and communication means for communicating an image signal output by said line sensor to an external processing apparatus for processing the image signal.

32. An information communication apparatus according to claim 31, wherein said reflector and/or diffuser has a length substantially equal to the length of said light guide in the longitudinal direction thereof.

33. An information communication apparatus according to claim 31, wherein a middle of said light source is arranged with no offset from the middle of the end surface of said light guide when viewed in the longitudinal direction of said light guide.

34. An information communication apparatus according to claim 31, wherein said light output surface is a curved surface.

35. An information communication apparatus according to claim 34, wherein said curved surface is a convex surface.

36. An information communication apparatus according to claim 31, wherein said reflector and/or diffuser includes light-reflecting paint.

37. An information communication apparatus according to claim 31, wherein said reflector and/or diffuser includes a coarse surface.

38. An information communication apparatus according to claim 31, wherein said reflector and/or diffuser includes a sawtooth-shaped reflecting surface.

39. An information communication apparatus according to claim 31, further comprising a processor that converts an image signal output from said line sensor into different electrical signals.

40. An information communication apparatus according to claim 39, wherein the different electrical signals are used for recording.

41. An information communication apparatus according to claim 31, further comprising driving means for shifting a relative position between an original illuminated by said illumination unit and said line sensor.

42. An information reading apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, which outputs in a line shape light injected from said light source into the end surface of said light guide, and
an elongated reflector and/or diffuser formed along the longitudinal direction on a side of said light guide opposite the light output surface of said light guide,
wherein the light output surface and the reflector and/or diffuser are formed in respective predetermined areas, a middle of each of which is offset from a middle of the end surface of said light guide when viewed in the longitudinal direction of said light guide; and
driving means for shifting a relative position between an original illuminated by said illumination unit and said line sensor.

43. An information reading apparatus according to claim 42, wherein said reflector and/or diffuser has a length substantially equal to the length of said light guide in the longitudinal direction thereof.

44. An information reading apparatus according to claim 42, wherein a middle of said light source is arranged with no offset from the middle of the end surface of said light guide when viewed in the longitudinal direction of said light guide.

45. An information reading apparatus according to claim 42, wherein said light output surface is a curved surface.

46. An information reading apparatus according to claim 45, wherein said curved surface is a convex surface.

47. An information reading apparatus according to claim 42, wherein said reflector and/or diffuser includes light-reflecting paint.

48. An information reading apparatus according to claim 42, wherein said reflector and/or diffuser includes a coarse surface.

49. An information reading apparatus according to claim 42, wherein said reflector and/or diffuser includes a sawtooth-shaped reflecting surface.

50. An information reading apparatus according to claim 42, further comprising a processor that converts an image signal output from said line sensor into different electrical signals.

51. An information reading apparatus according to claim 50, wherein the different electrical signals are used for recording.

52. An information reading apparatus according to claim 42, wherein said driving means includes a motor.

53. An information reading apparatus according to claim 42, further comprising communication means for communicating an image signal output by said line sensor to an external processing apparatus.

54. An information processing apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, that outputs in a line shape light injected from said light source into the end surface of said light guide, and
an elongated reflector and/or diffuser formed along the longitudinal direction on a side of said light guide opposite the light output surface of said light guide,
wherein the light output surface and the reflector and/or diffuser are formed in respective predetermined areas, a middle of each of which is offset from a middle of the end surface of said light guide when viewed in the longitudinal direction of said light guide;
a processor that processes an image signal output from said line sensor; and
a control circuit that controls said illumination unit, said line sensor and said processor.

55. An information processing apparatus according to claim 54, wherein said reflector and/or diffuser has a length substantially equal to the length of said light guide in the longitudinal direction thereof.

56. An information processing apparatus according to claim 54, wherein a middle of said light source is arranged with no offset from the middle of the end surface of said light guide when viewed in the longitudinal direction of said light guide.

57. An information processing apparatus according to claim 54, wherein said light output surface is a curved surface.

58. An information processing apparatus according to claim 57, wherein said curved surface is a convex surface.

59. An information processing apparatus according to claim 54, wherein said reflector and/or diffuser includes light-reflecting paint.

60. An information processing apparatus according to claim 54, wherein said reflector and/or diffuser includes a coarse surface.

61. An information processing apparatus according to claim 54, wherein said reflector and/or diffuser includes a sawtooth-shaped reflecting surface.

62. An information processing apparatus according to claim 54, further comprising communication means for communicating with an external apparatus, wherein said control circuit controls said communication means.

63. An information processing apparatus according to claim 54, wherein said processor converts the image signal into different electrical signals.

64. An information processing apparatus according to claim 63, wherein the different electrical signals are used for recording.

65. An information processing apparatus according to claim 54, further comprising driving means for shifting a relative position between an original illuminated by said illumination unit and said line sensor.

66. An information processing apparatus according to claim 54, further comprising a communication unit that communicates with an external apparatus, wherein said control circuit controls said communication unit.

67. An information processing apparatus according to claim 54, further comprising a driving unit that shifts a positional relationship between an original illuminated by said illumination unit and said line sensor.

68. An illumination unit comprising:
   an elongated light guide;
   a light source that injects light into an end surface of said light guide, in a longitudinal direction of said light guide;
   a light output surface, formed on a side of said light guide along the longitudinal direction thereof, that outputs in a line shape light injected from said light source into the end surface of said light guide; and
   an elongated reflector and/or diffuser formed along the longitudinal direction on an other side of said light guide different than the side of said light guide on which said light output surface is formed,
   wherein the light output surface and the reflector and/or diffuser are formed in respective predetermined areas, a middle of each of which is offset from a middle of the end surface of said light guide when viewed in the longitudinal direction of said light guide.

69. An illumination unit according to claim 68, wherein said reflector and/or diffuser has a length substantially equal to the length of said light guide in the longitudinal direction thereof.

70. An illumination unit according to claim 68, wherein a middle of said light source is arranged with no offset relative to the middle of the end surface of said light guide when viewed in the longitudinal direction of said light guide.

71. An illumination unit according to claim 68, wherein said light output surface is a curved surface.

72. An illumination unit according to claim 71, wherein said curved surface is a convex surface.

73. An illumination unit according to claim 68, wherein said reflector and/or diffuser includes light-reflecting paint.

74. An illumination unit according to claim 68, wherein said reflector and/or diffuser includes a coarse surface.

75. An illumination unit according to claim 68, wherein said reflector and/or diffuser includes a sawtooth-shaped reflecting surface.

76. An image reading apparatus comprising:
   a line sensor, having a main scanning direction, that receives image light of an original and outputs an image signal; and
   an illumination unit including:
      an elongated light guide,
      a light source that injects light into an end surface of said elongated light guide, in a longitudinal direction of said light guide,
      a light output surface, formed on said light guide along the longitudinal direction thereof, which outputs in a line shape light injected from said light source into said end surface of said light guide, and
      an elongated reflector and/or diffuser formed along the longitudinal direction on an other side of said light guide, different from the side of said light guide on which said light output surface is formed,
      wherein said light output surface and said reflector and/or diffuser are formed in respective predetermined areas, a middle of each of which is offset from a middle of the end surface of said light guide when viewed in the longitudinal direction of said light guide.

77. An image reading apparatus according to claim 76, wherein said reflector and/or diffuser has a length substantially equal to the length of said light guide in the longitudinal direction thereof.

78. An image reading apparatus according to claim 76, wherein a middle of said light source is arranged with no offset relative to the middle of the end surface of said light guide when viewed in the longitudinal direction of said light guide.

79. An image reading apparatus according to claim 76, wherein said light output surface is a curved surface.

80. An image reading apparatus according to claim 79, wherein said curved surface is a convex surface.

81. An image reading apparatus according to claim 76, wherein said reflector and/or diffuser includes light-reflecting paint.

82. An image reading apparatus according to claim 76, wherein said reflector and/or diffuser includes a coarse surface.

83. An image reading apparatus according to claim 76, wherein said reflector and/or diffuser includes a sawtooth-shaped reflecting surface.

84. An image processing system comprising:
   a line sensor, having a main scanning direction, that receives image light of an object and outputs an image signal;
   an illumination unit including:
      an elongated light guide,
      a light source that injects light into an end surface of said light guide in a longitudinal direction of said light guide,
      a light output surface, formed on said light guide along the longitudinal direction thereof, which outputs in a line shape light injected from said light source into the end surface of said light guide, and
      an elongated reflector and/or diffuser formed along the longitudinal direction on an other side of said light guide different than the side of said light guide on which said light output surface is formed, wherein said light output surface and said reflector and/or diffuser are formed in respective predetermined areas, a middle of each of which is offset from a middle of the end surface of said light guide when viewed in the longitudinal direction of said light guide; and a control circuit that controls operation of said line sensor and said illumination unit.

85. An image processing system according to claim 84, wherein said reflector and/or diffuser has a length substantially equal to the length of said light guide in the longitudinal direction thereof.

86. An image processing system according to claim 84, wherein a middle of said light source is arranged with no offset from the middle of the end surface of said light guide when viewed in the longitudinal direction of said light guide.

87. An image processing system according to claim 84, wherein said light output surface is a curved surface.

88. An image processing system according to claim 87, wherein said curved surface is a convex surface.

89. An image processing system according to claim 84, wherein said reflector and/or diffuser includes light-reflecting paint.

90. An image processing system according to claim 84, wherein said reflector and/or diffuser includes a coarse surface.

91. An image processing system according to claim 84, wherein said reflector and/or diffuser includes a sawtooth-shaped reflecting surface.

92. An image processing system according to claim 84, further comprising communication means for communicating with an external apparatus, wherein said control circuit controls said communication means.

93. An image processing system according to claim 84, further comprising a processor that converts an image signal output from said line sensor into different electrical signals.

94. An image processing system according to claim 93, wherein the different electrical signals are used for recording.

95. An image processing system according to claim 94, further comprising driving means for shifting a relative position between the original illuminated by said illumination unit and said line sensor.

96. An image processing system according to claim 94, further comprising a driving unit that shifts a position relationship between the original illuminated by said illumination unit and said line sensor.

97. An image processing system according to claim 84, further comprising a communication unit that communicates with an external apparatus, wherein said control circuit controls said communication unit.

98. An information communication apparatus comprising:
a line sensor, having a main scanning direction, that receives image light of an original and outputs an image signal;
an illumination unit including:
an elongated light guide;
a light source that injects light into an end surface of said light guide, in a longitudinal direction of said light guide,
a light output surface, formed on said light guide along the longitudinal direction thereof, which outputs in a line shape light injected from said light source into the end surface of the light guide, and
an elongated reflector and/or diffuser formed along the longitudinal direction on an other side of said light guide different from the side of said light guide on which said light output surface is formed, wherein the light output surface and said reflector and/or diffuser are formed in respective predetermined areas, a middle of each of which is offset from a middle of the end surface of said light guide when viewed in the longitudinal direction of said light guide; and communication means for communicating an image signal output by said line sensor to an external processing apparatus for processing the image signal.

99. An information communication apparatus according to claim 98, wherein said reflector and/or diffuser has a length substantially equal to the length of said light guide in the longitudinal direction thereof.

100. An information communication apparatus according to claim 98, wherein a middle of said light source is arranged with no offset from the middle of the end surface of said light source when viewed in the longitudinal direction of said light source.

101. An information communication apparatus according to claim 98, wherein said light output surface is a curved surface.

102. An information communication apparatus according to claim 101, wherein said curved surface is a convex surface.

103. An information communication apparatus according to claim 98, wherein said reflector and/or diffuser includes light-reflecting paint.

104. An information communication apparatus according to claim 98, wherein said reflector and/or diffuser includes a coarse surface.

105. An information communication apparatus according to claim 98, wherein said reflector and/or diffuser includes a sawtooth-shaped reflecting surface.

106. An information communication apparatus according to claim 98, further comprising a processor that converts an image signal output from said line sensor into different electrical signals.

107. An information communication apparatus according to claim 106, wherein the different electrical signals are used for recording.

108. An information communication apparatus according to claim 98, further comprising driving means for shifting a relative position between an original illuminated by said illumination unit and said line sensor.

109. An information communication apparatus according to claim 98, further comprising a driving unit that shifts a positional relationship between an original illuminated by said illumination unit and said line sensor.

110. An information reading apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, which outputs in a line shape light injected from said light source into the end surface of said light guide, and
an elongated reflector and/or diffuser formed along the longitudinal direction on an other side of said light guide different from the side of said light guide on which said light output surface is formed, wherein the light output surface and said reflector and/or diffuser are formed in respective predetermined areas, a middle of each of which is offset from a middle of the end surface of said light guide when viewed in the longitudinal direction of said light guide; and driving means for shifting a relative position between an original illuminated by said illumination unit and said line sensor.

111. An information reading apparatus according to claim 110, wherein said reflector and/or diffuser has a length substantially equal to the length of said light guide in the longitudinal direction thereof.

112. An information reading apparatus according to claim 110, wherein a middle of said light source is arranged with no offset from the middle of the end surface of said light guide when viewed in the longitudinal direction of said light guide.

113. An information reading apparatus according to claim 110, wherein said light output surface is a curved surface.

114. An information reading apparatus according to claim 113, wherein said curved surface is a convex surface.

115. An information reading apparatus according to claim 110, wherein said reflector and/or diffuser includes light-reflecting paint.

116. An information reading apparatus according to claim 110, wherein said reflector and/or diffuser includes a coarse surface.

117. An information reading apparatus according to claim 110, wherein said reflector and/or diffuser includes a sawtooth-shaped reflecting surface.

118. An information reading apparatus according to claim 110, further comprising a processor that converts an image signal output from said line sensor into different electrical signals.

119. An information reading apparatus according to claim 118, wherein the different electrical signals are used for recording.

120. An information reading apparatus according to claim 110, wherein said driving means includes a motor.

121. An information reading apparatus according to claim 110, further comprising communication means for communicating an image signal output by said line sensor to an external processing apparatus.

122. An information processing apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, that outputs in a line shape light injected from said light source into the end surface of said light guide, and
an elongated reflector and/or diffuser formed along the longitudinal direction on an other side of said light guide different from the side of said light guide on which said light output surface is formed,
wherein the light output surface and said reflector and/or diffuser are formed in respective predetermined areas, a middle of each of which is offset from a middle of the end surface of said light guide when viewed in the longitudinal direction of said light guide;

a processor that processes an image signal output from said line sensor; and
a control circuit that controls said illumination unit, said line sensor and said processor.

123. An information processing apparatus according to claim 122, wherein said reflector and/or diffuser has a length substantially equal to the length of said light guide in the longitudinal direction thereof.

124. An information processing apparatus according to claim 122, wherein a middle of said light source is arranged with no offset from the middle of the end surface of said light guide when viewed in the longitudinal direction of said light guide.

125. An information processing apparatus according to claim 122, wherein said light output surface is a curved surface.

126. An information processing apparatus according to claim 125, wherein said curved surface is a convex surface.

127. An information processing apparatus according to claim 122, wherein said reflector and/or diffuser includes light-reflecting paint.

128. An information processing apparatus according to claim 122, wherein said reflector and/or diffuser includes a coarse surface.

129. An information processing apparatus according to claim 122, wherein said reflector and/or diffuser includes a sawtooth-shaped reflecting surface.

130. An information processing apparatus according to claim 122, further comprising communication means for communicating with an external apparatus, wherein said control circuit controls said communication means.

131. An information processing apparatus according to claim 122, wherein said processor converts the image signal into different electrical signals.

132. An information processing apparatus according to claim 131, wherein the different electrical signals are used for recording.

133. An information processing apparatus according to claim 122, further comprising driving means for shifting a relative position between an original illuminated by said illumination unit and said line sensor.

134. An information processing apparatus according to claim 122, further comprising a communication unit that communicates with an external apparatus, wherein said control circuit controls said communication unit.

135. An information processing apparatus according to claim 122, further comprising a driving unit that shifts a positional relationship between an original illuminated by said illumination unit and said line sensor.

136. An information communication apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, which outputs in a line shape light injected from said light source into the end surface of said light guide, and
an elongated reflector and/or diffuser formed along the longitudinal direction on a side of said light guide opposite the light output surface,
wherein the light output surface and the reflector and/or diffuser are formed in respective predetermined areas, a middle of each of which is offset from a middle of the end surface of said light guide when viewed in the longitudinal direction of said light guide; and a communication unit that communicates an image signal output by said line sensor to an external processing apparatus for processing the image signal.

137. An information communication apparatus according to claim 136, wherein said reflector and/or diffuser has a length substantially equal to the length of said light guide in the longitudinal direction thereof.

138. An information communication apparatus according to claim 136, wherein a middle of said light source is arranged with no offset from the middle of the end surface of said light guide when viewed in the longitudinal direction of said light guide.

139. An information communication apparatus according to claim 136, wherein said light output surface is a curved surface.

140. An information communication apparatus according to claim 139, wherein said curved surface is a convex surface.

141. An information communication apparatus according to claim 136, wherein said reflector and/or diffuser includes light-reflecting paint.

142. An information communication apparatus according to claim 136, wherein said reflector and/or diffuser includes a coarse surface.

143. An information communication apparatus according to claim 136, wherein said reflector and/or diffuser includes a sawtooth-shaped reflecting surface.

144. An information communication apparatus according to claim 136, further comprising a processor that converts an image signal output from said line sensor into different electrical signals.

145. An information communication apparatus according to claim 144, wherein the different electrical signals are used for recording.

146. An information communication apparatus according to claim 136, further comprising a driving unit that shifts a positional relationship between an original illuminated by said illumination unit and said line sensor.

147. An information reading apparatus comprising:
a line sensor, having a main scanning direction, that receives image light of an original and outputs an image signal;
an illumination unit including:
an elongated light guide,
a light source that injects light into an end surface of said light guide, in a longitudinal direction of said light guide,
a light output surface, formed on said light guide along the longitudinal direction thereof, which outputs in a line shape light injected from said light source into the end surface of said light guide, and
an elongated reflector and/or diffuser formed along the longitudinal direction on a side of said light guide opposite the light output surface of said light guide,
wherein the light output surface and the reflector and/or diffuser are formed in respective predetermined areas, a middle of each of which is offset from a middle of the end surface of said light guide when viewed in the longitudinal direction of said light guide; and
a driving unit that shifts a positional relationship between an original illuminated by said illumination unit and said line sensor.

148. An information reading apparatus according to claim 147, wherein said reflector and/or diffuser has a length substantially equal to the length of said light guide in the longitudinal direction thereof.

149. An information reading apparatus according to claim 147, wherein a middle of said light source is arranged with no offset from the middle of the end surface of said light guide when viewed in the longitudinal direction of said light guide.

150. An information reading apparatus according to claim 147, wherein said light output surface is a curved surface.

151. An information reading apparatus according to claim 150, wherein said curved surface is a convex surface.

152. An information reading apparatus according to claim 147, wherein said reflector and/or diffuser includes light-reflecting paint.

153. An information reading apparatus according to claim 147, wherein said reflector and/or diffuser includes a coarse surface.

154. An information reading apparatus according to claim 147, wherein said reflector and/or diffuser includes a sawtooth-shaped reflecting surface.

155. An information reading apparatus according to claim 147, further comprising a processor that converts an image signal output from said line sensor into different electrical signals.

156. An information reading apparatus according to claim 155, wherein the different electrical signals are used for recording.

157. An information reading apparatus according to claim 147, wherein said driving unit includes a motor.

158. An information reading apparatus according to claim 147, further comprising a communication unit that communicates an image signal output by said line sensor to an external processing apparatus.

159. An information communication apparatus comprising:
a line sensor, having a main scanning direction, that receives image light of an original and outputs an image signal;
an illumination unit including:
an elongated light guide;
a light source that injects light into an end surface of said light guide, in a longitudinal direction of said light guide,
a light output surface, formed on said light guide along the longitudinal direction thereof, which outputs in a line shape light injected from said light source into the end surface of the light guide, and
an elongated reflector and/or diffuser formed along the longitudinal direction on an other side of said light guide different from the side of said light guide on which said light output surface is formed,
wherein the light output surface and said reflector and/or diffuser are formed in respective predetermined areas, a middle of each of which is offset from a middle of the end surface of said light guide when viewed in the longitudinal direction of said light guide; and
a communication unit that communicates an image signal output by said line sensor to an external processing apparatus for processing the image signal.

160. An information communication apparatus according to claim 159, wherein said reflector and/or diffuser has a length substantially equal to the length of said light guide in the longitudinal direction thereof.

161. An information communication apparatus according to claim 159, wherein a middle of said light source is arranged with no offset from the middle of the end surface of said light source when viewed in the longitudinal direction of said light source.

162. An information communication apparatus according to claim 159, wherein said light output surface is a curved surface.

163. An information communication apparatus according to claim 162, wherein said curved surface is a convex surface.

164. An information communication apparatus according to claim 159, wherein said reflector and/or diffuser includes light-reflecting paint.

165. An information communication apparatus according to claim 159, wherein said reflector and/or diffuser includes a coarse surface.

166. An information communication apparatus according to claim 159, wherein said reflector and/or diffuser includes a sawtooth-shaped reflecting surface.

167. An information communication apparatus according to claim 159, further comprising a processor that converts an image signal output from said line sensor into different electrical signals.

168. An information communication apparatus according to claim 167, wherein the different electrical signals are used for recording.

169. An information reading apparatus comprising:

a line sensor, having a main scanning direction, that receives image light of an original and outputs an image signal;

an illumination unit including:

an elongated light guide, a light source that injects light into an end surface of said light guide, in a longitudinal direction of said light guide, a light output surface, formed on said light guide along the longitudinal direction thereof, which outputs in a line shape light injected from said light source into the end surface of said light guide, and an elongated reflector and/or diffuser formed along the longitudinal direction on an other side of said light guide different from the side of said light guide on which said light output surface is formed, wherein the light output surface and said reflector and/or diffuser are formed in respective predetermined areas, a middle of each of which is offset from a middle of the end surface of said light guide when viewed in the longitudinal direction of said light guide; and a driving unit that shifts a positional relationship between an original illuminated by said illumination unit and said line sensor.

170. An information reading apparatus according to claim 169, wherein said reflector and/or diffuser has a length substantially equal to the length of said light guide in the longitudinal direction thereof.

171. An information reading apparatus according to claim 169, wherein a middle of said light source is arranged with no offset from the middle of the end surface of said light guide when viewed in the longitudinal direction of said light guide.

172. An information reading apparatus according to claim 169, wherein said light output surface is a curved surface.

173. An information reading apparatus according to claim 172, wherein said curved surface is a convex surface.

174. An information reading apparatus according to claim 169, wherein said reflector and/or diffuser includes light-reflecting paint.

175. An information reading apparatus according to claim 169, wherein said reflector and/or diffuser includes a coarse surface.

176. An information reading apparatus according to claim 169, wherein said reflector and/or diffuser includes a sawtooth-shaped reflecting surface.

177. An information reading apparatus according to claim 169, further comprising a processor that converts an image signal output from said line sensor into different electrical signals.

178. An information reading apparatus according to claim 177, wherein the different electrical signals are used for recording.

179. An information reading apparatus according to claim 169, wherein said driving unit includes a motor.

180. An information reading apparatus according to claim 169, further comprising a communication unit that communicates an image signal output by said line sensor to an external processing apparatus.

* * * * *

UNITED STATES PATENT AND TRADEMARK OFFICE
CERTIFICATE OF CORRECTION

PATENT NO. : 6,426,807 B1
DATED : July 30, 2002
INVENTOR(S) : Tatsundo Kawai et al.

It is certified that error appears in the above-identified patent and that said Letters Patent is hereby corrected as shown below:

<u>Column 10,</u>
Line 10, "embodiment 3" should read -- Embodiment 3 --; and
Line 35, "embodiment" should read -- Embodiment --.

<u>Column 19,</u>
Line 62, "cross sectional" should read -- cross-sectional --.

<u>Column 23,</u>
Line 8, "enables" should read -- enable --.

<u>Column 25,</u>
Line 38, "dusts" should read -- dust --.

Signed and Sealed this

Thirty-first Day of December, 2002

JAMES E. ROGAN
*Director of the United States Patent and Trademark Office*